US011296747B2

(12) United States Patent
Kobayashi et al.

(10) Patent No.: US 11,296,747 B2
(45) Date of Patent: Apr. 5, 2022

(54) INFORMATION PROCESSING DEVICE AND METHOD, TRANSMITTING DEVICE AND METHOD, AND RECEIVING DEVICE AND METHOD

(71) Applicant: Sony Semiconductor Solutions Corporation, Kanagawa (JP)

(72) Inventors: Seiji Kobayashi, Kanagawa (JP); Sachio Iida, Kanagawa (JP); Katsuyuki Tanaka, Kanagawa (JP); Hiroshi Aoki, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/849,752

(22) Filed: Apr. 15, 2020

(65) Prior Publication Data

US 2020/0244305 A1    Jul. 30, 2020

Related U.S. Application Data

(62) Division of application No. 15/740,508, filed as application No. PCT/JP2017/016262 on Apr. 25, 2017, now Pat. No. 10,659,101.

(30) Foreign Application Priority Data

Jun. 8, 2016  (JP) ................. 2016-114358
Jul. 13, 2016  (JP) ................. 2016-138365

(51) Int. Cl.
*H04B 1/00*       (2006.01)
*H04B 1/715*    (2011.01)
(Continued)

(52) U.S. Cl.
CPC ............ *H04B 1/715* (2013.01); *H04B 1/04* (2013.01); *H04B 1/16* (2013.01); *H04B 1/69* (2013.01);
(Continued)

(58) Field of Classification Search
CPC .......... H04B 1/16; H04B 1/0475; H04B 1/18; H04B 7/0413; H04B 17/0085; H04B 1/38;
(Continued)

(56) References Cited

U.S. PATENT DOCUMENTS 4,879,713 A     11/1989  Ichiyoshi
7,342,538 B2 *   3/2008  Zimmerman ........... G01S 19/07
                                                       342/464
(Continued)

FOREIGN PATENT DOCUMENTS

CN    101043237 A    9/2007
CN    101145833 A    3/2008
(Continued)

OTHER PUBLICATIONS

Extended European Search Report dated Dec. 19, 2019 for corresponding European Application No. 17809992.5.
(Continued)

*Primary Examiner* — Zewdu A Kassa
(74) *Attorney, Agent, or Firm* — Michael Best & Friedrich LLP

(57) ABSTRACT

An information processing device and method, a transmitting device and method, and a receiving device and method are disclosed for multiplexing transmission signals in the same channel. In one example, transmission signals are generated by performing chirp modulation on data to be transmitted, and the transmission signals are multiplexed by shifting transmission timings of a plurality of transmission signals in a time direction and transmitting the transmission signals. Further, a plurality of chirp-modulated transmission signals which are multiplexed by shifting the transmission timing in the time direction and transmitted from a transmission side are received, and the plurality of received
(Continued)

transmission signals are dechirped at timings according to the transmission timings.

19 Claims, 38 Drawing Sheets

(51) Int. Cl.
- *H04B 1/04* (2006.01)
- *H04B 1/16* (2006.01)
- *H04B 1/69* (2011.01)
- *H04B 3/52* (2006.01)

(52) U.S. Cl.
CPC ....... *H04B 3/52* (2013.01); *H04B 2001/6912* (2013.01)

(58) Field of Classification Search
CPC ........ H04B 7/086; H04B 7/088; H04B 17/20; H04B 1/0483
USPC .......................... 375/136, 130, 219, 295, 316
See application file for complete search history.

(56) References Cited

U.S. PATENT DOCUMENTS

| | | |
|---|---|---|
| 9,094,107 B1 | 7/2015 | Kumar |
| 2001/0032885 A1 | 10/2001 | Groeger |
| 2003/0022651 A1 | 1/2003 | Bannasch et al. |
| 2003/0133496 A1 | 7/2003 | Hooton |
| 2011/0249594 A1 | 10/2011 | Wu et al. |
| 2012/0238303 A1 | 9/2012 | Kikuzuki et al. |
| 2014/0036870 A1 | 2/2014 | Skov et al. |
| 2015/0381226 A1 | 12/2015 | Mogol |
| 2015/0381276 A1* | 12/2015 | Saito ................... H04J 14/0256 398/34 |
| 2017/0215160 A1* | 7/2017 | Lohr ..................... H04L 5/0094 |

FOREIGN PATENT DOCUMENTS

| | | |
|---|---|---|
| CN | 101146091 A | 3/2018 |
| EP | 1086446 A1 | 3/2001 |
| JP | 08-307375 A | 11/1996 |
| JP | 10-070488 A | 3/1998 |
| JP | 10-303853 A | 11/1998 |
| JP | 11-252103 A | 9/1999 |
| JP | 3270902 B2 | 1/2002 |
| JP | 2011-199689 A | 10/2011 |
| JP | 5736450 B2 | 4/2015 |

OTHER PUBLICATIONS

Chinese Office Action dated Apr. 17, 2020 for corresponding Chinese Application No. 2017800026427.

Japanese Office Action dated Jun. 15, 2021 for corresponding Japanese Application No. 2017-235896.

European Patent Office Communication Pursuant to Article 94(3) EPC dated Nov. 24, 2021 for corresponding European Application No. 17809992.5.

* cited by examiner

INFORMATION PROCESSING DEVICE AND METHOD, TRANSMITTING DEVICE AND METHOD, AND RECEIVING DEVICE AND METHOD

CROSS REFERENCE TO RELATED APPLICATIONS

This present application is a Divisional of application Ser. No. 15/740,508, filed Dec. 28, 2017, which is a 371 Nationalization of PCT/JP 2017-016262, filed Apr. 25, 2017, which claims priority to Japanese Priority Patent Applications JP 2016-114358 filed Jun. 8, 2016 and JP 2016-138365 filed Jul. 13, 2016, the entire contents of which are incorporated herein by reference.

TECHNICAL FIELD

The present technology relates to an information processing device and method, a transmitting device and method, and a receiving device and method, and more particularly to, an information processing device and method, a transmitting device and method, and a receiving device and method, which are capable of multiplexing transmission signals in the same channel.

BACKGROUND ART

In the past, as signal multiplexing methods, frequency division multiplexing (FDM), time division multiplexing (TDM), spread spectrum, and the like have been known (see, for example, Patent Document 1). In addition, as a modulation method for transmission signals, a method of performing chirp modulation on a phase modulation signal is considered (see, for example, Patent Document 2).

CITATION LIST

Patent Document

Patent Document 1: Japanese Patent No. 3270902
Patent Document 2: Japanese Patent Application Laid-Open No. 08-307375

SUMMARY OF THE INVENTION

Problems to be Solved by the Invention

However, in the case of the frequency division multiplexing (FDM), in a 920 MHz band of Japan, it is necessary to adjust a center frequency within ±20 ppm, and it is unable to be used practically. Further, in the case of the time division multiplexing (TDM), sufficiently high multiplicity is unable to be obtained. For example, in a case where transmission is performed for 4 seconds once per minute, only 12 multiples are obtained. Further, in the case of the spread spectrum, spreading is performed using a random number sequence, transmission is performed, and a receiver is able to perform separation by integrating while multiplying by the random number sequence. However, cross-correlation portions of the random number sequence are likely to undergo interference. Further, multiplexing of chirp-modulated transmission signals is not disclosed in Patent Document 2.

The present technology was made in light of the foregoing, and it is an object of the present technology to multiplex a transmission signal in the same channel.

Solutions to Problems

An information processing device of a first aspect of the present technology, includes: a supplying unit that supplies a plurality of receiving devices with identification information of a transmitting device, the plurality of receiving devices receiving information transmitted from the transmitting device that multiplexes a plurality of transmission signals generated by performing chirp modulation on transmission data in the same transmission channel by shifting a transmission timing at predetermined time intervals and transmits the multiplexed transmission signals, the identification information of the transmitting device being used for a setting for receiving the transmission signals in each of the receiving devices.

A transmitting device of a second aspect of the present technology, includes: a chirp modulating unit that performs chirp modulation on transmission data; a transmitting unit that multiplexes a plurality of transmission signals generated by performing the chirp modulation in the same transmission channel by shifting a transmission timing at predetermined time intervals and transmits the multiplexed transmission signals; and a control unit that sets the transmission timing and the transmission channel on the basis of identification information of the transmitting device.

A receiving device of a third aspect of the present technology, includes: a receiving unit that receives transmission signals transmitted from a transmitting device that multiplexes a plurality of transmission signals generated by performing the chirp modulation in the same transmission channel by shifting a transmission timing at predetermined time intervals and transmits the multiplexed transmission signals; a dechirping unit that dechirps the transmission signals; a control unit that sets a reception channel of the transmission signals on the basis of identification information of the transmitting device and sets a reception timing according to the transmission timing of each of the plurality of transmission signals.

In the first aspect of the present technology, a plurality of receiving devices are supplied with identification information of a transmitting device, the plurality of receiving devices receiving information transmitted from the transmitting device that multiplexes a plurality of transmission signals generated by performing chirp modulation on transmission data in the same transmission channel by shifting a transmission timing at predetermined time intervals and transmits the multiplexed transmission signals, the identification information of the transmitting device being used for a setting for receiving the transmission signals in each of the receiving devices.

In the second aspect of the present technology, chirp modulation is performed on transmission data, a plurality of transmission signals generated by performing the chirp modulation in the same transmission channel are multiplexed by shifting a transmission timing at predetermined time intervals and transmitted, and the transmission timing and the transmission channel are set on the basis of identification information of the transmitting device.

In the third aspect of the present technology, transmission signals transmitted from a transmitting device that multiplexes a plurality of transmission signals generated by performing the chirp modulation in the same transmission channel by shifting a transmission timing at predetermined time intervals and transmits the multiplexed transmission signals are received, the transmission signals are dechirped, a reception channel of the transmission signals is set on the basis of identification information of the transmitting device, and a reception timing according to the transmission timing of each of the plurality of transmission signals is set.

Effects of the Invention

According to the present technology, it is possible to transmit or receive signals. Further, according to the present technology, it is possible to multiplex transmission signals in the same channel.

MODE FOR CARRYING OUT THE INVENTION

Hereinafter, modes for carrying out the present disclosure (hereinafter referred to as "embodiments") will be described. Further, the description will proceed in the following order.

1. First embodiment (position notification system)
2. Second embodiment (application example)
3. Third embodiment (others)
4. Fourth embodiment (position notification system)
5. Fifth embodiment (antitheft system)

1. First Embodiment

<Multiplexing of Chirp Modulation>

Figure 1:
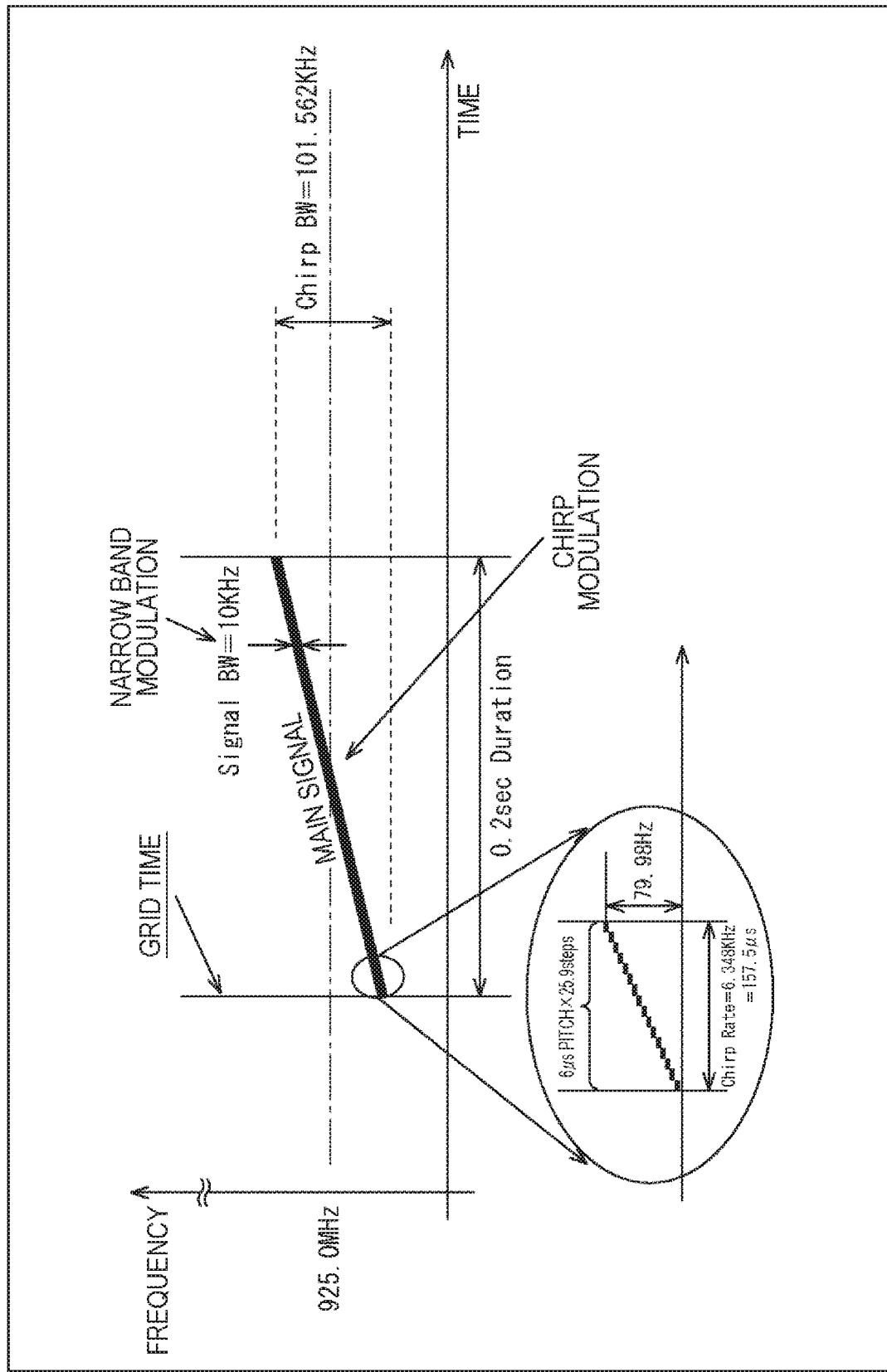
FIG. 1 is a diagram illustrating an example of an aspect of chirp modulation.

In order to multiplex transmission signals in the same channel of a 920 MHz band in Japan, chirp modulation is performed on transmission signals of packets, and transmission timings of a plurality of chirp-modulated transmission signals are shifted in a time direction. An example of this aspect is illustrated in FIG. 1. In FIG. 1, a main signal (for example, a transmission signal) is chirp-modulated. A center frequency is 925 MHz, a duration is 0.2 seconds, and a chirp width (Chirp BW) is 101.562 KHz. More specifically, a chirp rate (Chirp Rate) of the main signal is 6.348 KHz, a change of 79.98 Hz is implemented by 6 µS pitch×25.9 steps, and 157.7 µs is taken.

Figure 2:
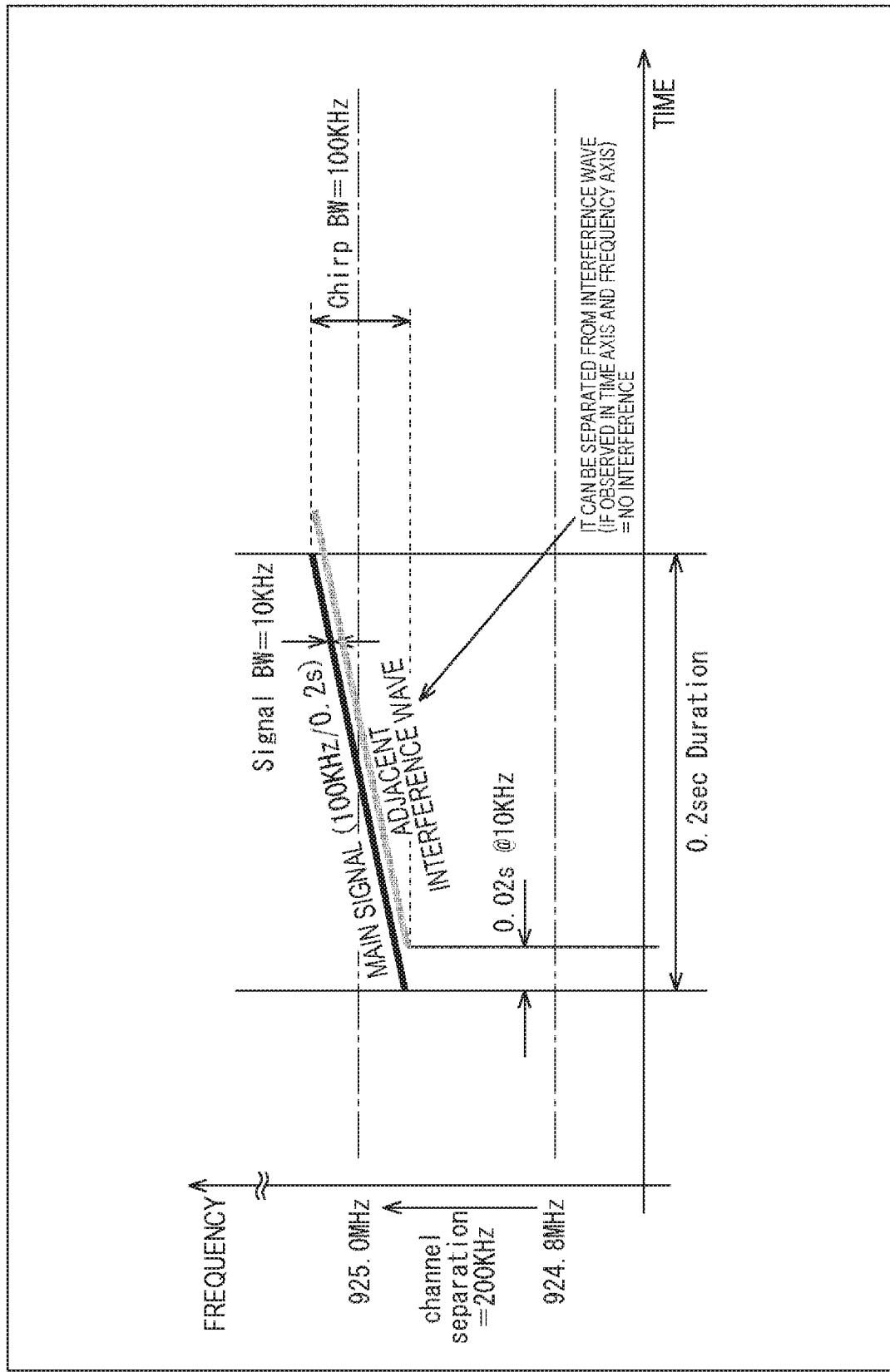
FIG. 2 is a diagram illustrating an example of an aspect of multiplexing.

As illustrated in FIG. 2, if a transmission timing of an adjacent interfering wave is 0.02 sec shifted from the transmission timing of the main signal for the main signal (chirp-modulated transmission signal), the main signal and an interfering waves thereof are multiplexed so that they can be separated (with no interference).

Figure 3:
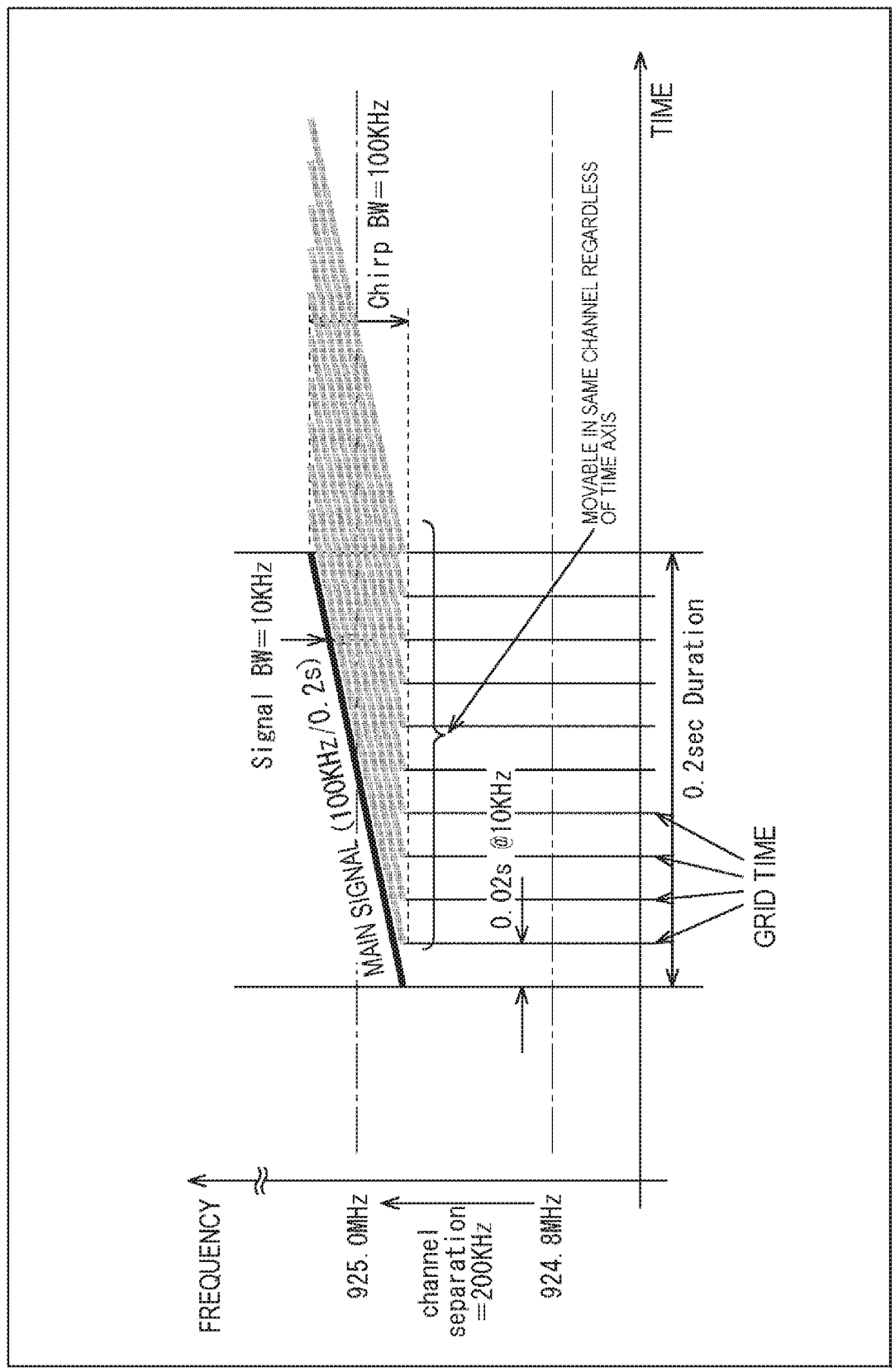
FIG. 3 is a diagram illustrating an example of an aspect of multiplexing.

If the transmission timing is shifted in the time direction using such a principle, a plurality of chirp-modulated transmission signals can be multiplexed so that they can be separated (with no interference) as illustrated in FIG. 3. In other words, the transmission signals can be multiplexed in the same channel of the 920 MHz band in Japan. In the 920 MHz band in Japan, a plurality of channels having a predetermined bandwidth are specified.

Further, as illustrated in FIG. 1, the chirp-modulated transmission signal may start to be transmitted at a time known to a reception side. In other words, the transmission timing of each transmission signal may be set to the known time (also referred to as a "grid time"). Accordingly, each transmission signal can be more easily detected on the reception side.

In other words, in the examples of FIGS. 2 and 3, transmission of each transmission signal may be similarly started at the grid time. Further, an interval of the grid time may be constant. Further, the interval of the grid time may be shorter than a chirp modulation cycle. For example, in the example of FIG. 3, the chirp modulation cycle is identical to 0.2 seconds, that is, a transmission time of one packet. Further, the interval of the grid time is 0.02 seconds.

Further, the chirp-modulated transmission signal may further undergo narrow band modulation as illustrated in FIG. 1. If the narrow band modulation is performed on the transmission data, a bandwidth of the main signal can be set to 10 KHz or less. As illustrated in FIG. 2, as the bandwidth of each chirp-modulated transmission signal is narrower, it is possible to bring the transmission signals closer to each other, and thus more transmission signals can be multiplexed, for example, as illustrated in FIG. 3. Further, the accuracy of synchronization detection can be improved.

As the narrow band modulation, for example, phase shift modulation such as binary phase shift keying (BPSK) or quadrature phase shift keying (QPSK) maybe applied, or minimum shift modulation such as Gaussian filtered minimum shift keying (GMSK) may be applied.

By employing such modulation schemes, it is possible to generate the transmission signal through a PLL. Therefore, it is possible to suppress an increase in power consumption. Further, it is possible to apply a high-efficient amplifying unit to amplification of the transmission signal accordingly.

Further, the transmission timing of the chirp-modulated transmission signal may be controlled on the basis of time information included in a GPS signal. Accordingly, it is possible to control the transmission timing of the chirp-modulated transmission signal with a high degree of accuracy.

Further, reception of the GPS signal and transmission of the chirp-modulated transmission signal may be performed on the basis of a common reference clock signal. In this case, the reference clock may deviate from the time information of the GPS signal. Therefore, the deviation (frequency deviation) may be corrected. Accordingly, it is possible to control the transmission timing of the chirp-modulated transmission signal with a high degree of accuracy.

In a case where a plurality of multiplexed chirp-modulated transmission signals which are transmitted at different transmission timings from the transmission side as described above are received, each transmission signal is dechirped at timing corresponding to each transmission timing. Accordingly, it is possible to separate and demodulate each transmission signal (each packet) (with no interference). In other words, it is possible to implement multiplexing of the transmission signals within the same channel of the 920 MHz band in Japan.

As described above, the transmission timing of each transmission signal may be set to the known time (the grid time). Further, an interval of a timing at which each transmission signal is dechirped may be fixed. Further, the interval of the timing at which each transmission signal is dechirped may be shorter than the chirp modulation cycle.

Further, the narrow band modulation may further be performed on the chirp-modulated transmission signal, and narrow band demodulation may further be performed on the transmission signal after the transmission sig is dechirped. As the narrowband demodulation, for example, phase displacement demodulation such as BPSK, QPSK, or the like may be applied, or minimum deviation demodulation such as GMSK may be applied.

Further, the dechirp timing control for the chirp-modulated transmission signal may be performed on the basis of a predetermined synchronization signal. Further, it may be performed on the basis of the GPS signal as well. Further, delay correction may be performed on the dechirp timing of the chirp-modulated transmission signal.

<Position Notification System>

Figure 4:
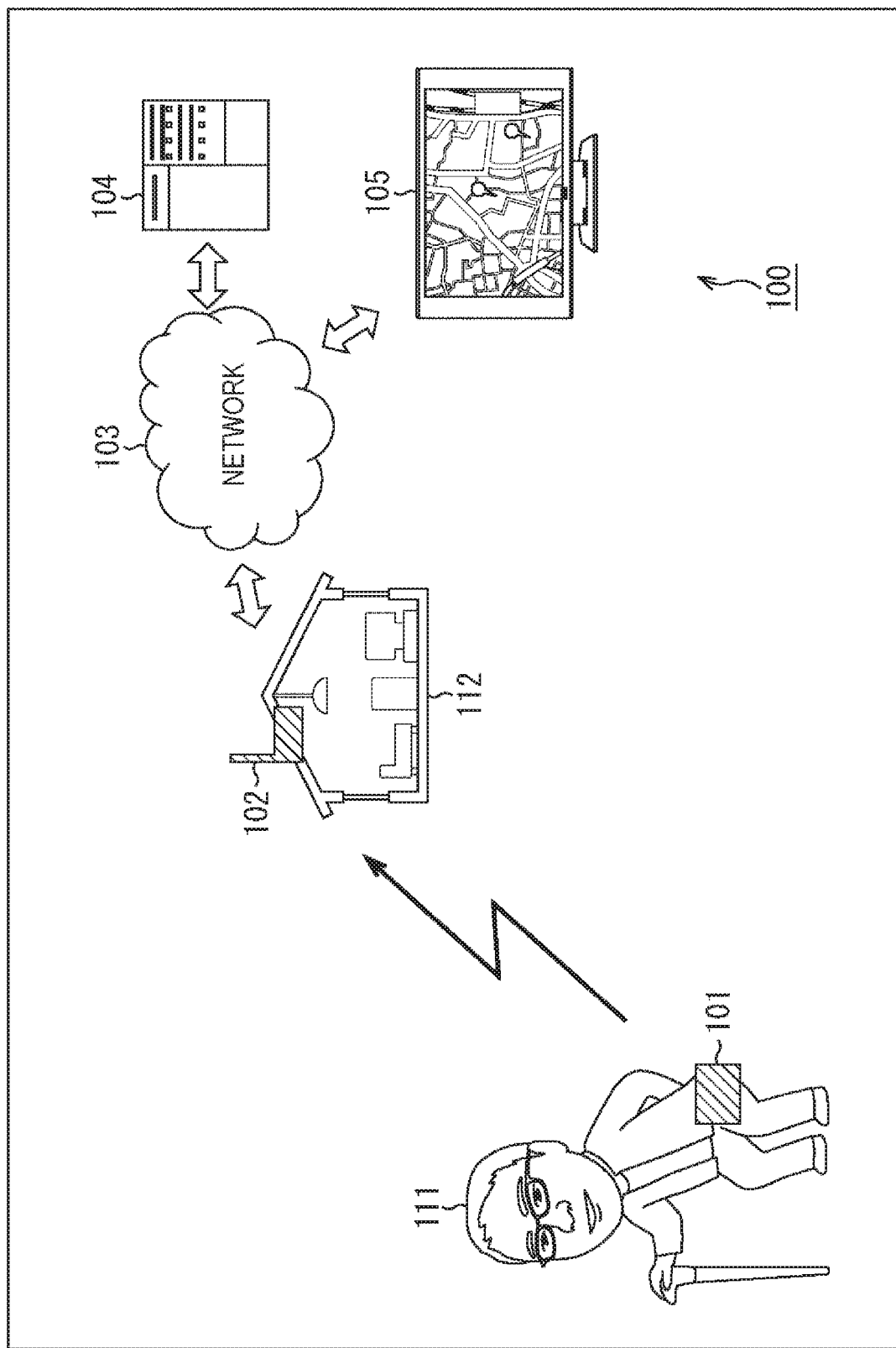
FIG. 4 is a diagram illustrating a main configuration example of a position notification system.

Next, a system and a device to which the present technology is applied will be described. FIG. 4 is a diagram illustrating a main configuration example of a position notification system which is one example of a signal transmission/reception system to which the present technology is applied. A position notification system 100 illustrated in FIG. 4 is a system in which a transmitting device 101 gives a notification indicating its position.

The transmitting device 101 is an example of a transmitting device to which the present technology is applied, and transmits position information indicating its position as a radio signal. A high sensitivity receiving device 102 is an example of a receiving device to which the present technology is applied and receives the radio signal, acquires the position information of the transmitting device 101, and supplies the position information to a server 104 via a network 103. In other words, the high sensitivity receiving device 102 functions as a relay station which relays information transmitted from the transmitting device 101 and transmits the information to the server 104. The transmission of the information from the transmitting device 101 to the high sensitivity receiving device 102 is performed, for example, through one-way communication. The server 104 manages the position information of each transmitting device 101. A terminal device 105 operated by a user who desires to know the position of the transmitting device 101 accesses the server 104 via the network 103, acquires the position information of the transmitting device 101 from the server 104, and notifies the user of the position of the transmitting device 101, for example, by displaying the position information together with map data or the like.

For example, the transmitting device 101 is carried by a subject whom the user desires to know the position. In the example of FIG. 4, the transmitting device 101 is carried by an elderly person 111. The transmitting device 101 is able to obtain its position information (for example, a latitude and a longitude) appropriately, for example, by receiving GNSS signals from global navigation satellite system (GNSS) satellites. The transmitting device 101 appropriately transmits its position information as the radio signal. Therefore, the user is able to know the position of the elderly person 111 who is a position monitoring subject by operating the terminal device 105 as described above.

Further, the position monitoring subject is arbitrary. For example, the position monitoring subject may be a child, an animal such as a dog or a cat, or an employee of a company. The transmitting device 101 may be configured as a dedicated device or may be incorporated into, for example, a mobile information processing device such as a mobile phone or a smartphone.

An installation position of the high sensitivity receiving device 102 is arbitrary. For example, the installation position may be a roof or a rooftop of a structure 112 such as a building, a condominium, a house, or the like. The structure 112 is preferable because there are many structures in an urban area in which the position monitoring subject carrying the transmitting device 101 (for example elderly person 111)

is likely to act, and it is easy to install. Particularly, the home of the position monitoring subject is suitable since the position monitoring subject is more likely to stay there-around. Further, from a point of view of securing an installation place, it is easier to obtain consent as compared with a case where the high sensitivity receiving device 102 is installed in a place independently secured by a position notification service provider.

Further, for example, when the position monitoring subject (or the user) purchases or borrows and installs the high sensitivity receiving device 102, it is possible to reduce a load (cost) on the position notification service provider as compared with a case where the position notification service provider independently installs the high sensitivity receiving device 102. In other words, accordingly, it is possible to install more high sensitivity receiving devices 102 at a lower cost.

In a state in which the transmitting device 101 is located within a communication coverage of any one of the high sensitivity receiving devices 102, the server 104 is able to manage the position of the transmitting device 101. In other words, if the position of the transmitting device 101 is out of the communication coverage of any one of the high sensitivity receiving device 102, the server 104 is unable to manage the position. Therefore, as the communication coverage network with the transmitting device 101 of the high sensitivity receiving device 102 has a wider range, the server 104 is able to manage the position of the transmitting device 101 more accurately. Here, the more accurate management indicates management of the position of the transmitting device 101 in a wider range. In other words, in order to increase the range in which the position of the transmitting device 101 can be managed, it is preferable that the transmitting device 101 and the high sensitivity receiving device 102 be able to transmit and receive the radio signal farther away (the communication coverage of each high sensitivity receiving device 102 be wider). Further, since the high sensitivity receiving devices 102 are installed at different positions, it is preferable that the number of high sensitivity receiving devices 102 be large. Further, from a point of view of usefulness, it is preferable to set an area in which the transmitting device 101 is likely to be located as the communication coverage of the high sensitivity receiving device 102.

Therefore, in the position notification system 100, as the number of the high sensitivity receiving devices 102 increases, qualities of services that can be provided are further improved, which is preferable. In other words, it is possible to implement a more useful system at a lower cost.

Further, the high sensitivity receiving device 102 may be installed in a movable object (also referred to as a "mobile object") such as a vehicle, a motorbike, a bicycle, or the like. In other words, the position of the high sensitivity receiving device 102 may be variable.

The network 103 is an arbitrary communication network and may be configured with either or both of a communication network of wired communication and a communication network of radio communication. Further, the network 103 may be configured with one communication network or may be configured with a plurality of communication networks. For example, a communication network of any communication standard or a communication path such as the Internet, a public telephone line network, a wide area communication network for wireless mobile objects such as a so-called 3G line or a 4G line, a radio communication network in which communication conforming to standards such as wide area network (WAN), local area network (LAN), and Bluetooth (a registered trademark) is performed, a communication path of near field communication (NFC) or the like, a communication path of infrared communication, and a communication network of a wired communication conforming to standards such as high-definition multimedia interface (HDMI (a registered trademark)) and universal serial bus (USB) may be included as the network 103.

The server 104 and the terminal device 105 are information processing devices which process information. The server 104 and the terminal device 105 are connected to the network 103 to be able to perform communication and are able to perform communication with other communication devices connected to the network 103 via this network 103 and exchange information.

Figure 5:
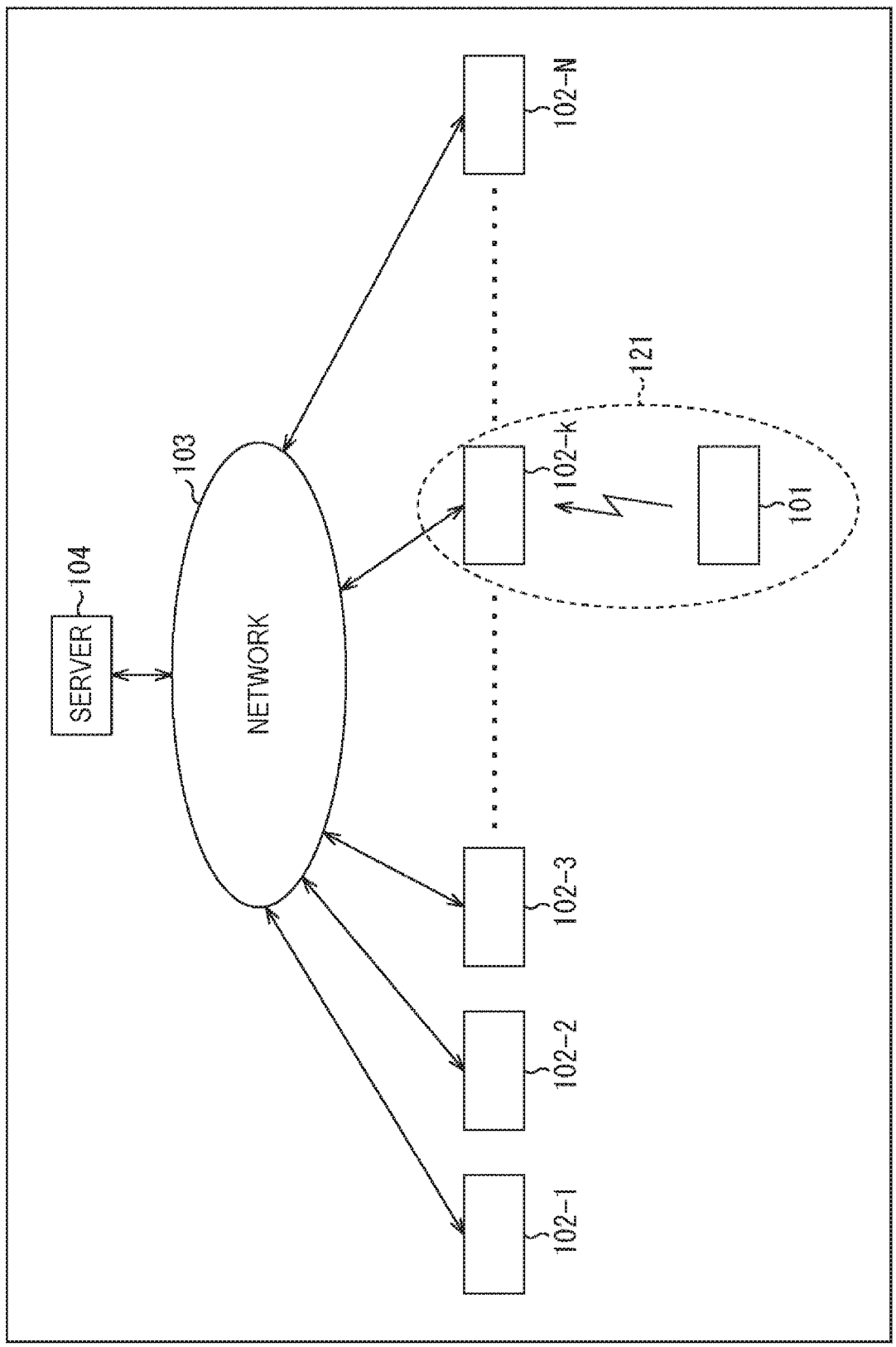
FIG. 5 is a diagram for describing an example of an aspect of position notification.

In the position notification system 100, the number of transmitting devices 101, the number of high sensitivity receiving devices 102, the number of servers 104, and the number of terminal devices 105 are arbitrary and may be two or more. For example, as illustrated in FIG. 5, the position notification system 100 is assumed to include N high sensitivity receiving devices 102 (N is an arbitrary natural number) installed at different positions (high sensitivity receiving devices 102-1 to 102-N).

A timing at which the transmitting device 101 transmits the radio signal (position information) is arbitrary. For example, the transmitting device 101 may transmit the radio signal at regular intervals or when a predetermined event occurs (for example, in a case where it moves a predetermined distance, in a case where it becomes a predetermined time, or the like).

In this case, the radio signal transmitted from the transmitting device 101 is received by the high sensitivity receiving device 102 located near the transmitting device 101. If the transmitting device 101 transmits the radio signal within a communication coverage 121 of the high sensitivity receiving device 102-K (K is an integer of $1 \leq K \leq N$), the high sensitivity receiving device 102-K receives the radio signal, acquires the position information of the transmitting device 101, and supplies the position information to the server 104 via the network 103 (relays the position information).

For example, if the elderly person 111 (transmitting device 101) moves into the communication coverage of another high sensitivity receiving device 102, and the transmitting device 101 transmits the radio signal, the high sensitivity receiving device 102 similarly relays the position information. Therefore, as long as the elderly person 111 (the transmitting device 101) is located within the communication coverage of any one of the high sensitivity receiving devices 102, the user is able to know the position of the elderly person 111.

The server 104 manages the position information of the transmitting device 101. In a case where there are a plurality of transmitting devices 101, the server 104 manages the position information for each transmitting device 101. For example, the transmitting device 101 transmits its own identification information (ID) together with the position information. The server 104 stores and manages the position information in association with the ID of the transmitting device 101. Therefore, the server 104 is able to provide only position information of the transmitting device 101 requested from the user (terminal device 105). Further, the server 104 is able to manage the user to whom the position information is permitted to be provided for each transmitting device 101. In other words, the server 104 is able to provide the position information of each transmitting device 101 only to the user who is permitted to obtain the position information of the transmitting device 101.

Further, the server 104 may manage the position information of the transmitting device 101 in association with information other than the ID of the transmitting device 101. For example, the server 104 may store and manage the position information of the transmitting device 101 in association with time information or the like. Accordingly, the server 104 is able to manage and provide a history of the position information of the transmitting device 101.

Further, the time information may be transmitted from the transmitting device 101. For example, the transmitting device 101 may transmit the time information included in the GNSS signal together with the position information as the radio signal.

Further, content of the position information transmitted by the transmitting device 101 is arbitrary as long as the position information transmitted by the transmitting device 101 may be information that is able to be managed as information indicating the position of the transmitting device 101 in the server 104. For example, the transmitting device 101 may transmit the GNSS signal (or the time information included in the GNSS signal) without obtaining the position information from the GNSS signal. In this case, the high sensitivity receiving device 102, the server 104, or the like may obtain the position information of the transmitting device 101 using the GNSS signal or the time information. Further, the information processing device (server or the like) which obtains the position information of the transmitting device 101 may be separately installed by using the GNSS signal or the time information.

Further, for example, the position of the transmitting device 101 may be obtained on the basis of the installation position of the high sensitivity receiving device 102 which receives the radio signal from the transmitting device 101. For example, in the example of FIG. 5, the transmitting device 101 is located within the communication coverage 121 of the high sensitivity receiving device 102. In this case, the server 104 estimates that the transmitting device 101 is located within the communication coverage 121 of the high sensitivity receiving device 102-K on the basis of the information relayed by the high sensitivity receiving device 102-K and manages the estimation as the position information. In other words, in this case, the position of the transmitting device 101 is managed with the granularity of the number of high sensitivity receiving devices 102 (the width of the communication coverage of each high sensitivity receiving device 102). In this case, the transmitting device 101 may transmit at least its own ID as the radio signal.

Further, for example, the server 104 may estimate a distance between the high sensitivity receiving device 102 and the transmitting device 101 from radio wave strength of the radio signal received by the high sensitivity receiving device 102 and manage the distance as the position information as well. In other words, the server 104 may manage the high sensitivity receiving device 102 in which the transmitting device 101 is located in its communication coverage and the distance between the high sensitivity receiving device 102 and the transmitting device 101. The estimation of the distance may be performed in the high sensitivity receiving device 102 or the server 104 or may be performed by a separately installed information processing device (server or the like).

Further, for example, in a case where the transmitting device 101 is located in a portion where the communication coverages of a plurality of high sensitivity receiving devices 102 overlaps, that is, in a case where the radio signal transmitted by the transmitting device 101 is relayed by a plurality of high sensitivity receiving devices 102, the position of the transmitting device 101 may be estimated using a trigonometric technique. For example, the estimation of the position may be performed in the server 104 or may be performed by a separately installed information processing device (server or the like).

Each of the high sensitivity receiving devices 102 may be able to relay information of an arbitrary transmitting device 101 or may be able to relay only information of the transmitting device 101 corresponding to its own transmitting device. For example, information transmitted from a certain transmitting device 101 may be able to be relayed only by the high sensitivity receiving device 102 owned or managed by the owner (or manager) of the transmitting device 101. The owner (or manager) may include not only individuals but also companies. Accordingly, it is possible to avoid the high sensitivity receiving device 102 from being shared by a plurality of the users, and for example, it is possible to suppress a reduction in safety of communication such as information leakage or the like. Further, the number of available high sensitivity receiving devices 102 may be set in accordance with an amount of fee paid by the user. Accordingly, it is possible to differentiate the qualities of services to be provided in accordance with a consideration.

<Transmitting Device>

Next, the transmitting device 101 will be described. A method of performing transmission and reception of the radio signal between the transmitting device 101 and the high sensitivity receiving device 102 is arbitrary and may be performed in conformity with any communication standard. For example, it may be performed by a method capable of performing long distance communication using a frequency band including 925 MHz (also referred to as a "920 MHz band").

Figure 6:
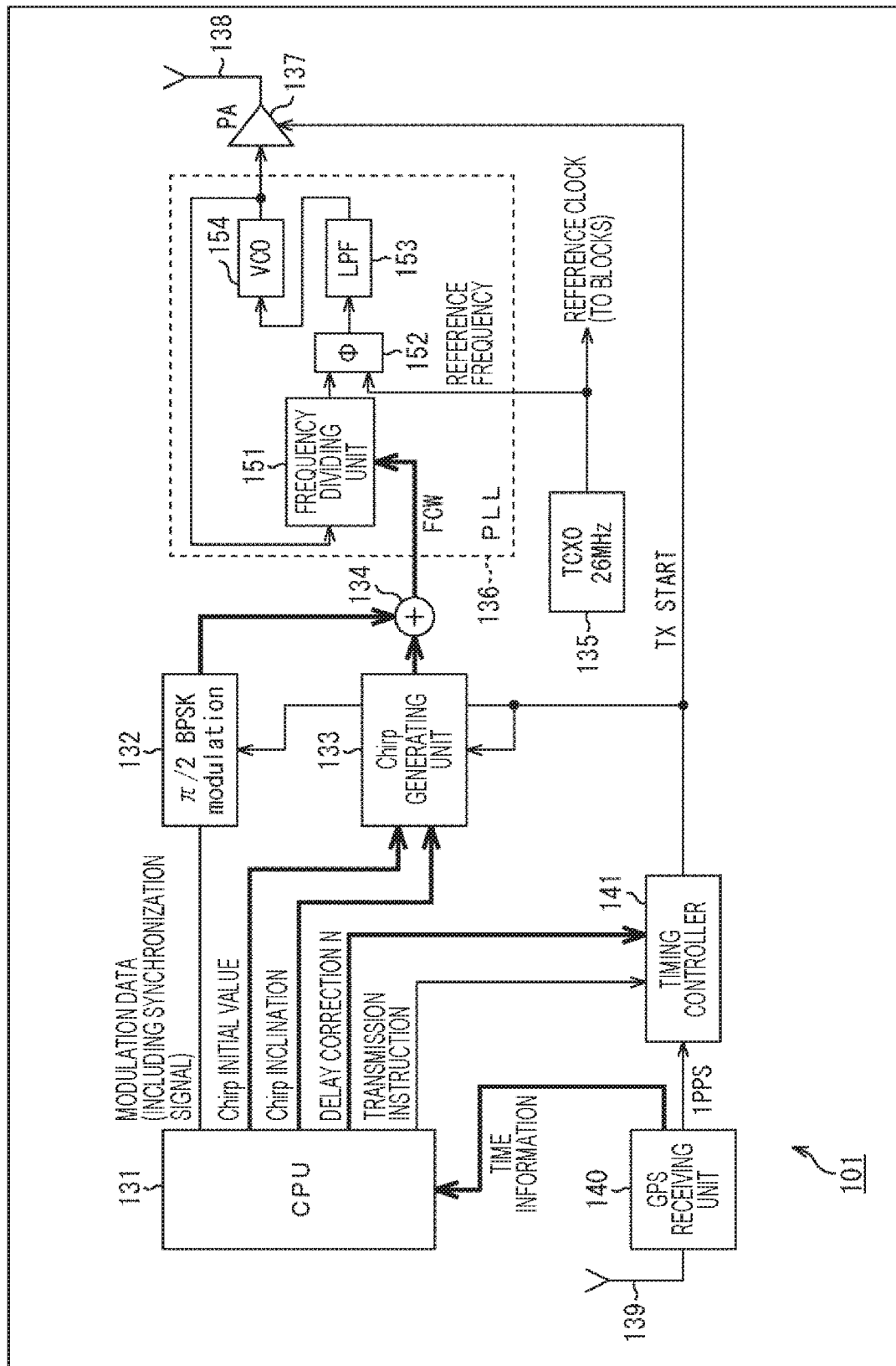
FIG. 6 is a block diagram illustrating a main configuration example of the transmitting device.

FIG. 6 is a block diagram illustrating a main configuration example of the transmitting device 101. The transmitting device 101 includes a CPU 131, a BPSK modulating unit (π/2 BPSK modulation) 132, a chirp generating unit 133, a chirp modulating unit 134, a reference clock generating unit (TCXO 26 MHz) 135, a PLL 136, a high-efficiency amplifying unit (PA) 137, an antenna 138, an antenna 139, a global positioning system (GPS) receiving unit 140, and a timing controller 141 as illustrated in FIG. 6.

The CPU 131 performs an arbitrary process and control related to transmission. For example, the CPU 131 generates modulation data (including a synchronization signal) which is data for transmission and supplies the modulation data to the BPSK modulating unit 132. Further, for example, the CPU 131 sets an initial value and an inclination of the chirp modulation and supplies the initial value and the inclination to the chirp generating unit 133. The initial value of the chirp modulation is information such as the center frequency designating a channel (transmission channel) used for multiplexing the transmission signal. As the inclination of the chirp modulation, the same inclination is set to the transmission signals to be multiplexed in the same channel.

For example, the transmission channel and the transmission timing of each transmission signal controlled by a signal output by the timing controller 141 as will be described later are set on the basis of the identification information and the time of the transmitting device 101. For example, the CPU 131 obtains the transmission channel and the transmission timing on the basis of the identification information stored in a memory (not illustrated) in the transmitting device 101 and the time indicated by the time information supplied from the GPS receiving unit 140 and sets the transmission channel and the transmission timing.

As will be described later, the high sensitivity receiving device 102 holds the identification information of the transmitting device 101. The supply of the identification information of the transmitting device 101 to the high sensitivity receiving device 102 is performed, for example, by the server 104. Upon receiving the transmission signal transmitted by the transmitting device 101, the high sensitivity receiving device 102 obtains a reception channel and a reception timing on the basis of the identification information and the time of the transmitting device 101 and uses the reception channel and the reception timing for reception of the transmission signal. The high sensitivity receiving device 102 obtains the reception channel and the reception timing corresponding to (synchronized with) the transmission channel and the transmission timing using a method similar to the method used for the transmitting device 101 to obtain the transmission channel and the transmission timing.

As described above, the communication between the transmitting device 101 and the high sensitivity receiving device 102 is synchronized using the channel and the timing obtained on the basis of at least the identification information of the transmitting device 101 as the known information.

Returning to the description of FIG. 6, for example, the CPU 131 obtains a delay correction N and supplies the obtained delay correction N to the timing controller 141 together with a transmission instruction. Further, the CPU 131 is driven on the basis of the time information extracted from the GPS signal received by the GPS receiving unit 140.

The BPSK modulating unit (π/2 BPSK modulation) 132 performs BPSK-modulation on the modulation data (including the synchronization signal) supplied from CPU 131 and supplies the resulting data to the chirp modulating unit 134. The chirp generating unit 133 generates a chirp signal on the basis of the initial value and the inclination of the chirp modulation supplied from the CPU 131. The chirp generating unit 133 supplies the generated chirp signal to the chirp modulating unit 134.

The chirp modulating unit 134 modulates (chirp-modulates) the BPSK-modulated modulation data supplied from the BPSK modulating unit 132 using the chirp signal supplied from the chirp generating unit 133. The chirp modulating unit 134 supplies the chirp-modulated modulation data to the PLL 136 (a frequency dividing unit 151). The reference clock generating unit (TCXO 26 MHz) 135 generates a reference clock of 26 MHz.

The reference clock generating unit 135 supplies the generated reference clock to the PLL 136 (a phase comparing unit (Φ) 152). The PLL 136 generates a transmission signal of a frequency corresponding to the chirp modulated modulation data supplied from the chirp modulating unit 134 and supplies the generated transmission signal to the high-efficiency amplifying unit 137. Under the control of the timing controller 141, the high-efficiency amplifying unit (PA) 137 amplifies the transmission signal (chirp-modulated transmission signal) supplied from the PLL 136 and transmits the amplified transmission signal via the antenna 138 as the radio signal.

The GPS receiving unit 140 acquires the GPS signal transmitted from the GPS satellite via the antenna 139. The GPS receiving unit 140 supplies the time information included in the GPS signal to the CPU 131. Further, the GPS receiving unit 140 measures 1 pulse per second (PPS) from the GPS signal and notifies the timing controller 141 of a period of time of 1 PPS.

The timing controller 141 supplies a control signal TX START to the BPSK modulating unit 132, the chirp generating unit 133, and the high-efficiency amplifying unit 137, and controls (permits/prohibits) execution of processes thereof in accordance with the value. Further, the timing controller 141 performs such control on the basis of the GPS signal. For example, the timing controller 141 performs such control on the basis of information indicating 1 PPS supplied from the GPS receiving unit 140. Further, the timing controller 141 also performs such control on the basis of the transmission instruction supplied from the CPU 131. Further, the timing controller 141 corrects a provision timing of the control signal TX START using the delay correction N supplied from the CPU 131. The transmission timing of each transmission signal obtained by the chirp modulation is controlled in accordance with the control signal TX START output by the timing controller 141.

As illustrated in FIG. 6, the PLL 136 includes the frequency dividing unit 151, the phase comparing unit 152, a low-pass filter (LPF) 153, and a voltage controlled oscillator (VCO) 154.

The frequency dividing unit 151 changes a frequency of the signal fed back from the VCO 154 with a magnification corresponding to the frequency of the chirp-modulated modulation data input as setting frequency data (frequency command word (FCW)) and supplies the changed frequency to the phase comparing unit 152.

The phase comparing unit 152 compares a phase of the output of the frequency dividing unit 151 with a phase of the reference clock supplied from the reference clock generating unit 135, and supplies a comparison result to the LPF 153. The LPF 153 blocks unnecessary high frequency components of the comparison result and supplies the filter processing result to the VCO 154.

The VCO 154 controls an output frequency in accordance with an inputted filter processing result voltage of the LPF 153. The output (the transmission signal) of the VCO 154 is supplied to the high-efficiency amplifying unit 137. Further, the output of the VCO 154 is fed back to the frequency dividing unit 151.

By using the phase shift keying modulation or the minimum deviation modulation, it is possible to generate the transmission signal using the PLL having such a simple configuration, and thus it is possible to suppress the increase in power consumption.

<BPSK Modulating Unit>

Figure 7:
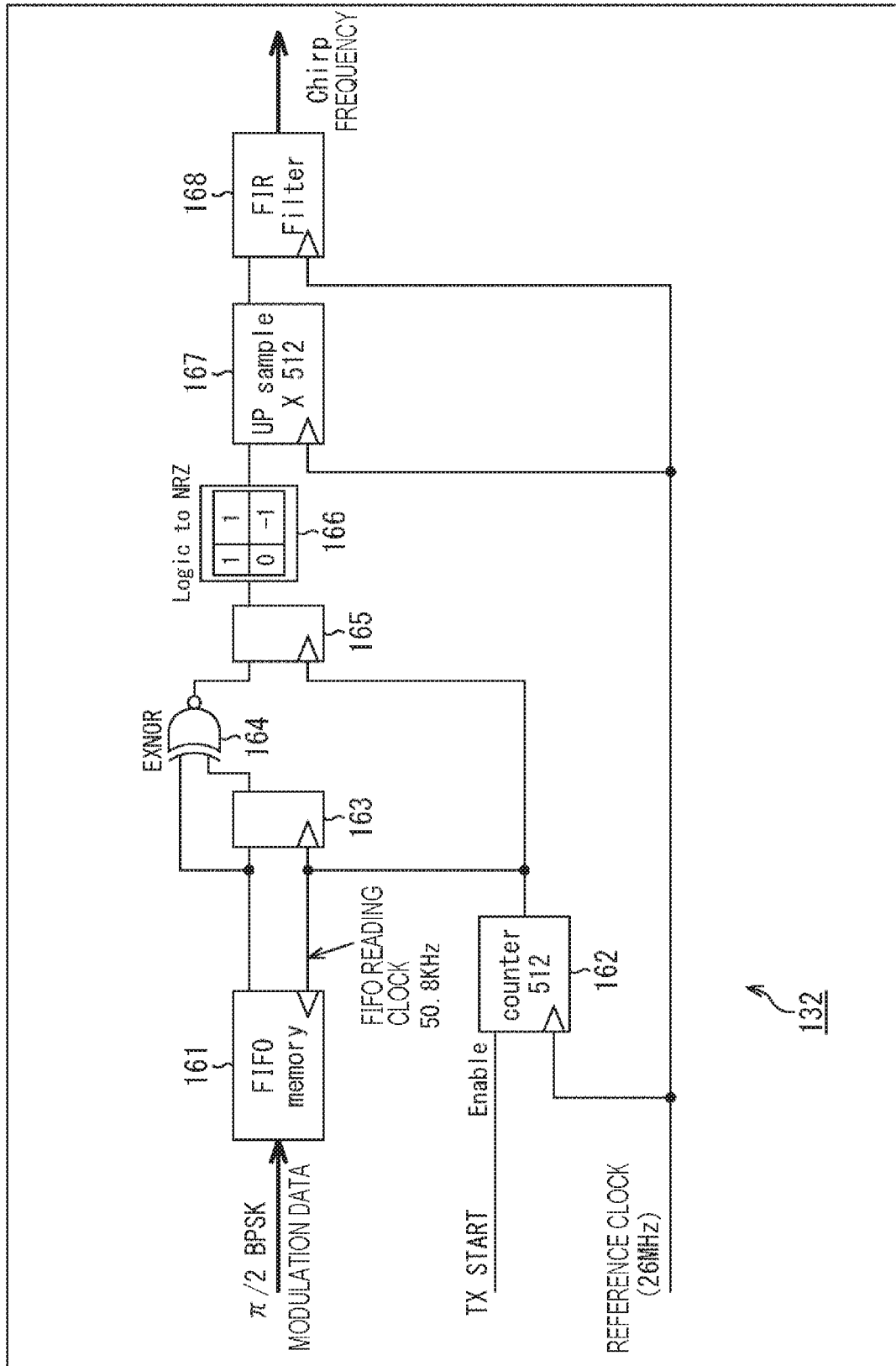
FIG. 7 is a diagram illustrating a main configuration example of a BPSK modulating unit.

FIG. 7 is a block diagram illustrating a main configuration example of the BPSK modulating unit 132 of FIG. 6. As illustrated in FIG. 7, the BPSK modulating unit 132 includes a FIFO memory 161, a counter (counter 512) 162, a flip flop 163, an EXNOR gate 164, a flip flop 165, a value converting unit 167, an up-sampling unit (UP sample X 512) 167, and an FIR filter 168. These are configured as illustrated in FIG. 7.

With this configuration, the BPSK modulating unit 132 performs BPSK modulation on the modulation signal supplied from the CPU 131 on the basis of the control signal TX START supplied from the timing controller 141 and the reference clock (26 MHz) generated by the reference clock generating unit 135, and supplies the BPSK-modulated modulation data to the chirp modulating unit 134.

<Chirp Generating Unit>

Figure 8:
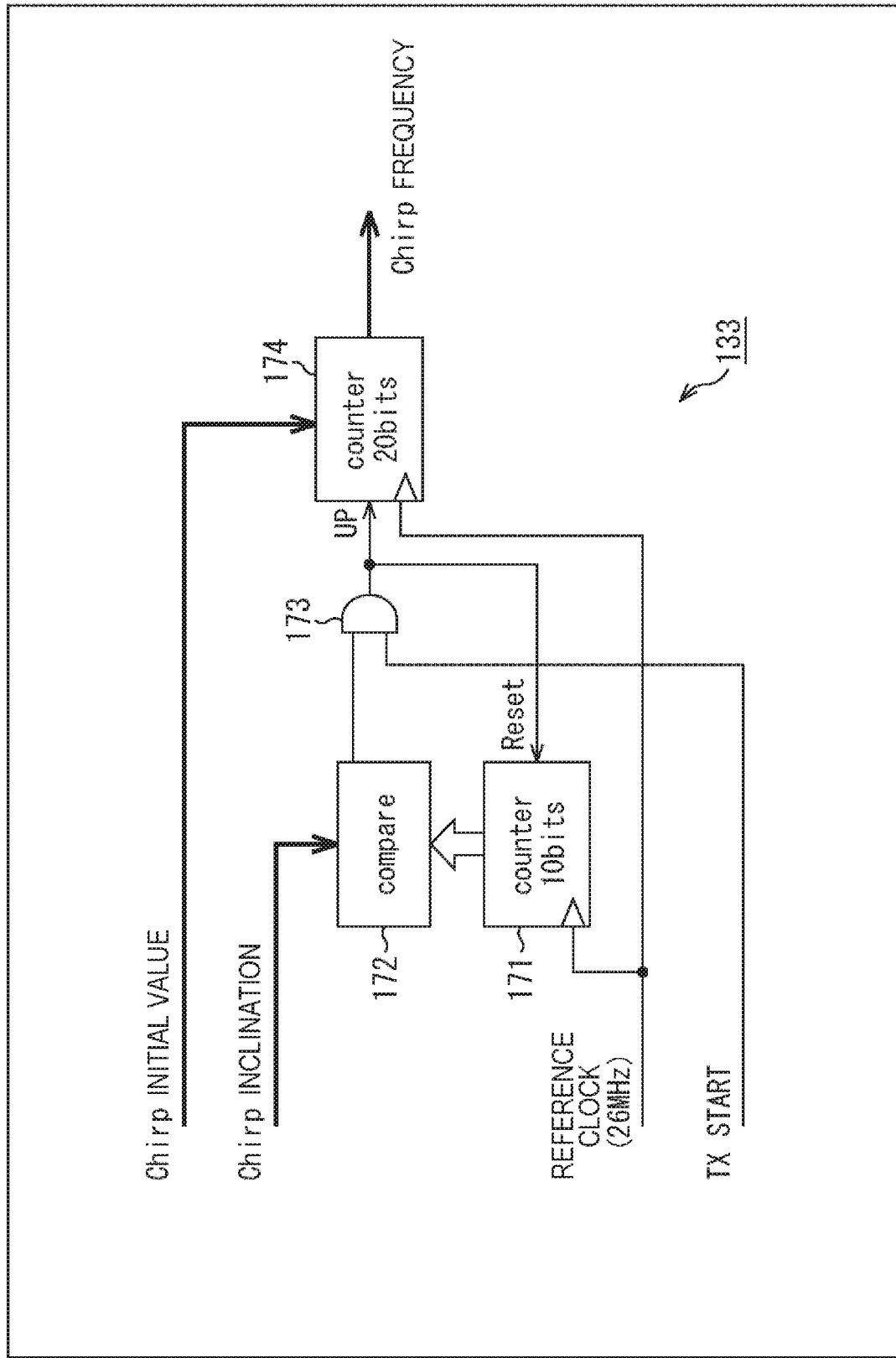
FIG. 8 is a diagram illustrating a main configuration example of a chirp generating unit.

FIG. 8 is a diagram illustrating a main configuration example of the chirp generating unit 133 of FIG. 6. As illustrated in FIG. 8, the chirp generating unit 133 has a counter (counter 10 bits) 171, a comparing unit (compare) 172, an AND gate 173, and a counter (counter 20 bits) 174. These are configured as illustrated in FIG. 8.

With this configuration, the chirp generating unit 133 is able to generate the chirp signal on the basis of the initial value and the inclination of the chirp supplied from the CPU 131, the control signal TX START supplied from the timing controller 141, and the reference clock (26 MHz) generated by the reference clock generating unit 135.

<Timing Controller>

Figure 9:
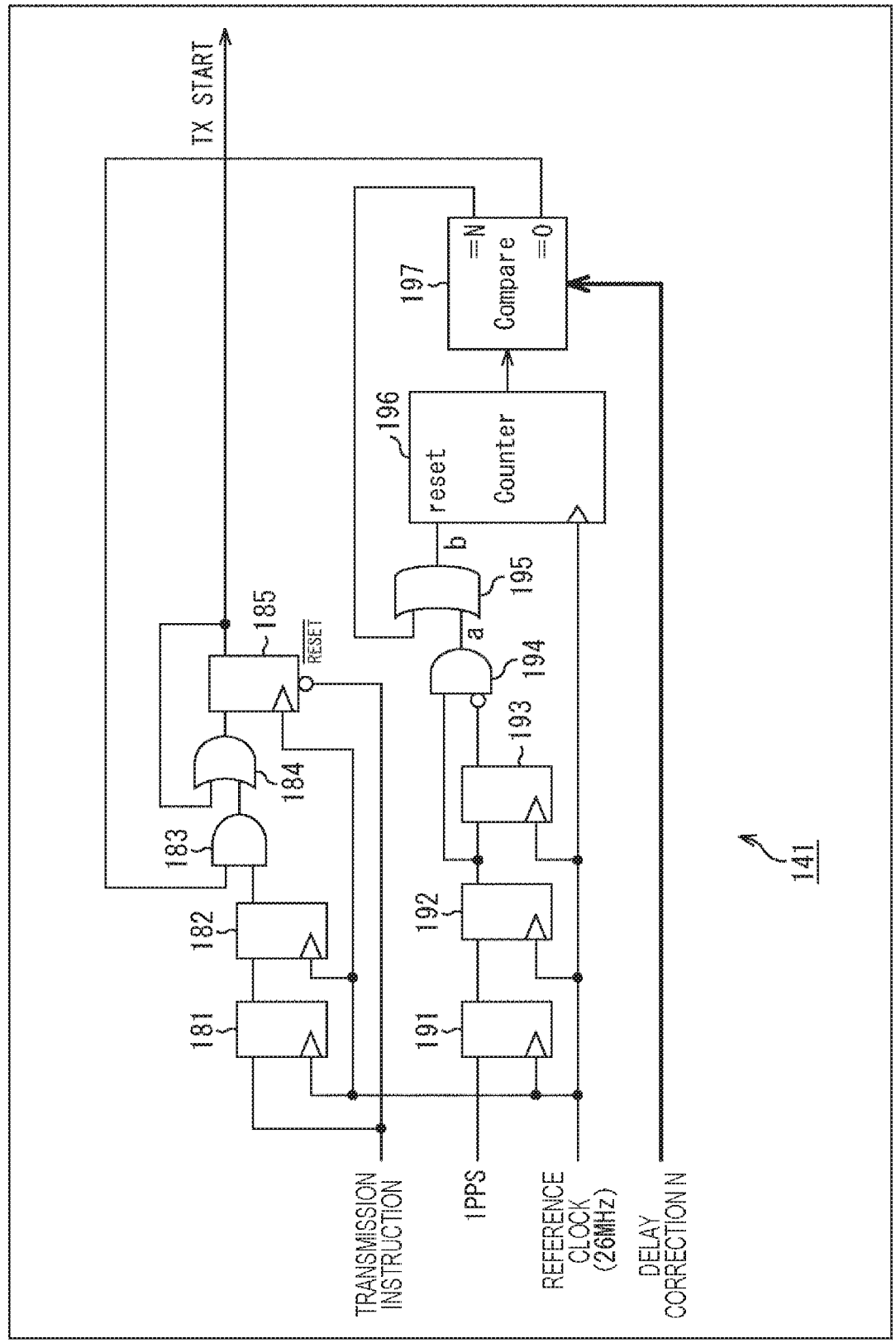
FIG. 9 is a diagram illustrating a main configuration example of a timing controller.

FIG. 9 is a block diagram illustrating a main configuration example of the timing controller 141 in FIG. 6. As illustrated in FIG. 9, the timing controller 141 includes a flip flop 181, a flip flop 182, an AND gate 183, an OR gate 184, a flip flop 185, a flip flop 191, a flip flop 192, a flip flop 183, an AND gate 194, an OR gate 195, a counter (Counter) 196, and a comparing unit (Compare) 197. These are configured as illustrated in FIG. 9.

With this configuration, the timing controller 141 is able to generate the control signal TX START on the basis of the transmission instruction or the delay correction supplied from the CPU 131, the information indicating 1 PPS supplied from the GPS signal receiving unit 140, the reference clock (26 MHz) generated by the reference clock generating unit 135, and supplies the control signal TX START to the respective processing units described above.

Figure 10:
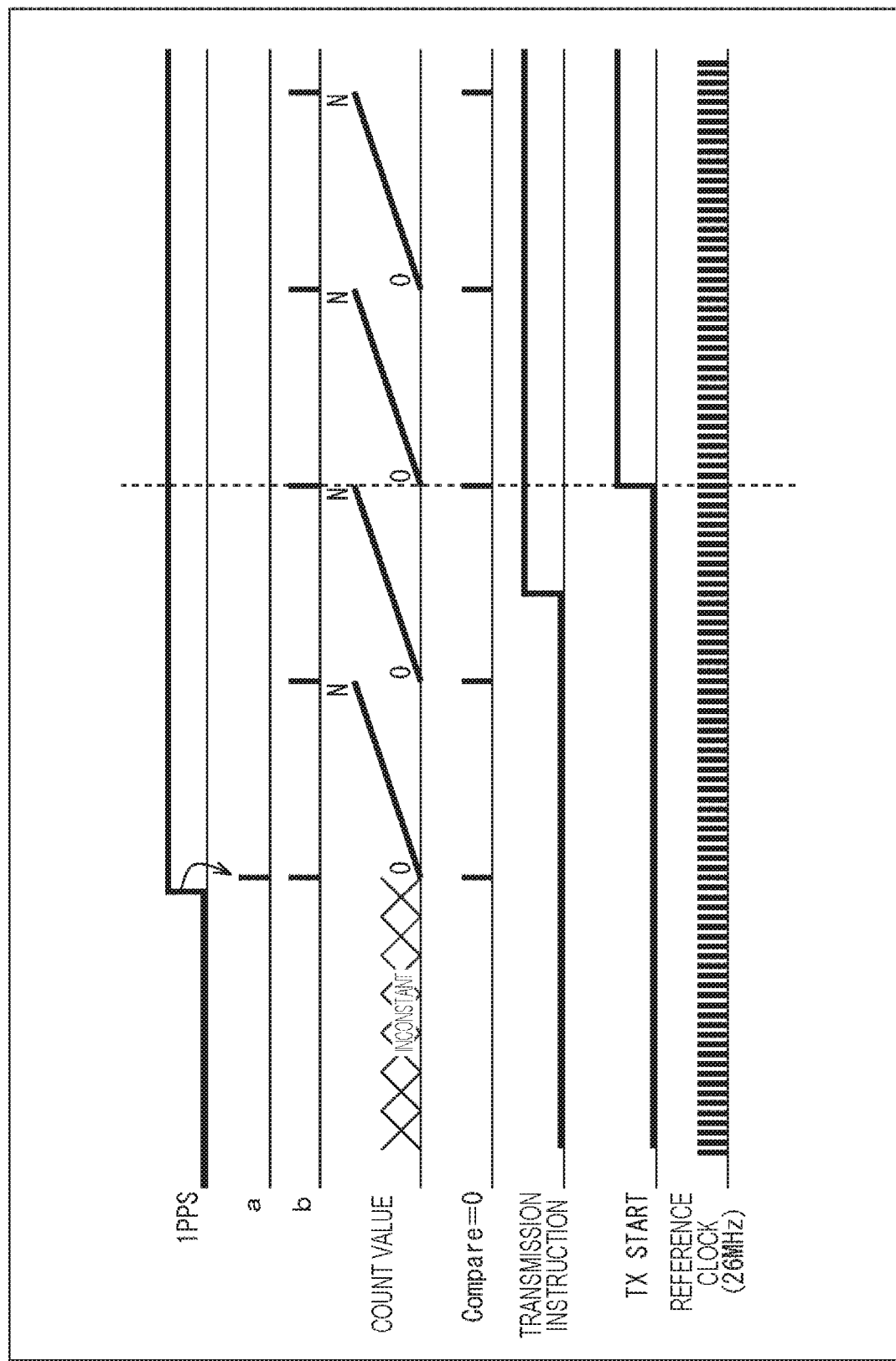
FIG. 10 is a diagram illustrating an example of an aspect of an operation of a timing controller.

Further, an example of aspects of signals when the timing controller 141 operates is illustrated in FIG. 10. As illustrated in FIG. 10, even when the transmission instruction is supplied, the value of the control signal TX START does not become "1" until a timing at which the count value is reset (a timing indicated by a dotted line in FIG. 10). In other words, the transmission signal is not transmitted. In other words, the value of the control signal TX START is "1" at the timing at which the count value is reset. In other words, the transmission signal is transmitted at this timing. As described above, the timing controller 141 is able to control the transmission timing of the transmission signal using the control signal TX START.

<Flow of Transmission Process>

Figure 11:
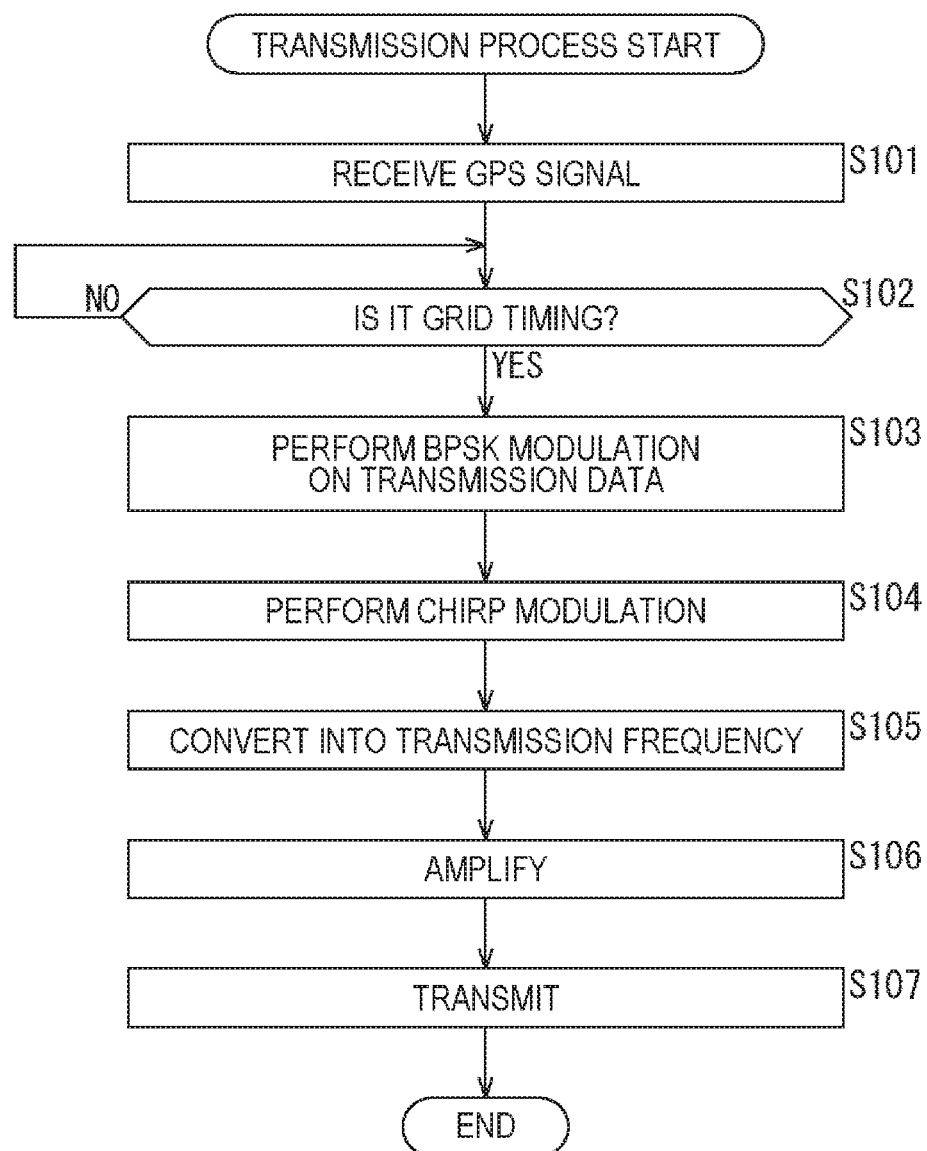
FIG. 11 is a flowchart for describing an example of a flow of a transmission process.

Next, a process executed by the transmitting device 101 will be described. First, an example of the flow of a transmission process executed when the transmitting device 101 transmits a packet will be described with reference to the flowchart of FIG. 11.

If the transmission process is started, in step S101, the GPS receiving unit 140 receives the GPS signal via the antenna 139. The GPS receiving unit 140 supplies the information indicating 1 PPS to the timing controller 141 on the basis of the received GPS signal.

In step S102, the timing controller 141 determines whether or not it is the grid timing (the grid time), that is, a timing known to the reception side. As described above, the known timing is obtained on the basis of the identification information and the time of the transmitting device 101. In a case where it is determined not to be the grid timing, it is on standby until it becomes the grid timing. In a case where it is determined to be the grid timing (a known timing at which the transmission instruction is received, and packet data can be transmitted), the process proceeds to step S103.

In step S103, the BPSK modulating unit 132 acquires the transmission data (modulation data including the synchronization signal) from the CPU 131 and performs the BPSK modulation.

In step S104, the chirp modulating unit 134 chirp-modulates the BPSK-modulated transmission data obtained by the process of step S103 using the chirp signal generated by the chirp generating unit 133. The chirp modulation is performed such that a transmission signal of a channel which is obtained on the basis of the identification information and the time of the transmitting device 101 and known to the reception side is generated.

In step S105, the PLL 136 converts the chirp-modulated transmission signal obtained in step S104 into a transmission frequency.

In step S106, the high-efficiency amplifying unit 137 amplifies the transmission signal converted into the transmission frequency. In step S107, the high-efficiency amplifying unit 137 transmits the amplified transmission signal via the antenna 138 as the radio signal.

If the process of step S107 is completed, the transmission process ends.

The transmitting device 101 executes the above-described transmission process on data of each packet. Accordingly, the transmitting device 101 is able to transmit a plurality of chirp-modulated transmission signals at different transmission timings. As a result, the transmitting device 101 is able to multiplex a plurality of chirp-modulated transmission signals so that they can be separated (with no interference). In other words, it is possible to multiplex the transmission signals in the same channel of the 920 MHz band in Japan.

<High Sensitivity Receiving Device>

Figure 12:
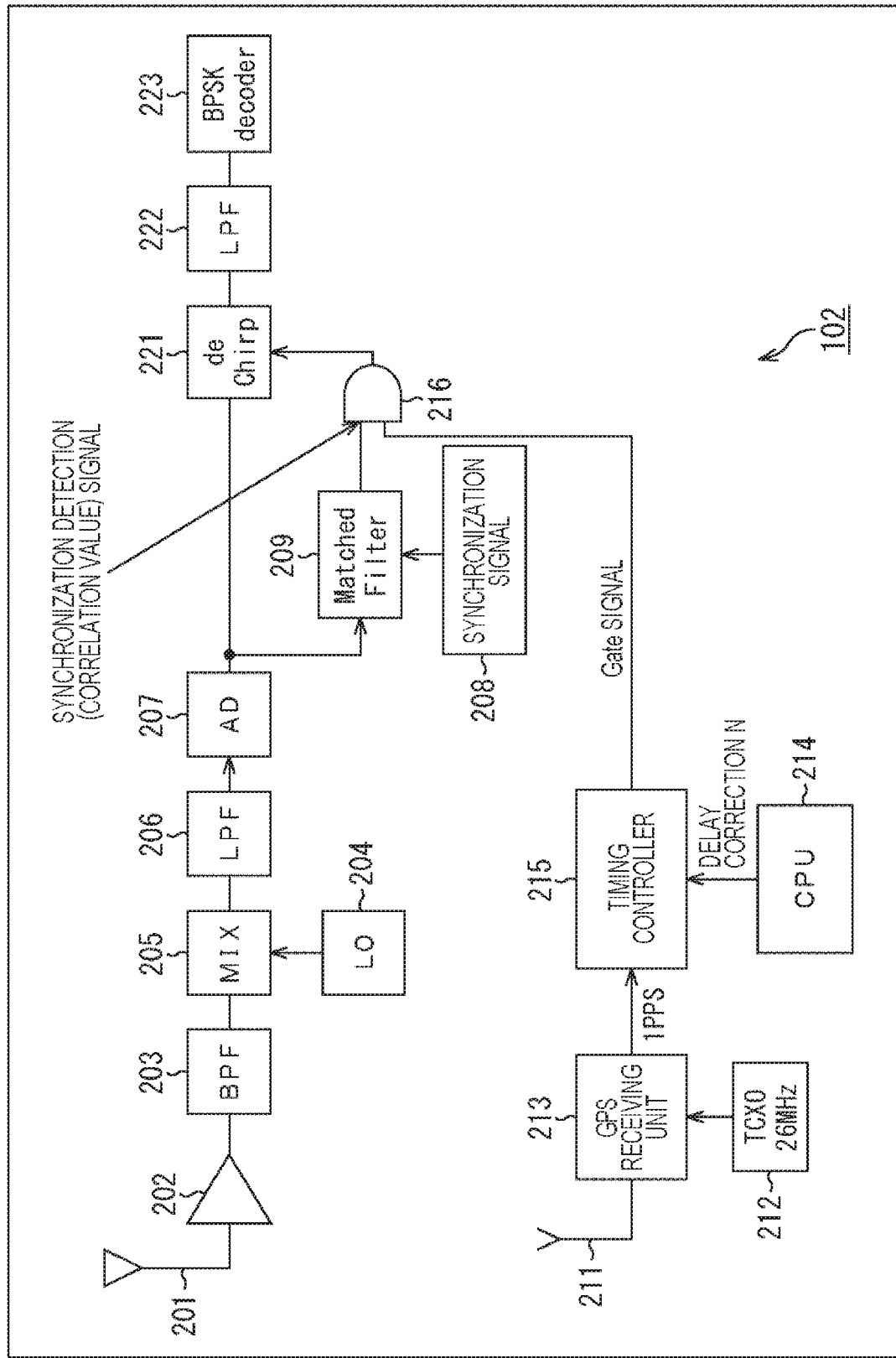
FIG. 12 is a block diagram illustrating a main configuration example of a high sensitivity receiving device.

Next, the high sensitivity receiving device 102 will be described. FIG. 12 is a diagram illustrating a main configuration example of the high sensitivity receiving device 102. As illustrated in FIG. 12, the high sensitivity receiving device 102 includes, for example, an antenna 201, a low noise amplifying unit 202, a band pass filter (BPF) 203, a carrier oscillating unit 204, a multiplying unit 205, an LPF 206, an AD 207, a synchronization signal generating unit 208, and a matched filter 209. Further, the high sensitivity receiving device 102 includes, for example, an antenna 211, a reference clock generating unit (TCXO 26 MHz) 212, a GPS receiving unit 213, a CPU 214, a timing controller 215, and an AND gate 216. Further, the high sensitivity receiving device 102 includes a dechirping unit 221, an LPF 222, and a BPSK demodulating unit (BPSK decoder) 223.

The low noise amplifying unit 202 receives the radio signal (for example, the transmission signal transmitted from the transmitting device 101) via the antenna 201, amplifies the reception signal, and supplies the amplified reception signal to the BPF 203. The BPF 203 removes an unnecessary frequency component from the reception signal and supplies the resulting reception signal to the multiplying unit 205. The carrier oscillating unit 204 generates a carrier frequency signal of a predetermined frequency used for transmission and reception. For example, in a case where a signal transmitted at the 920 MHz band is received, the carrier oscillating unit 204 performs oscillation at 925 MHz and supplies the oscillation signal (carrier signal) to the multiplying unit 205.

The multiplying unit 205 multiplies the reception signal supplied from the BPF 203 by the carrier signal supplied from the carrier oscillating unit 204 and supplies the resulting reception signal to the LPF 206. The LPF 206 cuts off a high frequency component of the reception signal and supplies the resulting reception signal to the AD 207. The AD 207 performs A/D conversion on the reception signal in which the high frequency component is cut off, and supplies the resulting reception signal to the matched filter 209 and the dechirping unit 221.

The synchronization signal generating unit 208 generates a predetermined synchronization signal and supplies the generated synchronization signal to the matched filter 209. The matched filter 209 compares digital data of the reception signal supplied from the AD 207 with the predetermined synchronization signal supplied from the synchronization signal generating unit 208 and supplies information indicating a comparison result to the AND gate 216.

The reference clock generating unit 212 generates a predetermined reference clock and supplies the generated reference clock to the GPS receiving unit 213. The GPS receiving unit 213 operates in synchronization with the reference clock and receives the GPS signal via the antenna 211. The GPS receiving unit 213 supplies information indicating 1 PPS to the timing controller 215 on the basis of the GPS signal.

The CPU 214 obtains the delay correction N and supplies the delay correction N to the timing controller 215. The timing controller 215 generates a gate signal for controlling a demodulation timing using the information indicating 1 PPS supplied from the GPS receiving unit 213 and the delay correction N and supplies the gate signal to the AND gate 216. In a case where the gate signal supplied from the timing controller 215 and the information indicating the comparison result supplied from the matched filter 209 are both true (1), the AND gate 216 supplies a control signal for giving an instruction to start demodulation to the dechirping unit 221.

When the transmission signal is received, the CPU 214 obtains the reception channel and the reception timing on the basis of the identification information of the transmitting device 101 stored in a memory (not illustrated) in the high sensitivity receiving device 102 and the time indicated by the information included in the GPS signal received by the GPS receiving unit 213. The CPU 214 sets the obtained reception channel and the reception timing in the respective units such as the timing controller 215.

In a case where the instruction to start the demodulation is given from the AND gate 216, the dechirping unit 221 dechirps the digital data of the reception signal supplied from the AD 207 and supplies a dechirp result to the LPF 222. The LPF 222 cuts off a high frequency component of the dechirp result and supplies the dechirp result after the cut off to the BPSK demodulating unit 223. The BPSK demodulating unit 223 performs the BPSK demodulation on the supplied information.

<Timing Controller>

Figure 13:
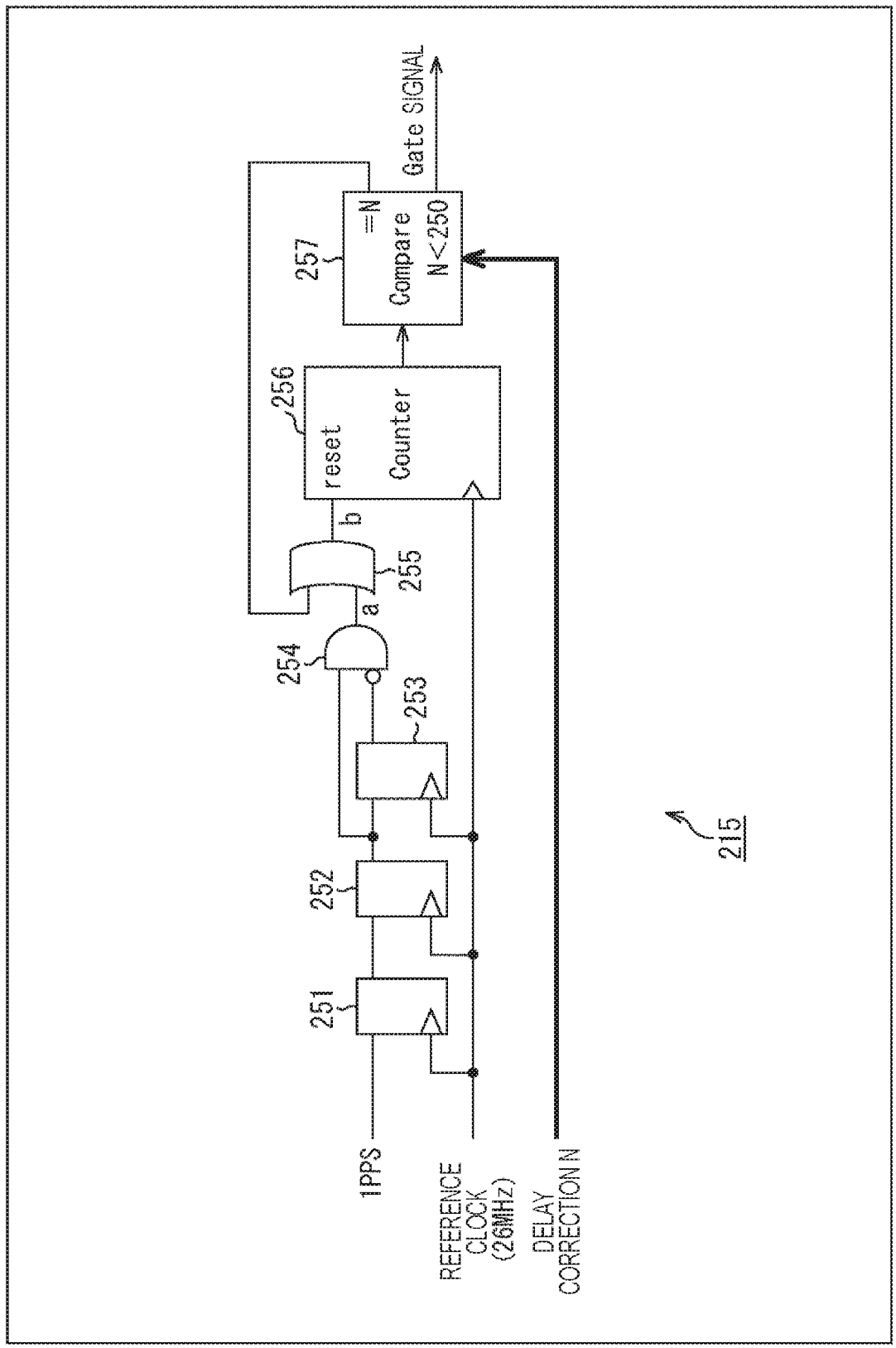
FIG. 13 is a diagram illustrating a main configuration example of a timing controller.

FIG. 13 is a block diagram illustrating a main configuration example of the timing controller 215 of FIG. 12. As illustrated in FIG. 13, the timing controller 215 has a flip flop 251, a flip flop 252, a flip flop 253, a NAND gate 254, an OR gate 257, a counter (Counter) 258, and a comparing unit (Compare) 257. These are configured as illustrated in FIG. 13.

With this configuration, the timing controller 215 is able to generate the gate signal on the basis of the information indicating 1 PPS supplied from the GPS receiving unit 213, the reference clock supplied from the reference clock generating unit 212, and the delay correction N supplied from the CPU 214.

Figure 14:
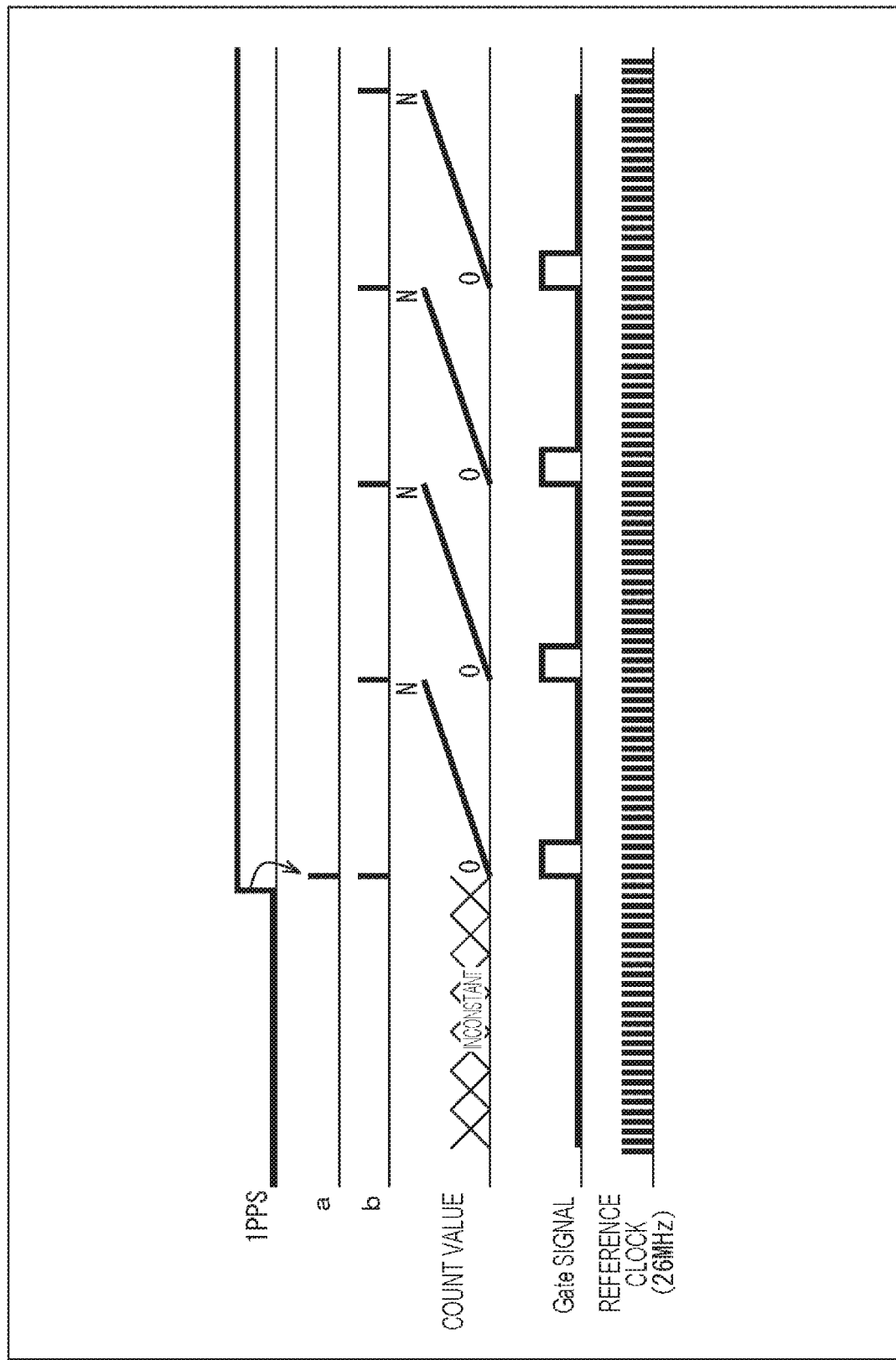
FIG. 14 is a diagram illustrating an example of an aspect of an operation of a timing controller.

Further, an example of aspects of the respective signals when the timing controller 215 operates is illustrated in FIG. 14. As illustrated in FIG. 14, the information indicating 1 PPS is in an ON state, and the gate signal is in an ON state for a predetermined period after a count value is reset. In other words, the reception signal is demodulated at this timing. As described above, the timing controller 215 is able to control the demodulation timing using the gate signal.

<Flow of Reception Process>

Figure 15:
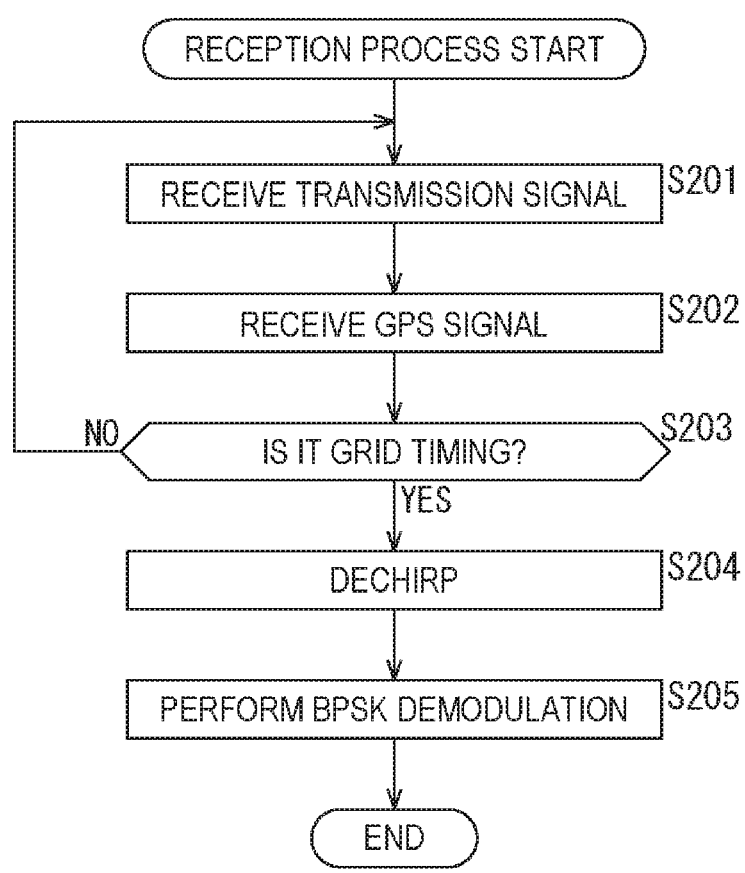
FIG. 15 is a flowchart for describing an example of a flow of a reception process.

Next, a process executed by the high sensitivity receiving device 102 will be described. First, an example of the flow of a reception process executed when the high sensitivity receiving device 102 receives a packet will be described with reference to the flowchart of FIG. 15.

If the reception process is started, in step S201, the low noise amplifying unit 202 receives the transmission signal transmitted from the transmitting device 101 via the antenna 201. In step S202, the GPS receiving unit 213 receives the GPS signal transmitted from the GPS satellite via the antenna 211.

In step S203, the timing controller 215 determines whether or not a current time is the grid timing (known grid time) on the basis of the GPS signal received by the GPS receiving unit 213. In a case where the current time is determined not to be the grid time, the process returns to step S201, and the process of step S201 and subsequent steps is repeated. Further, on the other hand, in a case where it is determined in step S203 that the current time is the grid timing, the process proceeds to step S204.

In step S204, the dechirping unit 221 dechirps the reception signal. In step S205, the BPSK demodulating unit 223 performs the BPSK demodulation on the dechirped reception signal.

If the process of step S205 ends, the reception process ends.

The high sensitivity receiving device 102 executes the above reception process on data of each packet. As a result, the high sensitivity receiving device 102 is able to dechirp a plurality of multiplexed chirp-modulated transmission signals transmitted at different transmission timings from the transmission side at timings corresponding to the respective transmission timings. Therefore, it is possible to separate and demodulate the transmission signals (packets) (with no interference). In other words, it is possible to implement multiplexing of the transmission signals in the same channel of the 920 MHz band in Japan.

2. Second Embodiment

<Application Example: Sharing of Reference Clock>

The configuration example of the transmitting device 101 according to the first embodiment has been described with reference to FIG. 6. Here, the configuration of the transmitting device 101 is arbitrary and not limited to this example. For example, the GPS receiving unit 140 may operate on the basis of a reference clock shared with the other units.

Figure 16:
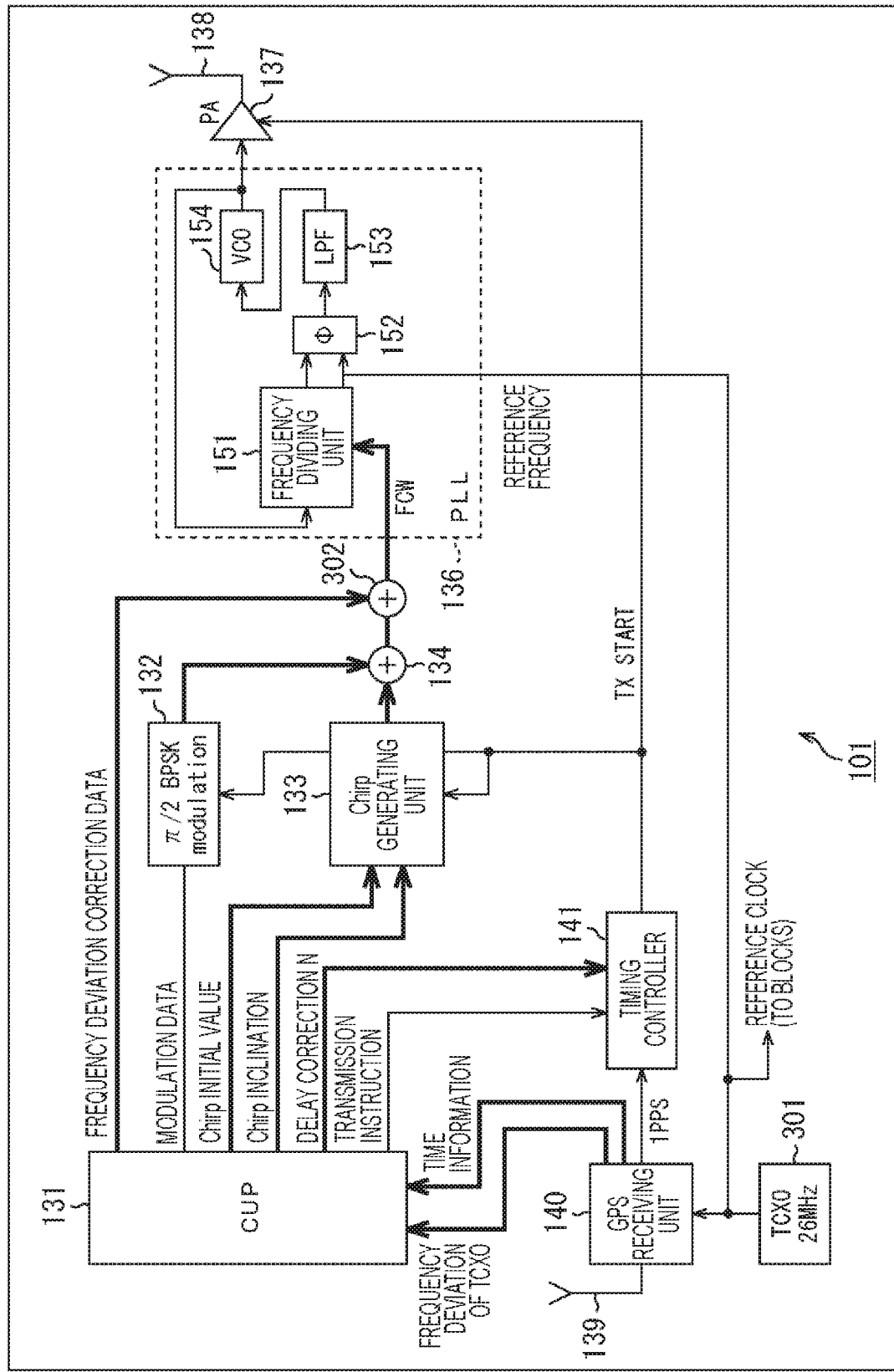
FIG. 16 is a block diagram illustrating a main configuration example of a transmitting device.

A main configuration example of the transmitting device 101 in this case is illustrated in FIG. 16. As illustrated in FIG. 16, in this case, the main configuration is basically similar to the example of FIG. 6, but, for example, a reference clock generating unit 301 and a correcting unit 302 are provided instead of the reference clock generating unit 135.

The reference clock generating unit 301 supplies the generated reference clock to the respective processing units as in an example of FIG. 6. The reference clock generating unit 301 also supplies the generated reference clock to the GPS receiving unit 140.

In this case, the GPS receiving unit 140 operates on the basis of the reference clock. Here, the reference clock is considered to deviate from the time information included in the GPS signal. Therefore, the GPS receiving unit 140 indicates the deviation of the reference clock from the time information included in the GPS signal as a frequency deviation of the reference clock, and supplies the frequency deviation of the reference clock to the CPU 131.

The CPU 131 generates frequency deviation correction data for correcting the frequency deviation of the reference clock on the basis of the frequency deviation of the reference clock. Further, the CPU 131 supplies the frequency deviation correction data to the correcting unit 302.

The correcting unit 302 corrects the modulation data chirp-modulated in the chirp modulating unit 134 using the frequency deviation correction data supplied from the CPU 131.

As a result, it is possible to share the reference clock generating unit without increasing the error. Accordingly, it is possible to suppress an increase in load and cost.

<Application Example: Chirp Signal>

Figure 17:
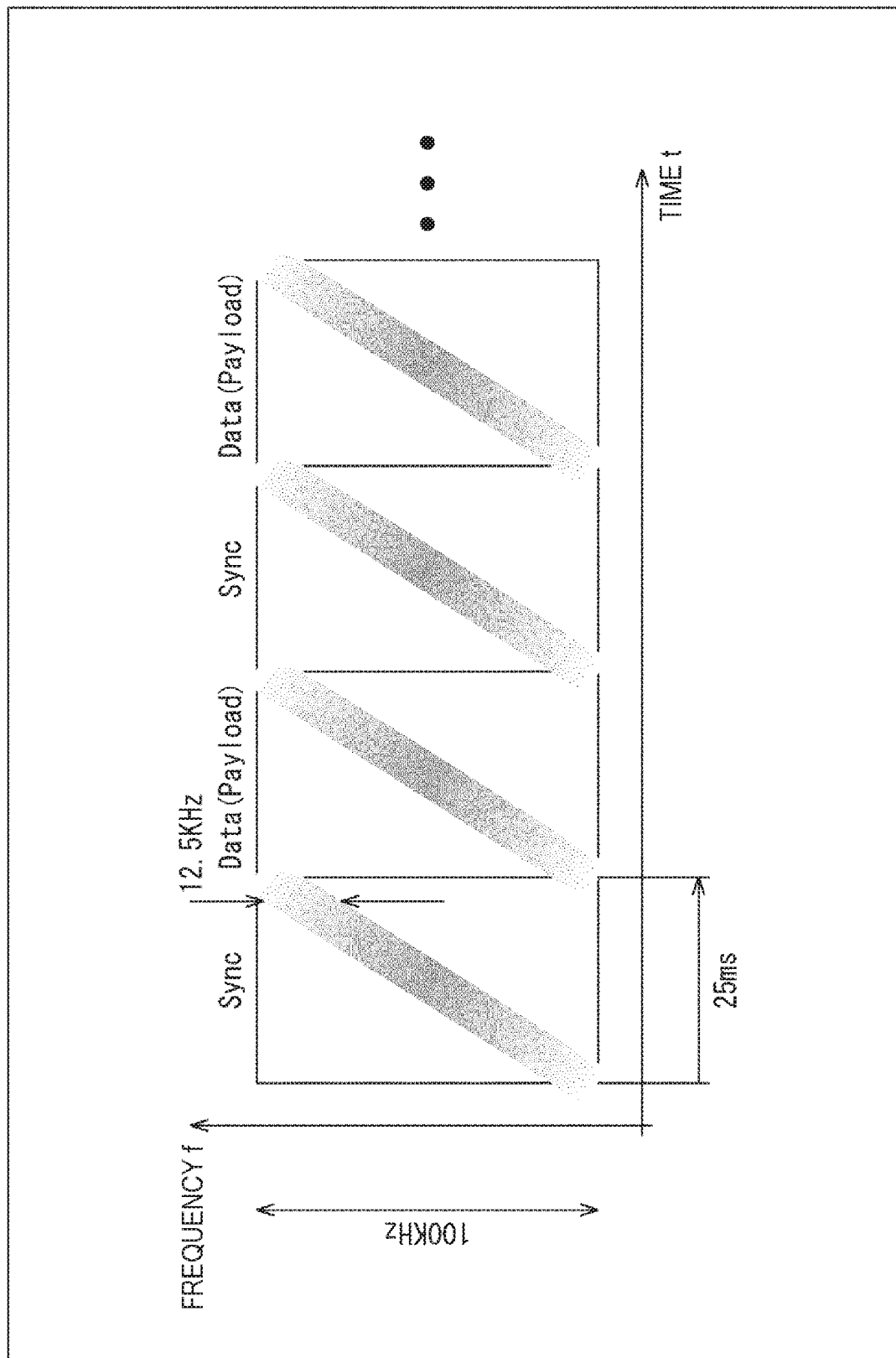
FIG. 17 is a diagram illustrating an example of a chirp signal.

Further, a transmission signal of one packet may be divided into a plurality of chirp signals as in an example illustrated in FIG. 17. For example, as illustrated in FIG. 17, a synchronization signal (Sync) known to the reception side and data (Payload) unknown to the reception side may be alternately arranged in units of symbols serving as a modulation unit, and each symbol may undergo the chirp modulation independently.

Figure 18:
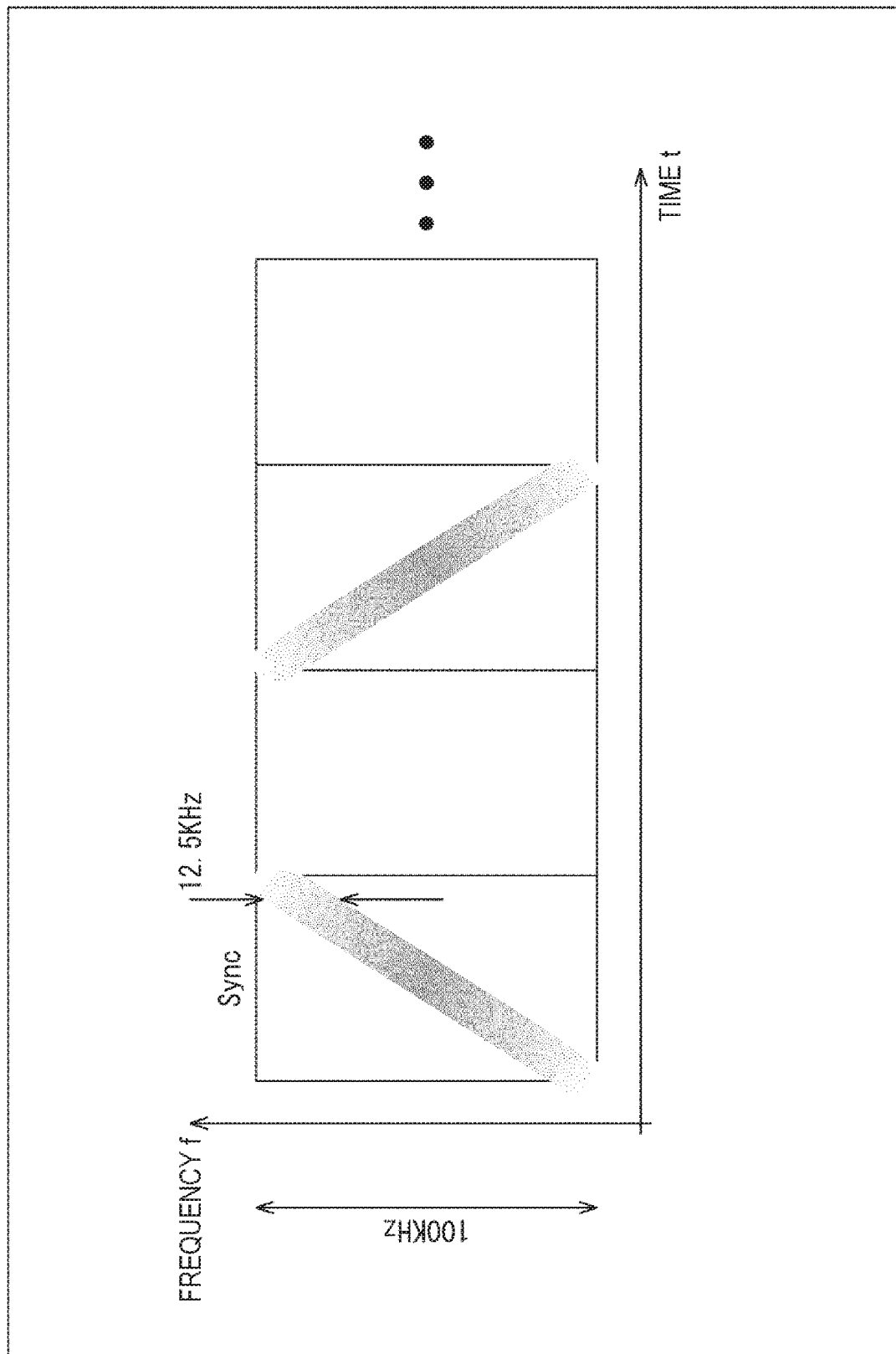
FIG. 18 is a diagram illustrating an example of a chirp signal.

Further, in the above example, the frequency of the chirp signal has been described as changing toward the high frequency over time, but the change direction of the chirp signal is arbitrary. For example, the frequency of the chirp signal may change toward the low frequencies over time. Further, as illustrated in FIG. 18, for example, a chirp signal having a frequency changing toward the high frequency over time and a chirp signal having a frequency changing towards the low frequency over time may be mixed.

3. Third Embodiment

<Antitheft System>

In the above example, the position notification system 100 has been described as an example, but the present technology can be applied to any communication system. For example, the transmitting device 101 may be installed on a moving object or the like in addition to a person.

Figure 19:
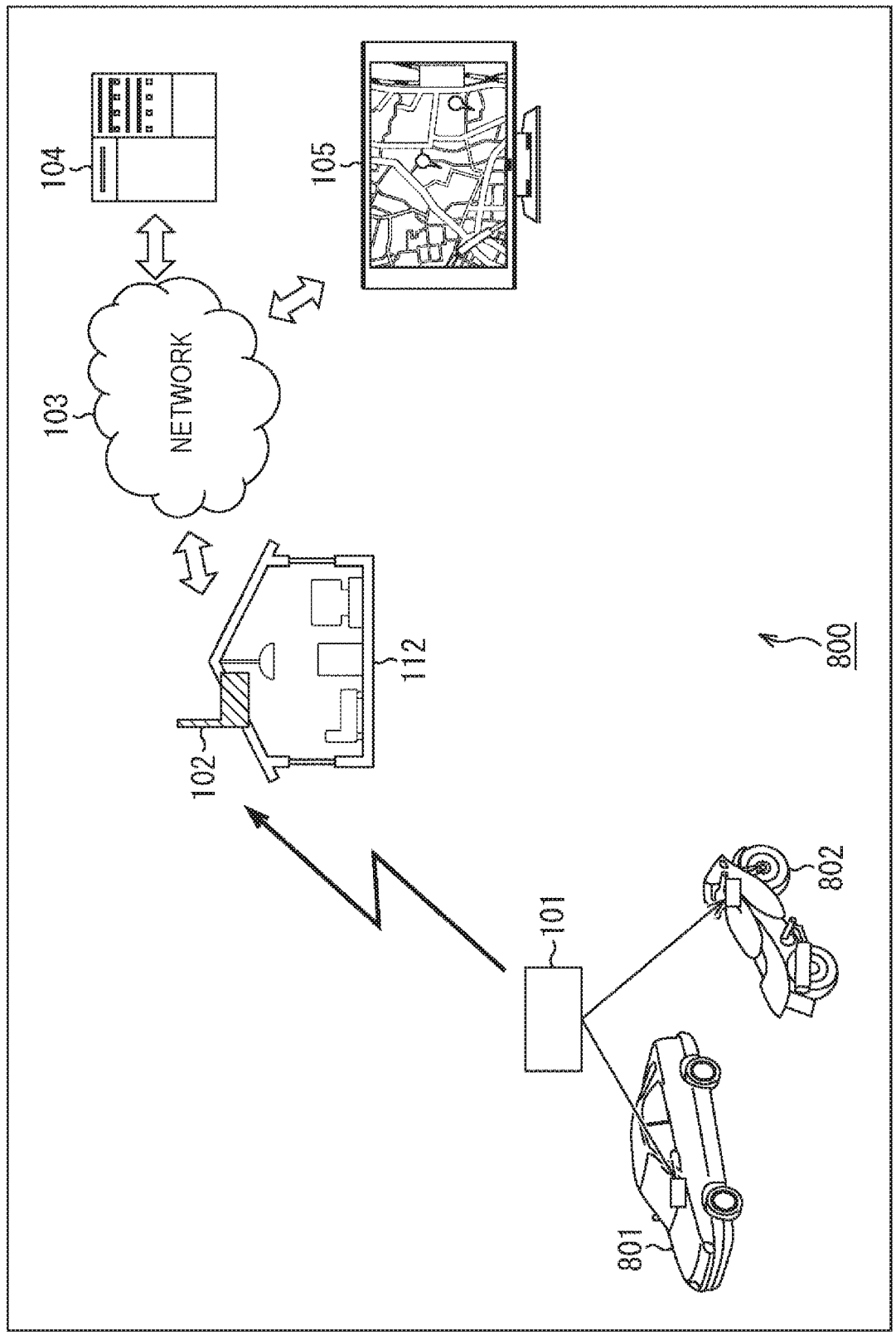
FIG. 19 is a diagram illustrating a main configuration example of an antitheft system.

For example, the present technology can be applied to an antitheft system 800 for preventing theft of a vehicle, a motorbike, or the like as illustrated in FIG. 19. In the case of the antitheft system 800, the transmitting device 101 is installed in an object whose position is monitored, for example, a vehicle 801 or a motorbike 802 owned by the user. The transmitting device 101 informs the high sensitivity receiving device 102 of its position information (that is, the position information of the vehicle 801 or the motorbike 802) appropriately, similarly to the example of the position notification system 100. In other words, the user is able to access the server 104 from the terminal device 105 and know the position of the vehicle 801 or the motorbike 802 as in the example of the position notification system 100. Therefore, since the user is able to know the position of the vehicle 801 or the motorbike 802 even in a case where it is stolen, it is possible to easily find the vehicle 801 or the motorbike 802.

In the case of the antitheft system 800, similarly to the example of the position notification system 100, the present technology can be applied to the transmitting device 101 and the high sensitivity receiving device 102. Further, by applying the present technology, it is possible to multiplex the transmission signals in the same channel of the 920 MHz band.

<Other Communication Systems>

Further, information which is transmitted or received is arbitrary. For example, the CPU 131 of the transmitting device 101 may generate transmission information including an image, an audio, measurement data, identification information of a device, parameter setting information, control information such as a command, or the like. Further, for example, the transmission information may include two or more kinds of information such as an image, an audio, identification information, setting information, and control information.

Further, for example, the CPU 131 may be able to generate transmission information including information supplied from other devices. For example, the CPU 131 may be configured to generate transmission information including information (sensor output) output from various kinds of sensors which perform detection, measurement, or the like on an arbitrary variable such as an image, light, brightness, saturation, electricity, a sound, vibration, acceleration, a speed, an angular velocity, force, a temperature (which is not a temperature distribution), humidity, a distance, an area, a volume, a shape, a flow rate, a time, magnetism, a chemical substance, smell, or the like or an amount of change thereof.

In other words, the present technology can be applied to systems used for arbitrary purposes such as 3D shape measurement, space measurement, object observation, movement deformation observation, biometric observation, authentication processing, monitoring, autofocus, imaging control, lighting control, tracking processing, input/output control, electronic device control, actuator control, or the like.

Further, the present technology can be applied to systems in arbitrary fields such as traffic, medical care, crime prevention, agriculture, livestock industry, mining, beauty, factory, household appliance, weather, natural surveillance, and the like. For example, the present technology can also be applied to systems of capturing images provided for viewing using digital cameras, mobile devices with a camera function, and the like. Further, for example, the present technology can also be applied to systems used for traffic such as a vehicle system of photographing the front, the rear, the surroundings, the inside, and the like of a vehicle for safe driving such as automatic stop or driver state recognition, a monitoring camera system of monitoring traveling vehicles or roads, and a ranging system of measuring a distance between vehicles. Further, for example, the present technology can also be applied to systems used for security using a surveillance camera for crime prevention purposes, a camera for person authentication, and the like. Further, for example, the present technology can also be applied to systems used for sports using various kinds of sensors or the like which are able to be used for sports such as wearable cameras. Further, for example, the present technology can also be applied to systems used for agriculture using various kinds of sensors such as cameras for monitoring a state of fields and crops. Further, for example, the present technology can also be applied to systems used for livestock industry using various kinds of sensors for monitoring the state of livestock such as pigs and cattle. Further, the present technology can also be applied to a system of monitoring a state of nature such as volcanoes, forests, and oceans, a weather observation system of observing, for example, weather, temperature, humidity, wind speed, daylight hours, and the like, and a system of observing the ecology of wildlife such as birds, fish, reptiles, amphibians, mammals, insects, and plants.

<Communication Device>

Further, a specification of the radio signal or information which is transmitted and received is arbitrary. Further, in the above example, the present technology has been described as being applied to the transmitting device 101 and the high sensitivity receiving device 102, but the present technology can also be applied to an arbitrary transmitting device, an arbitrary receiving device, and an arbitrary transceiving device. In other words, the present technology can be applied to an arbitrary communication device or an arbitrary communication system.

4. Fourth Embodiment

<Transmission and Reception of Radio Signal and Interference>

As described above, the radio signal is assumed to be transmitted and received at the 920 MHz band. In Japan, the 920 MHz band is a frequency band released from July 2011 by the Ministry of Internal Affairs and Communications, and anyone can use it without a license. However, a maximum continuous transmission time is limited to 4 seconds due to a regulation (association of radio industries and businesses (ARIB)) STD T-108). Further, if the continuous transmission time is shortened to, for example, 0.2 seconds, more channels can be allocated, and transmission and reception can be performed with less interference.

Figure 20:
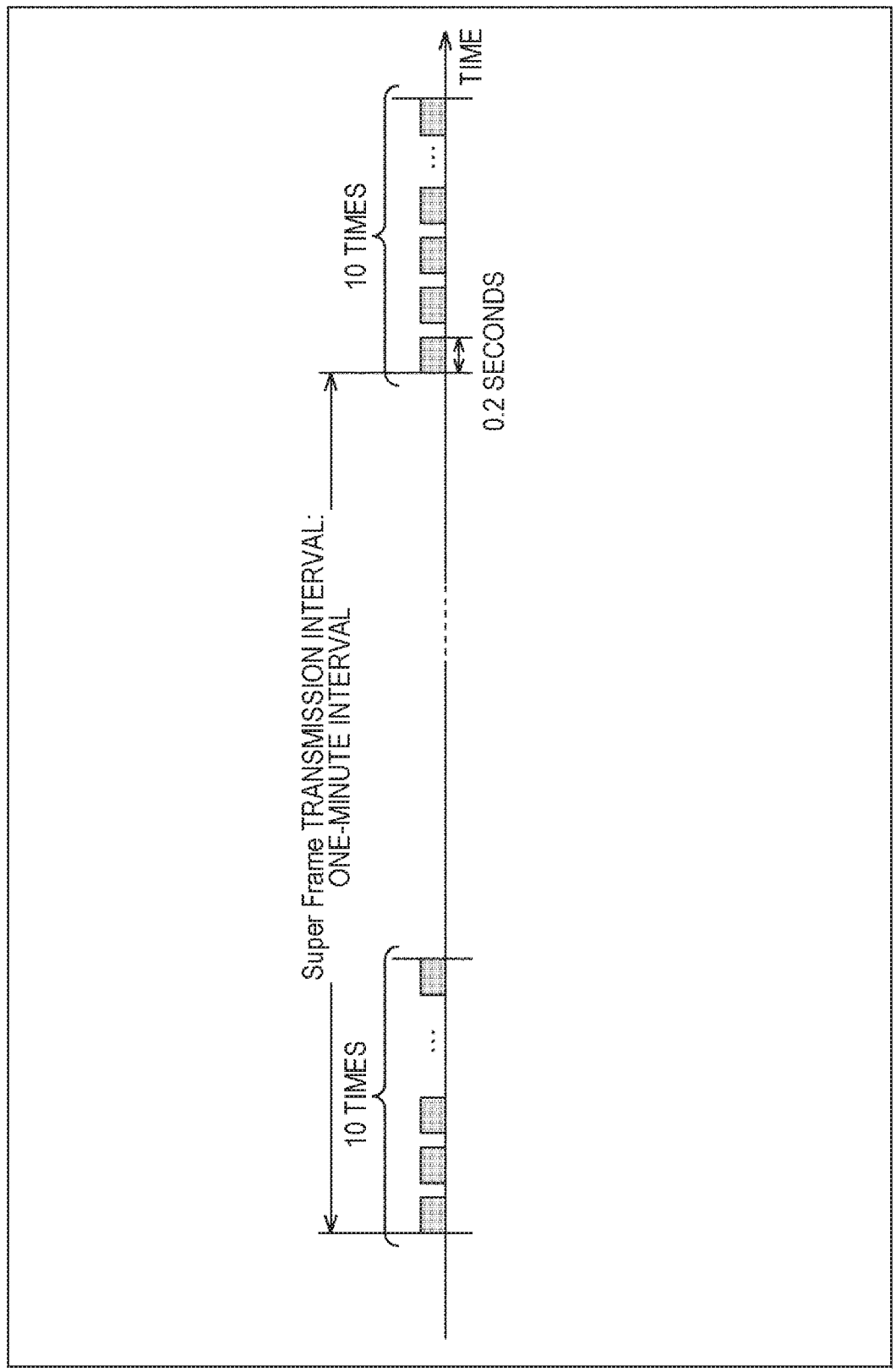
FIG. 20 is a diagram for describing an example of an aspect of transmission.

Meanwhile, in a case where information is transmitted through a radio signal, there is a method of transmitting and receiving the same packet twice or more in order to improve the S/N ratio of the reception signal. In an example of FIG. 20, a super frame of one minute is set, and the same packet is transmitted ten times during that time. Since carrier sensing is performed at the time of transmission, for example, the super frame of one minute is set for packet transmission of 10 times.

Figure 21:
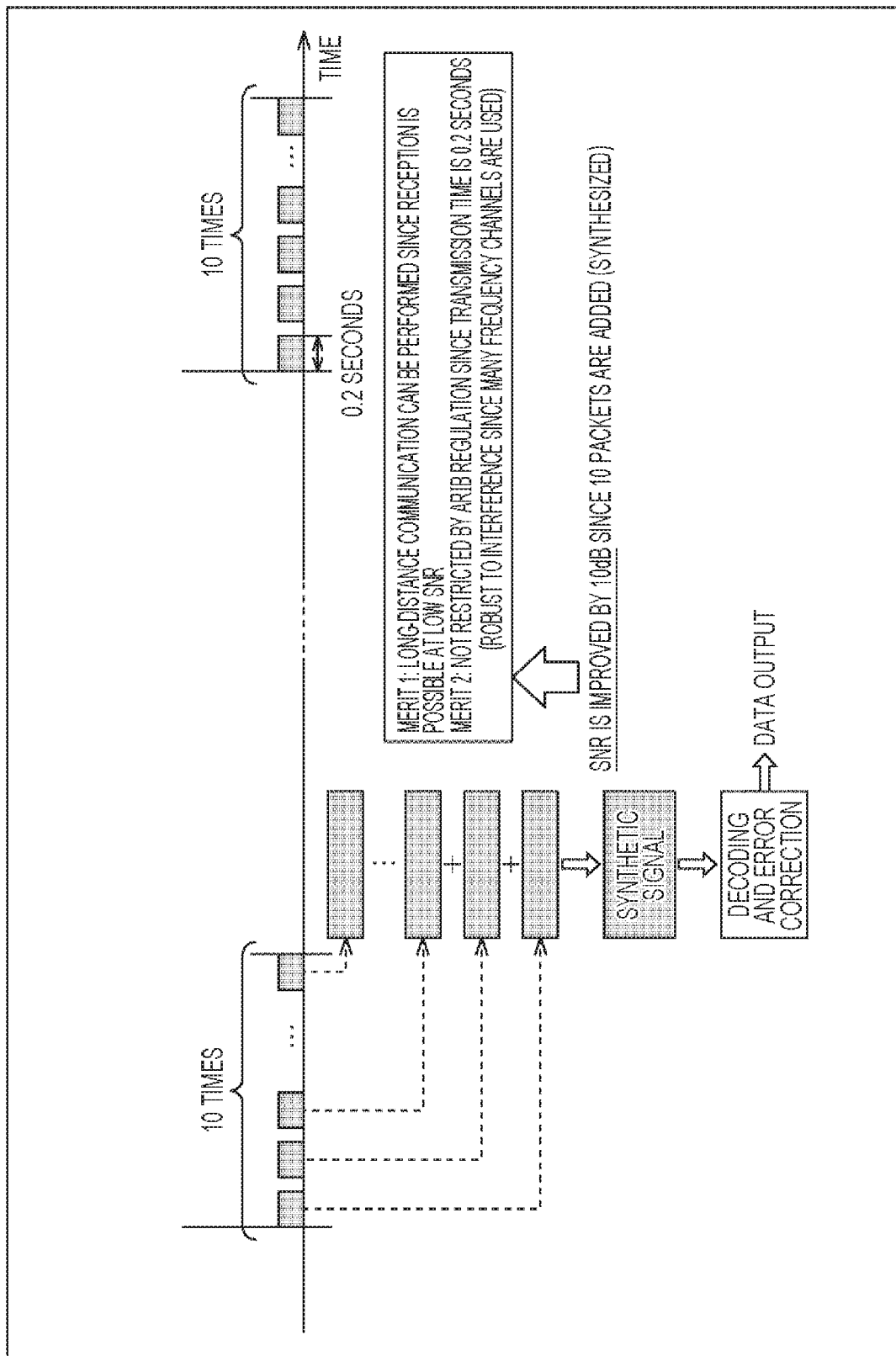
FIG. 21 is a diagram for describing an example of an aspect of transmission.

On the receiving side, if 10 packets are received, the packets are synthesized to generate a synthetic signal, and data is extracted from the synthetic signal and output as illustrated in FIG. 21. Accordingly, the S/N ratio can be improved. For example, by adding 10 packets, it is possible to improve the S/N ratio by about 10 dB. Therefore, since the reception can be performed even when the S/N ratio is low, longer-distance communication can be performed. Further, as described above, since the packet transmission time can be set to 0.2 seconds or less, more frequency channels can be used without being restricted by the ARIB regulation.

Figure 22:
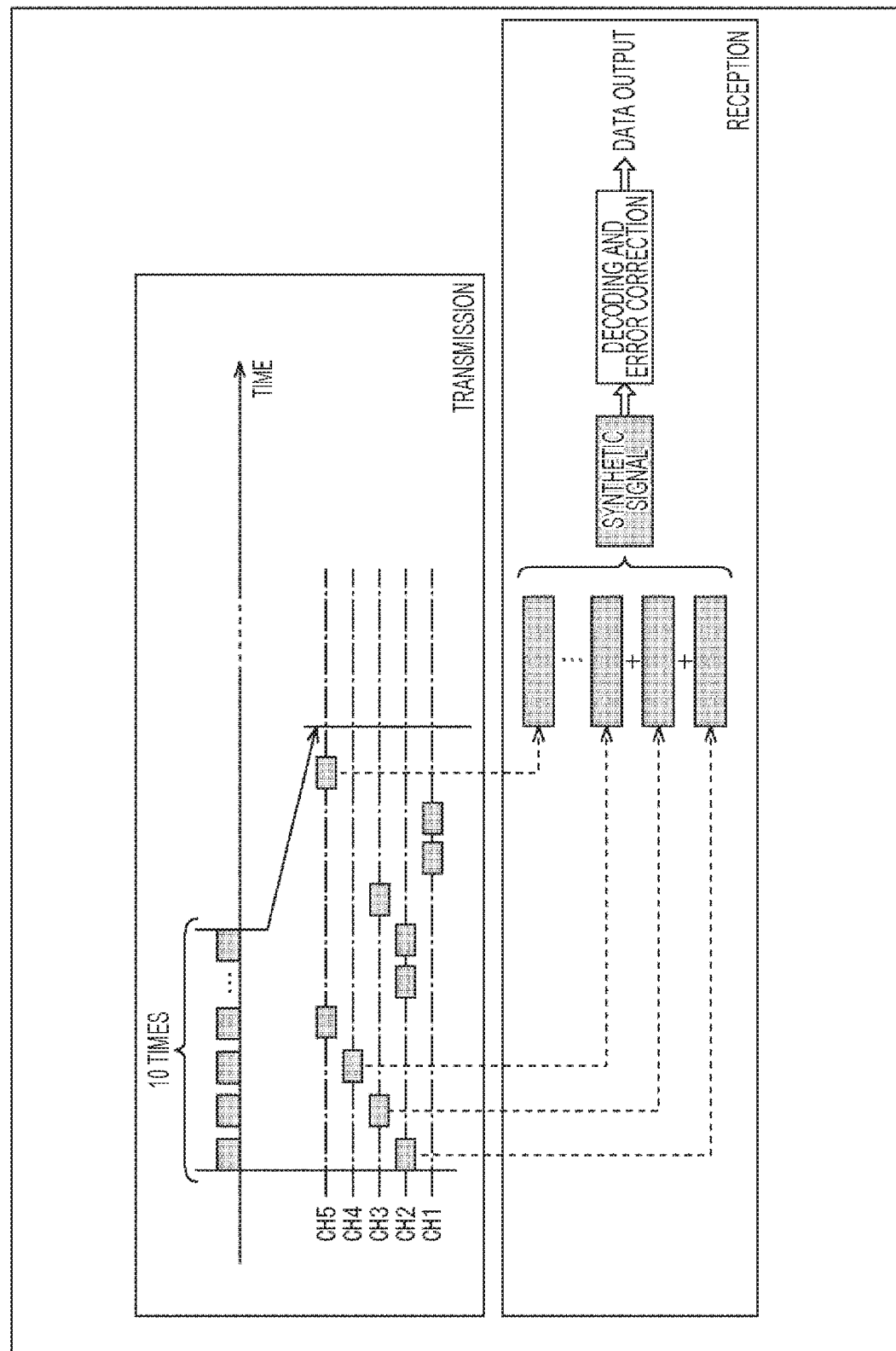
FIG. 22 is a diagram for describing an example of an aspect of transmission.

For example, it is possible to perform frequency hopping using a plurality of carrier frequencies. FIG. 22 illustrates an example of frequency hopping. In the case of the example of FIG. 22, five channels CH1 to CH5 are prepared, and one of the five channels is, for example, randomly selected and transmitted. Accordingly, it is possible to suppress the occurrence of interference.

Figure 23:
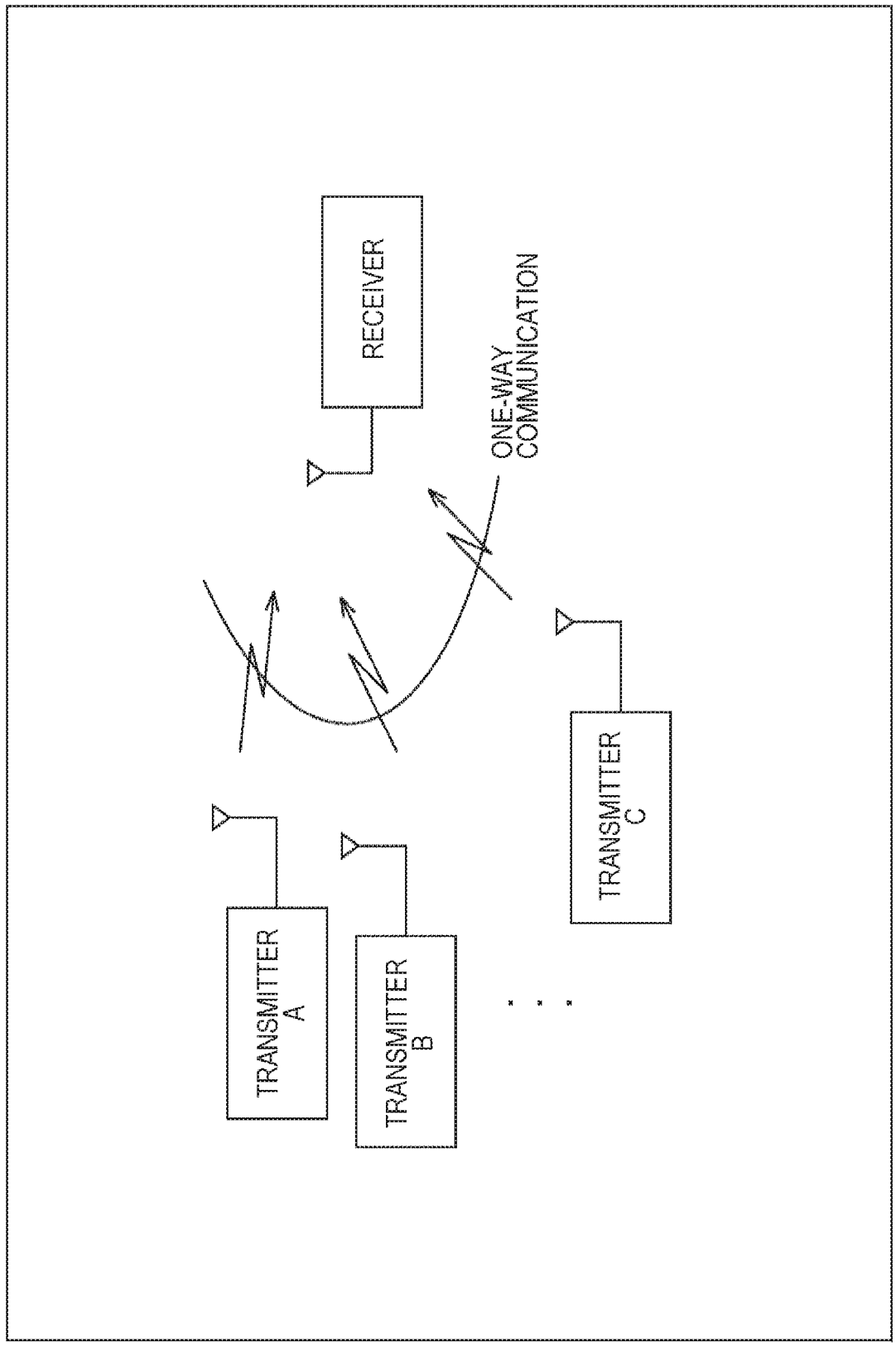
FIG. 23 is a diagram for describing an example of an aspect of transmission.

For example, if a plurality of transmitters (transmitters A to C) simultaneously transmit the radio signals at the same carrier frequency as illustrated in FIG. 23, interference occurs at the receiver, and each radio signal is unable to be correctly received. Therefore, by applying frequency hopping as in the example of FIG. 22, it is possible to reduce a possibility that the carrier frequencies will be the same, and it is possible to suppress the occurrence of interference accordingly.

Figure 24:
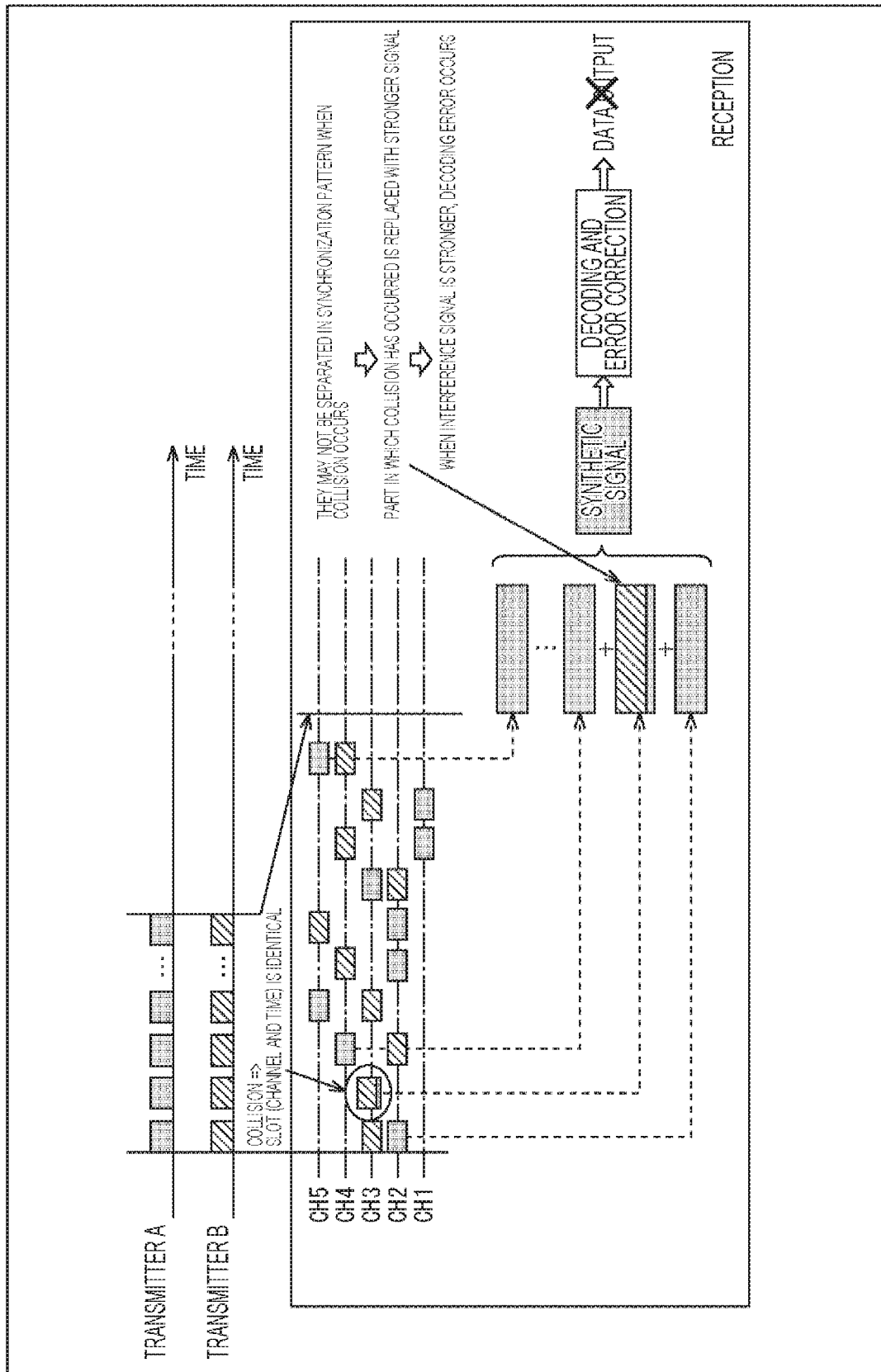
FIG. 24 is a diagram for describing an example of an aspect of the occurrence of interference.

However, even when this method is used, there is a possibility that the carrier frequency will be the same as those of the other radio signals, and the occurrence of interference is unable to be completely suppressed. For example, as illustrated in FIG. 24, a certain packet transmitted from the transmitter A and a certain packet transmitted from the transmitter B may have the same carrier frequency, and collision may occur. If such collision occurs, the packets may be unable to be separated at the reception side. Therefore, if the interference signal is stronger, a packet in which the collision has occurred is replaced with the interference signal side, and a signal error is likely to occur.

For example, in FIG. 24, the receiver is assumed to receive the radio signal transmitted from the transmitter A. Further, one of packets transmitted from the transmitter A is assumed to collide with a packet transmitted from the transmitter B, and a radio signal transmitted from the transmitter B is assumed to be stronger than a radio signal transmitted from the transmitter A. In this case, the receiver synthesizes the packet of the transmitter B in the collision has occurred as the packet transmitted from the transmitter A. Therefore, an error is likely to occur in the synthetic signal, and data is unlikely to be extracted. In this case, transmission and reception of 10 packets in the super frame are likely to be all wasted.

In the case of bidirectional communication, it is possible to use identification information or encourage retransmission by exchanging information with each other, but in the case of one-way communication, since information is unable to be supplied from the reception side to the transmission side, countermeasures against such packet collision is unable to be taken basically.

<Position Notification System>

Figure 25:
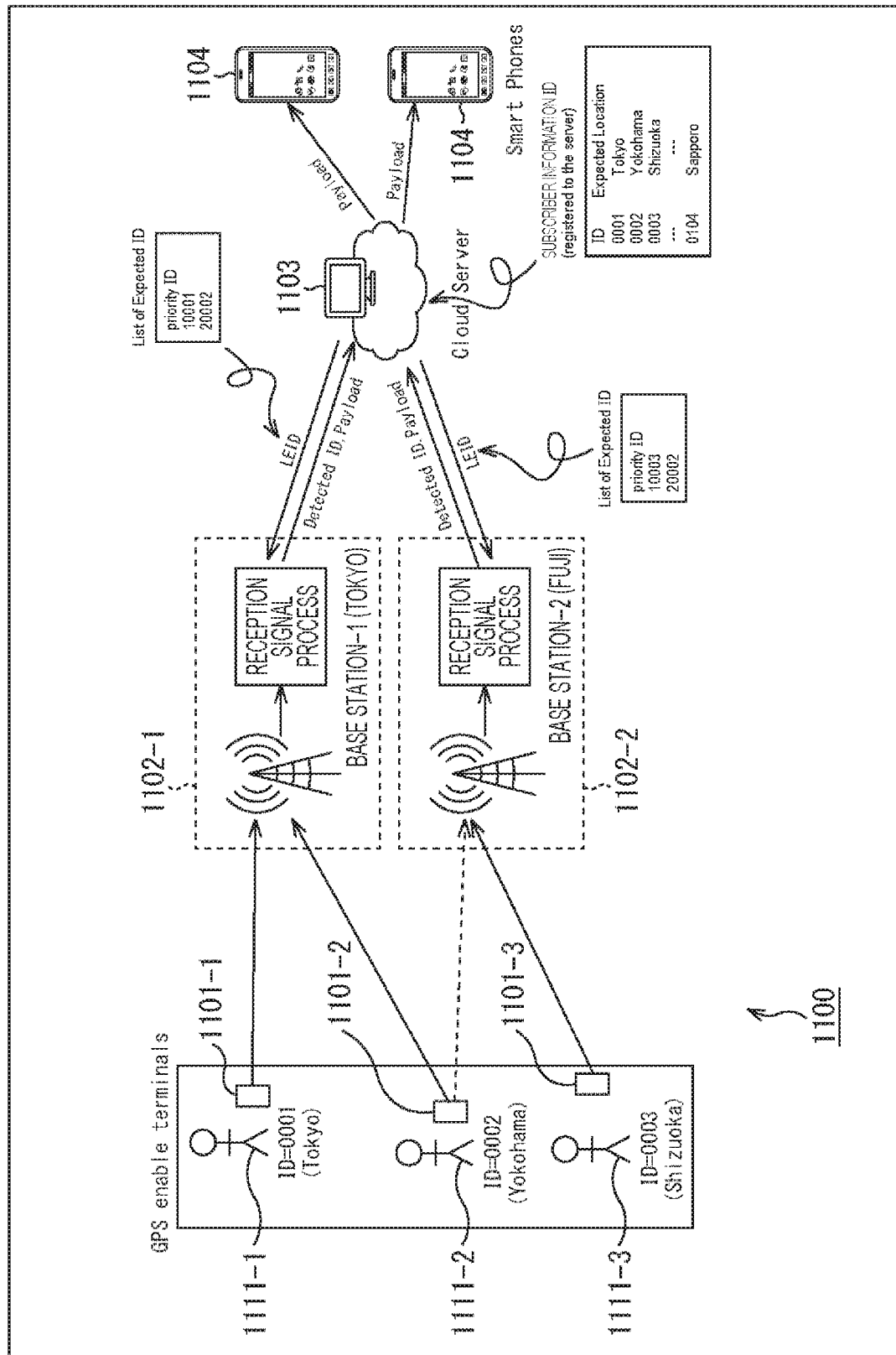
FIG. 25 is a diagram illustrating a main configuration example of a position notification system.

FIG. 25 is a diagram illustrating a main configuration example of a position notification system which is one example of the signal transmission/reception system to which the present technology is applied. A position notification system 1100 illustrated in FIG. 25 is a system in which a transmitting device 1101 gives a notification of its position.

The transmitting device 1101, a base station 1102, a cloud server 1103, and an information processing terminal 1104 illustrated in FIG. 25 correspond to the transmitting device 101, the high sensitivity receiving device 102, the server 104, and the terminal device 105 of FIG. 4.

The transmitting device 1101 is an example of a transmitting device to which the present technology is applied and transmits position information indicating its position as a radio signal. The base station 1102 is an example of a receiving device to which the present technology is applied and receives the radio signal, acquires the position information of the transmitting device 1101, and supplies the position information or the like to the cloud server 1103. In other words, the base station 1102 functions as a relay station which relays information transmitted from the transmitting device 1101 and transmits the information to the cloud server 1103. Transmission of information from the transmitting device 1101 to the base station 1102 is performed, for example, through one-way communication. The cloud server 1103 manages various kinds of information such as the position information of each transmitting device 1101 and provides, for example, a service of notifying the user of the position of the transmitting device 1101. For example, the information processing terminal 1104 operated by the user who desires to know the position of the transmitting device 1101 accesses the cloud server 1103, acquires the position information of the transmitting device 1101, and notifies the user of the position of the transmitting device 1101, for example, by displaying the position information together with map data or the like.

For example, the transmitting device 1101 is carried by a subject whom the user desires to know the position such as an elderly person. The transmitting device 1101 is able to obtain its position information (for example, a latitude and a longitude) appropriately, for example, by receiving a GPS signal from a GPS satellite. The transmitting device 1101 transmits its position information as the radio signal appropriately.

For example, in an example of FIG. 25, a transmitting device 1101-1 is carried by an elderly person 1111-1 in Tokyo (Tokyo), a transmitting device 1101-2 is carried by an elderly person 1111-2 in Yokohama, and a transmitting device 1101-3 is carried by an elderly person 1111-3 in Shizuoka.

Further, each transmitting device has identification information (ID). For example, in the example of FIG. 25, the identification information of the transmitting device 1101-1 is 0001 (ID=0001), the identification information of the transmitting device 1101-2 is 0002 (ID=0002), and the identification information of the transmitting device 1101-3 is 0003 (ID=0003). The identification information is registered in the cloud server 1103.

Further, the position monitoring target is arbitrary. For example, the position monitoring target may be a child, an animal such as a dog or a cat, or an employee of a company. Three transmitting devices 1101 are illustrated in FIG. 25, but the number of transmitting devices 1101 is arbitrary. The transmitting device 1101 may be configured as a dedicated device or may be incorporated into, for example, a mobile information processing device such as a mobile phone or a smartphone.

The base station 1102 may be any type of equipment. For example, the base station 1102 may be a dedicated facility or structure. Further, for example, the base station 1102 may be equipment which can be installed on a roof or a rooftop of a structure such as a general building, a condominium, a house, or the like. Further, for example, the base station 1102 may be a mobile equipment which can be carried by the user or installed in a mobile object such as a vehicle.

A plurality of base stations 1102 are installed. For example, in the example of FIG. 25, the base station 1102-1 is installed in Tokyo, and the base station 1102-2 is installed in Fuji. In FIG. 25, two base stations 1102 are illustrated, but the number of base stations 1102 is arbitrary.

A configuration of the cloud server 1103 is arbitrary and may be constituted by an arbitrary number of servers, an arbitrary number of networks, and the like, for example. A plurality of cloud servers 1103 may be provided.

In the position notification system 1100, the transmitting device 1101 sets the frequency hopping on the basis of its identification information ID. In other words, the transmitting device 1101 sets a transmission timing and a transmission frequency of each packet on the basis of the identification information, and transmits each packet on the basis of the setting. As described above, since transmission is performed using frequency hopping, it is possible to suppress the occurrence of interference. In other words, it is possible to perform transmission of information more reliably.

Further, by setting the transmission timing and the transmission frequency on the basis of the identification information of the transmitting device 1101, it is possible to change the pattern of the transmission timing and the transmission frequency for each transmitting device 1101, and thus it is possible to suppress the occurrence of collision with packets transmitted from the other transmitting devices 1101. In other words, it is possible to perform transmission of information more reliably.

Further, the base station 1102 acquires the identification information of the transmitting device 1101 from the cloud server 1103 and performs reception on the basis of the identification information. In other words, the base station 1102 sets a reception timing and a reception frequency on the basis of the identification information, similarly to the transmitting device 1101. If the transmission timing and the transmission frequency of the packet is able to be identified by the identification information, the packet is detected at the timing and the frequency (that is, the reception timing and the reception frequency are adjusted to them), and thus even in a case where the S/N ratio is low, it is easier to detect the packet. Therefore, it is possible to perform reception with higher sensitivity. In other words, more reliable information transmission can be implemented. Further, since a process such as packet detection need not be performed at an unnecessary timing and an unnecessary frequency band, it is possible to suppress an increase in a load.

Further, in a case where a priority is assigned to the identification information of the transmitting device 1101 acquired from the cloud server 1103, the base station 1102 is able to implement more reliable information transmission by performing reception in accordance with the priority.

Further, the base station 1102 supplies information related to reception of the radio signal, for example, the transmitting device 1101 from which the radio signal is received, content of the radio signal (data extracted from the radio signal), and the like to the cloud server 1103 as the reception information.

The cloud server 1103 registers and manages information related to the transmitting device 1101 (also referred to as "terminal information") and information related to the user (also referred to as "subscriber information"). The terminal information includes, for example, the identification information of the transmitting device 1101, a main location, and the like. Further, the subscriber information includes, for example, a name, an age, a sex, an address, information related to payment, identification information of a transmitting device to be used, a login ID, a password, and the like of the user (a person who receives the location notification service). It will be appreciated that the terminal information and the subscriber information may include any information, and the present technology is not limited to the above example.

Further, the cloud server 1103 transmits (supplies) the identification information of the transmitting device 1101 to each base station 1102 (some or all of the base stations 1102) via the network at a predetermined timing or in response to a request from the base station 1102 or the like. At this time, the cloud server 1103 supplies the identification information of the transmitting device 1101 whose radio signal is likely to be received by the base station 1102 to each base station 1102. In other words, the cloud server 1103 does not supply the identification information of the transmitting device 1101 whose radio signal is unlikely to be received by the base station 1102 to each base station 1102. Accordingly, the base station 1102 is able to reduce unnecessary packet detection, and it is possible to suppress an increase in the load.

Further, as the number of transmitting devices 1101 in which the base station 1102 is the reception target increases, a probability that the packet collision will occur increases accordingly. More specifically, since a packet is unlikely to arrive from the transmitting device 1101 whose radio signal is unlikely to be received, the probability that the packet collision will actually occur does not increase. However, in the setting of the reception timing and the reception frequency performed in the base station 1102, the probability that the packet collision will occur increases as the number of target transmitting devices 1101 increases. In a case where the packet collision occurs in the setting of the reception timing and the reception frequency as described above, the reception of the packet is omitted. In other words, in a case where the transmitting device 1101 whose radio signal is unlikely to be received is set as the reception target, reception sensitivity is unnecessarily reduced, and reliability of information transmission is likely to be unnecessarily reduced. As described above, the base station 1102 is able to exclude such a transmitting device 1101 from the reception target since the cloud server 1103 does not supply the identification information of the transmitting device 1101 whose radio signal is unlikely to be received by the base station 1102, and thus it is possible to suppress the reduction in the reception sensitivity and implement more reliable information transmission.

Further, the cloud server 1103 acquires reception information from the base station 1102. For example, the cloud server 1103 manages an information transmission/reception history between the transmitting device 1101 and the base station 1102 (for example, information indicating the transmitting device 1101 which transmits the radio signal and the base station 1102 which receives the radio signal, when the radio signal is received, or the like) on the basis of the reception information. The cloud server 1103 selects the transmitting device 1101 that supplies the identification information to the base station 1102 on the basis of the history. Accordingly, since it is possible to supply the identification information of the transmitting device 1101 on the basis of the previous communication history, it is possible to more accurately determine a possibility that each base station 1102 will receive the radio signal of each transmitting device 1101. Therefore, each base station 1102 can implement more reliable information transmission.

Further, for example, the cloud server 1103 is able to provide the position of the transmitting device 1101 (the elderly person 1111) to the information processing terminal 1104 on the basis of the reception information.

Further, the identification information of the transmitting device 1101 may be supplied from the cloud server 1103 to the base station 1102 in any form. For example, the cloud server 1103 may supply the identification information of the transmitting device 1101 to the base station 1102 using a priority list. The priority list is information including a list of identification information of the transmitting devices 1101 whose radio signal is likely to be received by the base station 1102 which is supplied with the priority list. For example, the cloud server 1103 may generate a priority list for the base station 1102 and supplies the priority list to each base station 1102, and the base station 1102 supplied with the priority list may perform a process of receiving the radio signal from the transmitting device 1101 indicated in the priority list. Further, the reception priority (priority) in the base station 1102 may be added to the identification information of the transmitting device 1101 supplied to the base station 1102. For example, the priority list may include a priority of each piece of identification information. Further, the base station 1102 supplied with the priority list may set a signal reception priority order or the like on the basis of the priority included in the priority list. Accordingly, the cloud server 1103 is able not only to control the transmitting device 1101 whose radio signal is received by the base station 1102 but also to control the reception priority order.

<Cloud Server>

Figure 26:
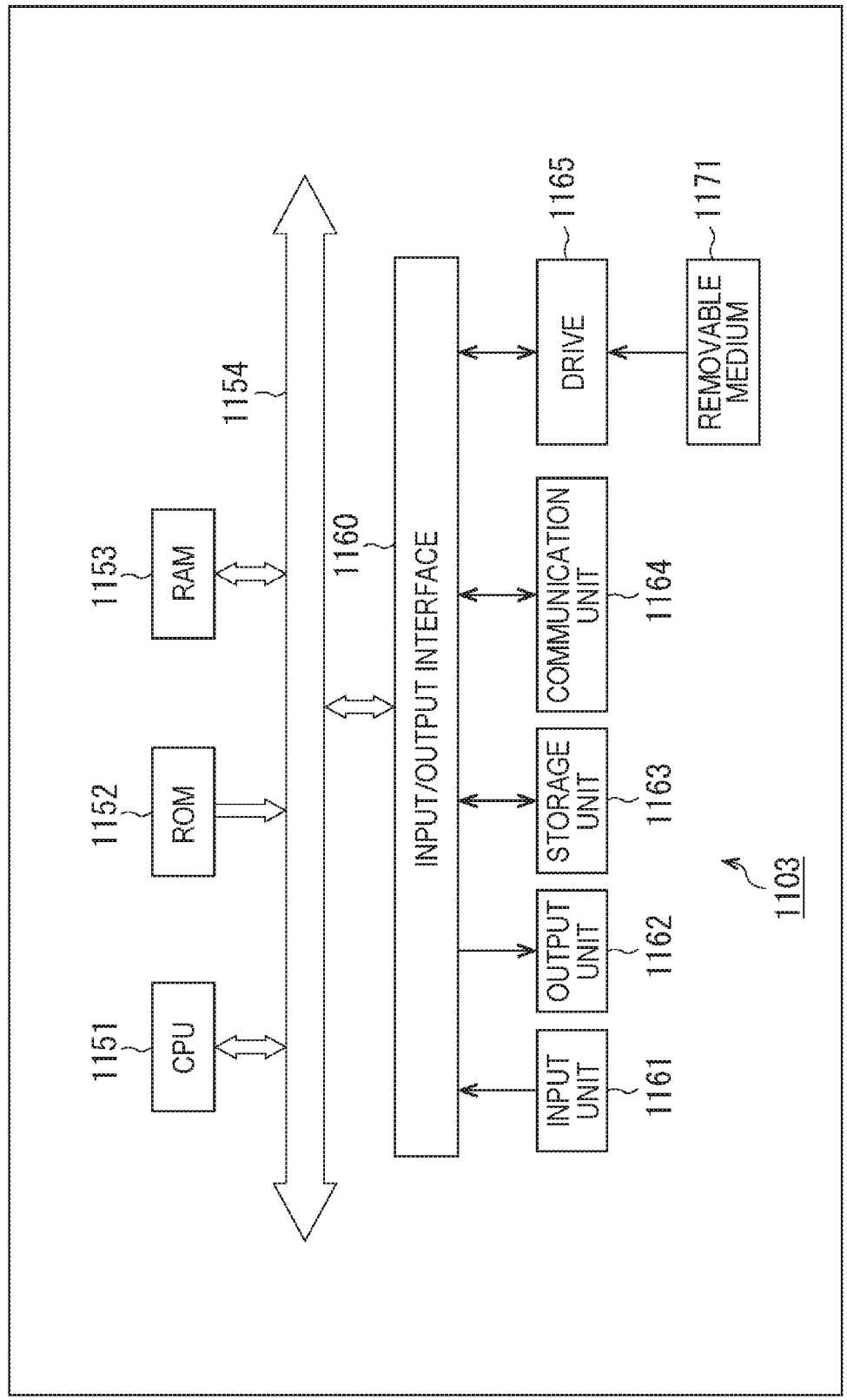
FIG. 26 is a diagram for describing a main configuration example of a server.

FIG. 26 is a block diagram illustrating a main configuration example of the cloud server 1103. A configuration of the cloud server 1103 is arbitrary as described above, and FIG. 26 illustrates that the cloud server 1103 is configured as one computer. In this case, as illustrated in FIG. 26, the cloud server 1103 includes a central processing unit (CPU) 1151, a read only memory (ROM) 1152, and a random access memory (RAM) 1153 which are connected to one another via a bus 1154.

An input/output interface 1160 is also connected to a bus 1154. An input unit 1161, an output unit 1162, a storage unit 1163, a communication unit 1164, and a drive 1165 are connected to the input/output interface 1160.

The input unit 1161 includes an arbitrary input device such as a keyboard, a mouse, a touch panel, an image sensor, a microphone, a switch, an input terminal, or the like. The output unit 1162 includes an arbitrary output device such as a display, a speaker, an output terminal, or the like. The storage unit 1163 includes an arbitrary storage medium such as a non-volatile memory such as a hard disk, a RAM disk, a solid state drive (SSD), a universal serial bus (USB) memory, or the like. The communication unit 1164 includes a communication interface conforming to either or both of wired and wireless communication standards such as Ethernet (a registered trademark), Bluetooth (a registered trademark), USB, high-definition multimedia interface (HDMI (a registered trademark)), or IrDA. The drive 1165 drives a removable medium 1171 having an arbitrary storage medium such as a magnetic disk, an optical disk, a magneto-optical disk, or a semiconductor memory which is loaded into the drive 1165.

In the cloud server 1103 having the above configuration, for example, the CPU 1151 is able to implement a function to be described later by loading a program stored in the storage unit 1163 onto the RAM 1153 via the input/output interface 1160 and the bus 1154 and executing the program. The RAM 1153 also appropriately stores data and the like necessary for the CPU 1151 to execute various kinds of processes.

For example, the program executed by the CPU 1151 may be recorded in the removable medium 1171 serving as a package medium and applied. In this case, the removable medium 1171 may be loaded into drive 1165, and the program may be installed in the storage unit 1163 via the input/output interface 1160. Further, the program may be provided via a wired or wireless transmission medium such as a local area network, the Internet, or digital satellite broadcasting. In this case, the program may be received by the communication unit 1164 and installed in the storage unit 1163. Further, the program may be installed in the ROM 1152 or the storage unit 1163 in advance.

In the cloud server 1103, the identification information identifying the transmitting device (for example, the transmitting device 1101) which transmits the radio signal is supplied to the receiving device (for example, the base station 1102) which receives the radio signal. For example, the cloud server 1103 includes a supplying unit which supplies the identification information identifying the transmitting device which transmits the radio signal to the receiving device that receives the radio signal. Accordingly, it is possible to implement more reliable information as described above.

<Function Block of CPU>

Figure 27:
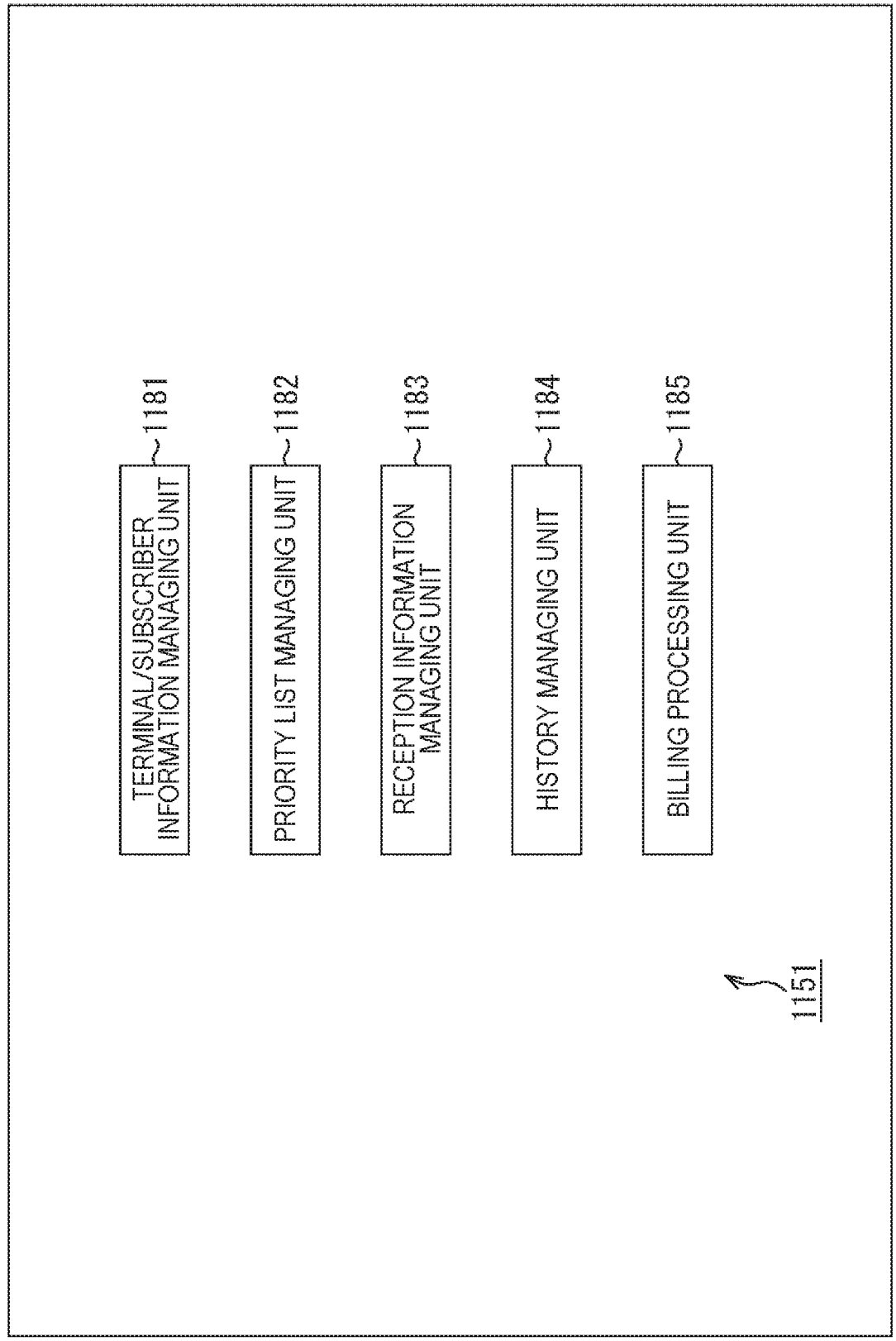
FIG. 27 is a functional block diagram illustrating an example of a function implemented by a CPU.

FIG. 27 is a functional block diagram illustrating a main configuration example of functions implemented by the CPU 1151. As illustrated in FIG. 27, the CPU 1151 includes functional blocks such as a terminal/subscriber information managing unit 1181, a priority list managing unit 1182, a reception information managing unit 1183, a history managing unit 1184, and a billing processing unit 1185. In other words, the CPU 1151 is able to execute a program and implement functions indicated by the functional blocks.

The terminal/subscriber information managing unit 1181 performs a process related to registration and management of terminal information and subscriber information. The priority list managing unit 1182 performs a process related to generation, management, supply, and the like of a priority list which is information including the identification information of the transmitting device 1101 and the priority of the transmitting device 1101. The reception information managing unit 1183 performs a process related to acquisition, management, and the like of the reception information. The history managing unit 1184 performs a process related to management of a communication history. The billing processing unit 1185 performs a process related to billing for service provision.

<Transmitting Device>

Figure 28:
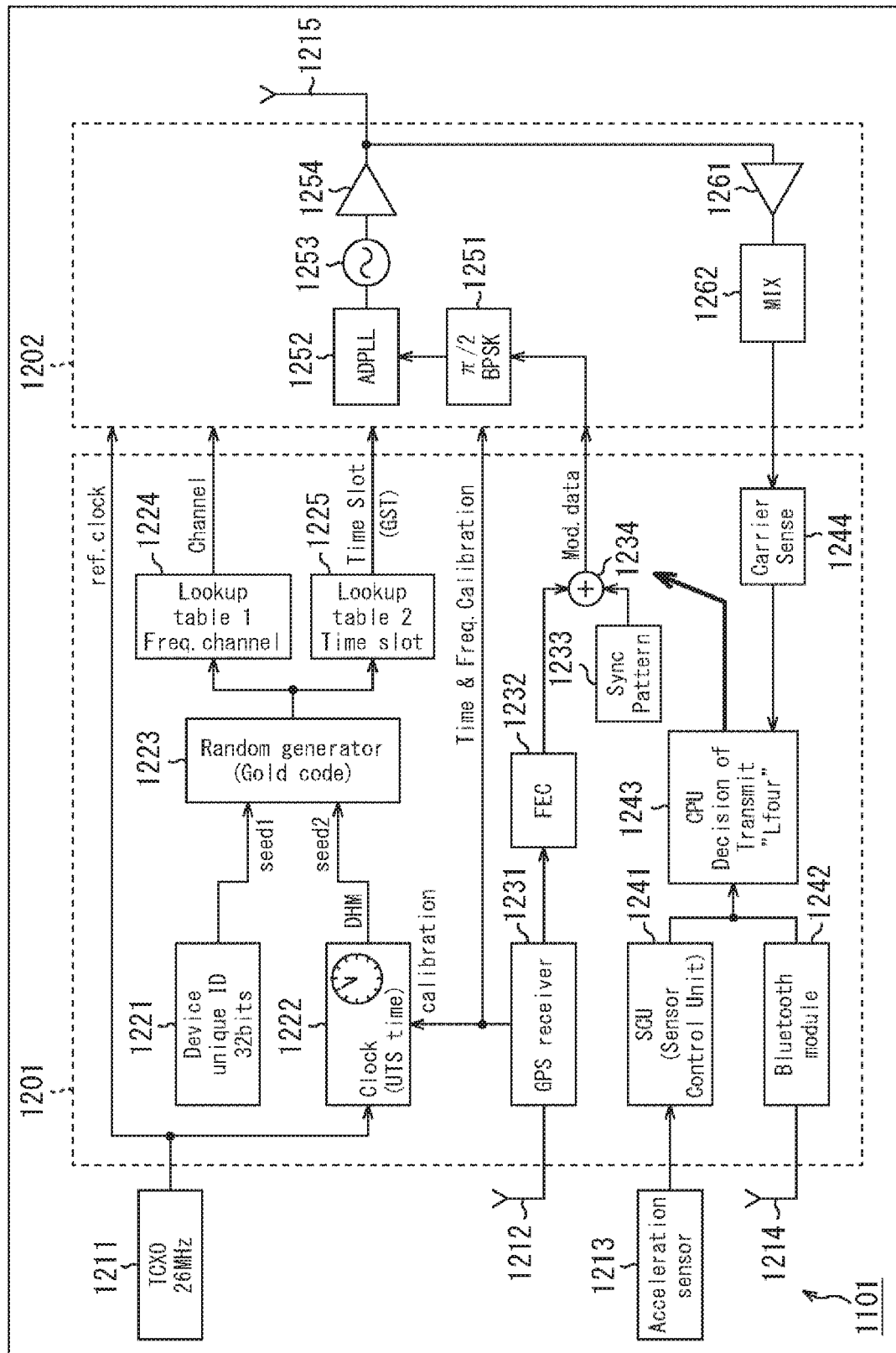
FIG. 28 is a block diagram illustrating a main configuration example of a transmitting device.

FIG. 28 is a diagram illustrating a main configuration example of the transmitting device 1101. As illustrated in FIG. 28, the transmitting device 1101 includes a signal processing unit 1201 and a transmitting unit 1202. The signal processing unit 1201 performs a process such as the generation of the transmission signal. The transmitting unit 1202 performs a process related to the transmission of the transmission signal generated by the signal processing unit 1201. Further, the transmitting unit 1202 transmits the same packet using the super frame twice or more as described above with reference to FIGS. 20 and 21. Further, the transmitting unit 1202 transmits each packet of the super frame using the frequency hopping as described above with reference to FIG. 22.

Further, the transmitting device 1101 includes a reference clock generating unit 1211, an antenna 1212, an acceleration sensor 1213, an antenna 1214, and an antenna 1215. The reference clock generating unit 1211 generates the reference clock signal (ref.clock) and supplies the reference clock to the signal processing unit 1201 (a time information generating unit 1222) and the transmitting unit 1202. The antenna 1212 is an antenna for receiving the GPS signal. An acceleration sensor 1213 is a sensor which detects acceleration (a motion, a posture, or the like) of the transmitting device 1101. The acceleration sensor 1213 supplies sensor information to the signal processing unit 1201 (a sensor control unit (SCU) 1241). The antenna 1214 is an antenna for performing radio communication of a Bluetooth standard (Bluetooth communication). The antenna 1215 is an antenna for transmitting the radio signal generated by the transmitting unit 1202.

The signal processing unit 1201 includes an identification information storage unit 1221, the time information generating unit 1222, a Gold code generating unit 1223, a transmission channel setting unit 1224, and a transmission timing setting unit 1225. Further, the signal processing unit 1201 includes a GPS receiving unit 1231, a forward error correction (FEC) 1232, a synchronization signal generating unit 1233, and a modulation data generating unit 1234. Further, the signal processing unit 1201 includes the SCU 1241, a Bluetooth module 1242, a CPU 1243, and a carrier sensing unit 1244.

The identification information storage unit (Device unique ID) 1221 stores the identification information of the transmitting device 1101. The length of the identification information is arbitrary and may be, for example, 32 bits. The identification information storage unit 1221 supplies the identification information to the Gold code generating unit 1223 as seed information (seed 1) at a predetermined timing or in response to a request from the Gold code generating unit 1223.

The time information generating unit (Clock) 1222 generates time information on the basis of the reference clock (ref.clock) supplied from the reference clock generating unit 1211. The time information may have any specification and may be, for example, a coordinated universal time (UTC). Further, the time information generating unit 1222 performs calibration of the generated time information using the time information included in the GPS signal supplied from the GPS receiving unit 1231. As a result, the time information generating unit 1222 is able to generate more accurate time information. The time information generating unit 1222 supplies the generated time information (for example, date: hour: minute (D: H: M)) to the Gold code generating unit 1223 as seed information (seed 2).

The Gold code generating unit (Random generator) 1223 generates a Gold code which is a pseudo random number on the basis of the identification information supplied from the identification information storage unit 1221 and the time information supplied from the time information generating unit 1222. The Gold code generating unit 1223 supplies the generated Gold code to the transmission channel setting unit 1224 and the transmission timing setting unit 1225.

The transmission channel setting unit (Lookup table 1 Freq. channel) 1224 sets a channel (transmission channel) for transmitting a packet. The transmission channel setting unit 1224 supplies the set transmission channel (Channel) to the transmitting unit 1202. The transmission timing setting unit (Lookup table 2 Time slot) 1225 sets a timing (transmission timing) for transmitting a packet. The transmission timing setting unit 1225 supplies the set transmission timing (Time Slot) to the transmitting unit 1202. A specification of the transmission timing is arbitrary, and the transmission timing may be, for example, a Greenwich standard time (GST).

In other words, the transmission channel setting unit 1224 and the transmission timing setting unit 1225 set the frequency hopping for packet transmission on the basis of the identification information and the time information of the transmitting device 1101 (for example, FIG. 22). As a result, since the transmission channel and the transmission timing of the packet are set in a pattern unique to the transmitting device 1101, it is possible to reduce a possibility that the transmission channel and the transmission timing will be the same as those of the other transmitting devices 1101, and it is possible to suppress the occurrence of packet collision.

The GPS receiving unit 1231 receives the GPS signal transmitted from the GPS satellite via the antenna 1212. The GPS receiving unit 1231 supplies the received GPS signal to the time information generating unit 1222 as information (Calibration) for calibration of the time information. Further, the GPS receiving unit 1231 also supplies the GPS signal to the transmitting unit 1202 as information (Time & Freq. Calibration) for calibration of the time information and the frequency. Further, the GPS receiving unit 1231 extracts the time information included in the GPS signal and supplies the time information to the FEC 1232.

The FEC 1232 adds a forward error correction code to the time information supplied from the GPS receiving unit 1231. The FEC 1232 supplies the time information to which the forward error correction code is added to the modulation data generating unit 1234 as data. In other words, this data is information unknown to the receiving side (for example, the base station 1102).

The synchronization signal generating unit (Sync Pattern) 1233 generates a synchronization signal for synchronization. The synchronization signal is configured with a signal of a predetermined synchronization pattern. The synchronization pattern is information known to the reception side (for example, the base station 1102). The synchronization signal generating unit 1233 supplies the generated synchronization signal to the modulation data generating unit 1234.

The modulation data generating unit 1234 is controlled by the CPU 1243 adds the synchronization signal supplied from the synchronization signal generating unit 1233 to the data supplied from the FEC 1232 and generates modulation data (Mod. data). In other words, the modulation data generating unit 1234 generates data (a packet) to be transmitted. The modulation data generating unit 1234 supplies the modulation data to the transmitting unit 1202 (a BPSK modulating unit 1251).

The SCU 1241 is controlled by the CPU 1243 and controls the acceleration sensor 1213, acquires sensor information (information related to acceleration) from the acceleration sensor 1213, and supplies the sensor information to the CPU 1243.

The Bluetooth module (Bluetooth module) 1242 is controlled by the CPU 1243 and performs Bluetooth communication with other devices via the antenna 1214. For example, the Bluetooth module 1242 supplies the received information to the CPU 1243.

The CPU 1243 performs control related to packet transmission performed by the transmitting device 1101. For example, the CPU 1243 controls the output of the modulation data performed by the modulation data generating unit 1234 on the basis of the sensor information supplied from the SCU 1241, the information supplied from the Bluetooth module 1242, and a carrier sensing result supplied from the carrier sensing unit 1244. For example, the CPU 1243 prohibits the modulation data from being output in a case where other radio communication is being performed in a desired transmission channel as a result of carrier sensing. In other words, the CPU 1243 permits or prohibits the packet transmission.

The carrier sensing unit 1244 performs the carrier sensing using a reception signal having a limited band supplied from the transmitting unit 1202 (a filter unit 1262). In other words, the carrier sensing unit 1244 detects the reception signal and checks whether or not any other communication is being performed in this frequency band (whether or not the band is being used). The carrier sensing unit 1244 supplies the carrier sensing result to the CPU 1243.

The transmitting unit 1202 includes the BPSK modulating unit 1251, an all-digital phase-locked loop (ADPLL) 1252, a frequency converting unit 1253, and an amplifying unit 1254. Further, the transmitting unit 1202 includes an amplifying unit 1261 and the filter unit 1262.

At the transmission timing set by the signal processing unit 1201 (the transmission timing setting unit 1225). The BPSK modulating unit (π/2 BPSK) 1251 performs the BPSK modulation on the modulation data (Mod. Data) supplied from the signal processing unit 1201 (the modulation data generating unit 1234) and supplies the resulting modulation data to the ADPLL 1252.

An ADPLL 1252 generates a transmission signal of a frequency corresponding to the BPSK-modulated modulation data supplied from the BPSK modulating unit 1251, and supplies the generated transmission signal to the frequency converting unit 1253.

The frequency converting unit 1253 synthesizes the transmission signal of the transmission channel set by the signal processing unit 1201 (the transmission channel setting unit 1224) with the transmission signal supplied from the ADPLL 1252, and converts the frequency band of the transmission signal into the transmission channel. The frequency converting unit 1253 supplies the transmission signal to the amplifying unit 1254.

The amplifying unit 1254 amplifies the transmission signal supplied from the frequency converting unit 1253 with a predetermined amplification factor and transmits the amplified transmission signal via the antenna 1215 as the radio signal. In other words, the amplifying unit 1254 transmits the transmission signal including the packet data through the transmission channel set by the signal processing unit 1201 at the transmission timing set by the signal processing unit 1201.

The amplifying unit 1261 receives the radio signal via the antenna 1215, amplifies the received radio signal (reception signal) with a predetermined amplification factor, and supplies the amplified reception signal to the filter unit 1262.

The filter unit (MIX) 1262 performs a filter process on the reception signal supplied from the amplifying unit 1261 to limit a frequency band thereof. The filter unit 1262 supplies the reception signal having the limited band to the signal processing unit 1201 (the carrier sensing unit 1244).

<Base Station>

Figure 29:
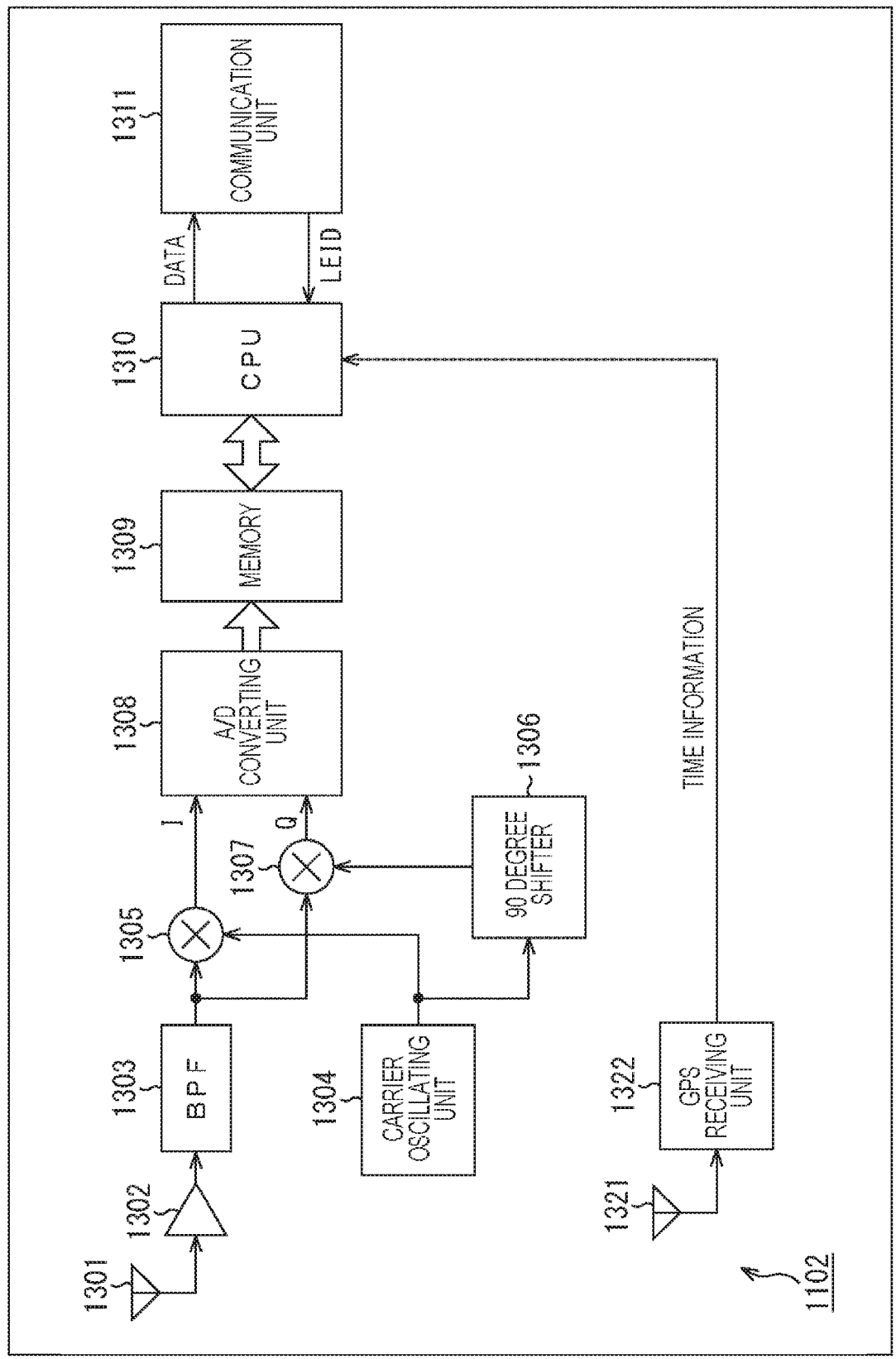
FIG. 29 is a block diagram illustrating a main configuration example of a base station.

FIG. 29 is a diagram illustrating a main configuration example of the base station 1102. As illustrated in 29, the base station 1102 includes an antenna 1301, a low noise amplifying unit 1302, a BPF 1303, a carrier oscillating unit 1304, a multiplying unit 1305, a 90 degree shifter 1306, a multiplying unit 1307, an analog/digital (A/D) converting a unit 1308, a memory 1309, a CPU 1310, and a communication unit 1311. Further, the base station 1102 has an antenna 1321 and a GPS receiving unit 1322.

The low noise amplifying unit 1302 receives the radio signal (for example, the transmission signal transmitted from the transmitting device 1101) via the antenna 1301, amplifies the reception signal, and supplies the amplified reception signal to the BPF 1303. The BPF 1303 removes an unnecessary frequency component from the reception signal and supplies the resulting signal to the multiplying unit 1305 and the multiplying unit 1307. The carrier oscillating unit 1304 generates a carrier frequency signal of a predetermined frequency used for transmission and reception. For example, in a case where a signal transmitted at the 920 MHz band is received, the carrier oscillating unit 1304 performs oscillation at the 920 MHz and supplies the oscillation signal (carrier signal) to the multiplying unit 1305 and the 90 degree shifter 1306.

The multiplying unit 1305 multiplies the reception signal supplied from the BPF 1303 by the carrier signal supplied from the carrier oscillating unit 1304 and generates a baseband In-Phase signal (an I signal). The multiplying unit 1305 supplies the I signal to the A/D converting unit 1308. The 90 degree shifter 1306 shifts the phase of the carrier signal supplied from the carrier oscillating unit 1304 by 90°. The 90 degree shifter 1306 supplies the phase-shifted carrier signal to the multiplying unit 1307. The multiplying unit 1307 multiplies the reception signal supplied from the BPF 1303 by the 90° phase-shifted carrier signal supplied from the 90 degree shifter 1306 and generate a baseband quadrature signal (a Q signal). The multiplying unit 1307 supplies the Q signal to the A/D converting unit 1308.

The A/D converting unit 1308 performs A/D conversion on the supplied I signal and the Q signal and supplies digital data to be stored in the memory 1309. It is preferable that a conversion rate of the A/D converting unit 1308 exceed the chip rate used for transmission. For example, in a case where transmission with a chip rate of 200 K/s is performed with Δ=5 μs, it is necessary for the A/D converting unit 1308 to perform the A/D conversion at a conversion rate of at least 200 KHz or more.

The memory 1309 includes a predetermined storage medium and acquires digital data of the I signal and the Q signal supplied from the A/D converting unit 1308, and stores the digital data in the storage medium. The storage medium may be any type of storage medium and may be, for example, a semiconductor memory, a magnetic recording medium such as a hard disk, or any other storage medium. In a case where the A/D converting unit 1308 performs A/D conversion for 30 seconds at 8-bit accuracy and a double conversion rate (400 KHz), the digital data of the I signal and the Q signal of 24 megabytes (24 Mbytes) are accumulated in the memory 1309. Further, the memory 1309 is also able to store various kinds of information (a program, data, or the like) supplied from the CPU 1310.

The CPU 1310 performs a process related to reception. For example, the CPU 1310 controls the communication unit 1311 such that the identification information (LEID) of the transmitting device 1101 is acquired from the cloud server 1103 and stored in the memory 1309. For example, the CPU 1310 is able to acquire the priority list from the cloud server 1103.

Further, for example, the CPU 1310 reads information from the memory 1309 and performs a process based on the information. For example, the CPU 1310 is able to read the identification information of the transmitting device 1101 acquired from the cloud server 1103, perform, for example, the collision detection, the error correction, or the like on the basis of the identification information, control the low noise amplifying unit 1302 to the memory 1309, and control the reception. Further, the CPU 1310 is able to acquire, for example, the digital data received from the memory 1309 and perform a process related to the demodulation of the digital data. Further, the CPU 1310 is able to supply the demodulated data to the cloud server 1103 via the communication unit 1311 as the reception information. Further, the reception information may include information related to the reception such as information related to a reception time, a reception channel, and a transmission source (the transmitting device 1101) in addition to the demodulated data (content of the received information).

Further, for example, the CPU 1310 controls the GPS receiving unit 1322 such that the GPS signal is received, acquires the time information included in the GPS signal, and controls the reception on the basis of the time information. The CPU 1310 is able to execute other arbitrary processes.

The communication unit 1311 communicates with the cloud server 1103 and exchanges information.

The GPS receiving unit 1322 receives the GPS signal transmitted from the GPS satellite via the antenna 1321, and supplies the time information included in the GPS signal to the CPU 1310.

<Function Blocks of CPU>

Figure 30:
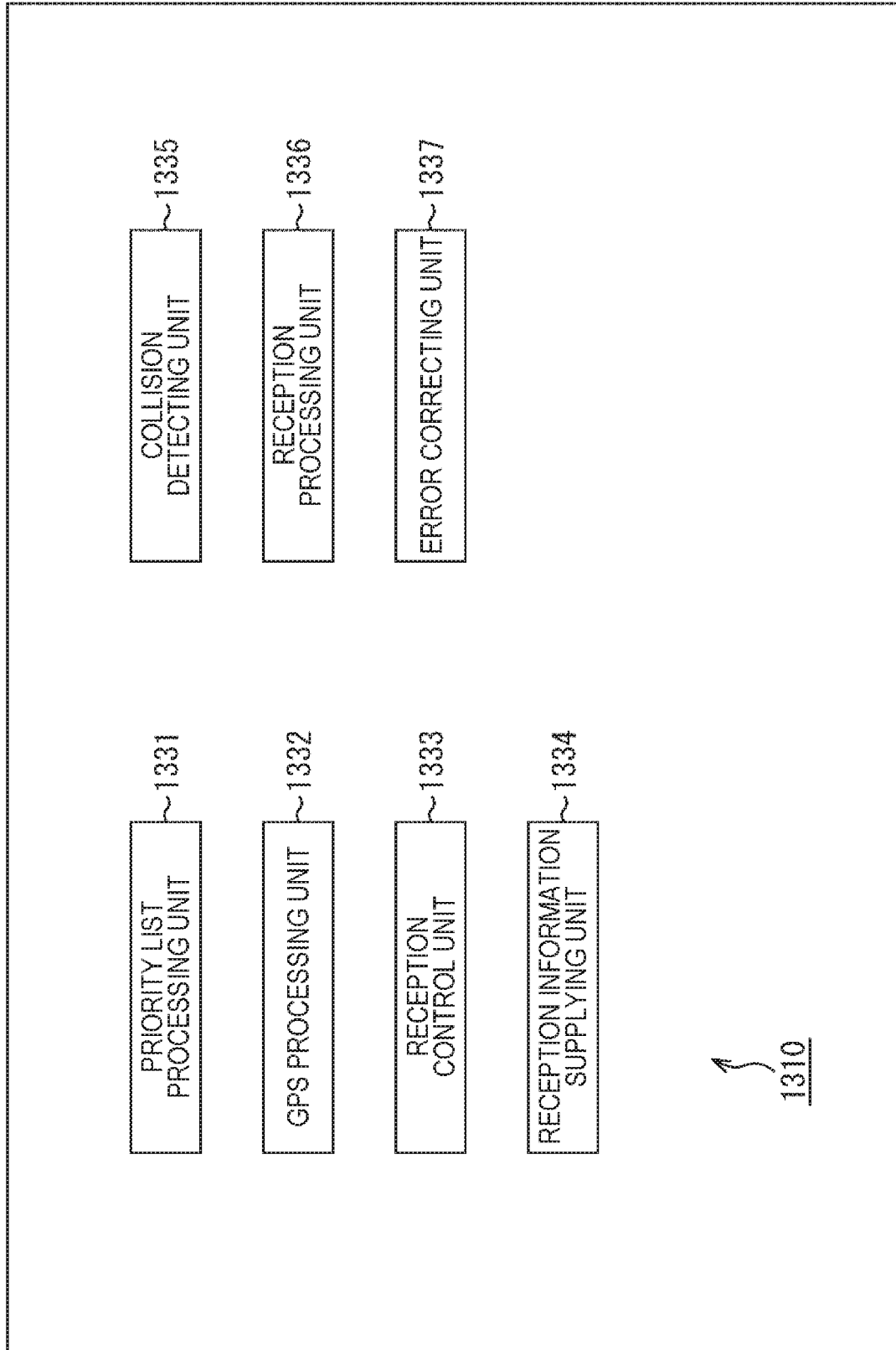
FIG. 30 is a functional block diagram illustrating an example of a function implemented by a CPU.

FIG. 30 is a functional block diagram illustrating a main configuration example of functions implemented by the CPU 1310. As illustrated in FIG. 30, the CPU 1310 has functional blocks such as a priority list processing unit 1331, a GPS processing unit 1332, a reception control unit 1333, a reception information supplying unit 1334, a collision detecting unit 1335, a reception processing unit 1336, and an error correcting unit 1337. In other words, the CPU 1310 is able to implement the functions indicated by the functional blocks by executing a program.

The priority list processing unit 1331 performs a process related to acquisition of the priority list including the identification information of the transmitting device 1101. The GPS processing unit 1332 performs a process related to the GPS signal. The reception control unit 1333 performs a process related to the reception control. The reception information supplying unit 1334 performs a process related to the supply of the reception information. The collision detecting unit 1335 performs a process related to the packet collision detection. The reception processing unit 1336 performs a process related to the packet reception. The error correcting unit 1337 performs a process related to the error correction.

<Flow of Management Process>

Next, a process executed by the respective devices of the position notification system 1100 will be described. First, a process executed by the cloud server 1103 will be described. The cloud server 1103 performs the management process and performs processes such as registration, management, provision, or the like of various kinds of information. An example of the flow of the management process executed by the cloud server 1103 will be described with reference to a flowchart of FIG. 31.

If the management process is started, in step S1101, the terminal/subscriber information managing unit 1181 receives the terminal information and the subscriber information via the communication unit 1164, stores the terminal information and the subscriber information in the storage unit 1163, and registers the terminal information and the subscriber information. As the terminal information and the subscriber information, arbitrary information necessary for provision of the position notification service is included. The terminal information is information related to the transmitting device 1101, and includes, for example, the identification information, the main location, or the like of the transmitting device 1101. Further, the subscriber information includes, for example, a name, an age, a sex, an address, information related to payment, the identification information of the transmitting device to be used, a login ID, a password, and the like of the user (a person who receives the location notification service). The terminal information and the subscriber information may be supplied from any device. For example, the terminal information and the subscriber information may be supplied from the transmitting device 1101 or may be supplied from other terminal devices. Further, the information registration may be performed as a contract for the position notification service or the like. In a case where the service provision is for a fee, information necessary for billing is also registered.

In step S1102, the priority list managing unit 1182 generates the priority list of each base station on the basis of the terminal information or the subscriber information registered in step S1101, the reception history of the base station 1102, and the like. The priority list is a list of transmitting devices 1101 in which a priority is given to reception and includes, for example, information such as the identification information of the transmitting device 1101 and the priority of the transmitting device 1101. The priority list managing unit 1182 generates the priority list corresponding to the base station 1102 (the list of transmitting devices 1101 in which the base station 1102 preferentially performs reception) for each base station 1102.

In step S1103, the priority list managing unit 1182 supplies the priority lists generated in step S1102 to the base stations 1102 corresponding to the lists via the communication unit 1164.

In step S1104, the reception information managing unit 1183 acquires the reception information supplied from the base station 1102. The history managing unit 1184 updates the history on the basis of the reception information. The reception information is information related to the reception of the base station 1102. The content of the reception information is arbitrary, and the reception information includes, for example, received data, information related to the reception timing and the reception channel, information related to the transmission source (the transmitting device 1101), and the like. The information related to the transmission source includes at least the identification information of the transmitting device 1101. The reception information managing unit 1183 associates the reception information with other information, stores the reception information in the storage unit 1163, and manages the reception information. For example, the reception information managing unit 1183 generates information indicating the position of the transmitting device 1101 using the reception information and supplies the information to the information processing terminal 1104 or the like via the communication unit 1164. Further, the history managing unit 1184 generates the reception history of each base station 1102, stores the reception history in the storage unit 1163, and manages the reception history. Further, the history managing unit 1184 updates the history to the latest state on the basis of the reception information.

In step S1105, the billing processing unit 1185 performs a billing processing associated with the service provision.

If the process of step S1105 ends, the management process is performed.

Since the identification information of the transmitting device 1101 is supplied to the base station 1102 as described above, it is possible to perform the higher sensitivity reception in the base station 1102 and implement more reliable information transmission. Further, it is possible to suppress an increase in the load of the base station 1102. Further, since the priority lists corresponding to each base station 1102 is supplied to each base station 1102 as described above, it is possible to exclude the transmitting device 1101 whose radio signal is less likely to be received by each base station 1102 from the reception target, and thus it is possible to suppress the reduction in the reception sensitivity in the base station 1102 and implement more reliable information transmission.

Further, for example, the priority list managing unit 1182 may generate the priority list on the basis of a position relation between the transmitting device 1101 and the base station 1102. In other words, the transmitting device 1101 whose radio signal is received by the base station 1102 may be set on the basis of the position relation between the transmitting device 1101 and the base station 1102. For example, in the example of FIG. 25, since the transmitting device 1101-1 is carried by the elderly person 1111-1 in Tokyo, a possibility that the base station 1102-2 in Fuji will receive the radio signal is low. Further, since the transmitting device 1101-3 is carried by the elderly person 1111-3 in Shizuoka, a possibility that the base station 1102-1 in Tokyo will receive the radio signal is low. Therefore, the priority list managing unit 1182 supplies the priority list including the identification information (0001) of the transmitting device 1101-1 and the identification information (0002) of the transmitting device 1101-2 to the base station 1102-1, and supplies the priority list including the identification information (0002) of transmitting device 1101-2 and the identification information of transmitting device 1101-3 (0003) to the base station 1102-2. For example, in a case where the elderly person 1111 moves to another area, the history is updated, and the priority list is updated. Accordingly, the latest priority list is provided to each base station 1102.

Further, in the example of FIG. 25, the transmitting device 1101-2 is carried by the elderly person 1111-2 in Yokohama. Therefore, the position of the transmitting device 1101-2 from the base station 1102-1 in Tokyo is farther than that of the transmitting device 1101-1. Further, the position of the transmitting device 1101-2 from the base station 1102-2 in Fuji is farther than that of the transmitting device 1101-3. Therefore, in the priority list for the base station 1102-1, the priority of the transmitting device 1101-2 is set to be lower than that of the transmitting device 1101-1. Further, in the priority list for the base station 1102-2, the priority of the transmitting device 1101-2 is set to be lower than that of the transmitting device 1101-3. For example, in a case where these elderly person 1111 move to another area, the history is updated, and the priority is also updated. Accordingly, the latest priority is provided to each base station 1102.

Further, the setting of the priority list (the transmitting device 1101 to be prioritized or the priority) may be performed using arbitrary information as a parameter. For example, the priority list may be set in accordance with the position of the transmitting device 1101 (the distance between the transmitting device 1101 and the base station 1102) in each time zone. Further, for example, the priority list may be set on the basis of a communication specification, a communication capability, or the like of the transmitting device 1101 or the base station 1102. Further, for example, the priority list may be set on the basis of a service associated with the transmitting device 1101 or the base station 1102. In addition, the priority list may be set, for example, using a natural phenomenon such as weather, temperature, humidity, or atmospheric pressure, a behavior or preference of a monitoring subject, a history thereof, content or a history of communication, or a use state (congestion or the like) of a communication band. Further, of course, a plurality of parameters may be combined and used.

<Flow of Transmission Process>

Figure 32:
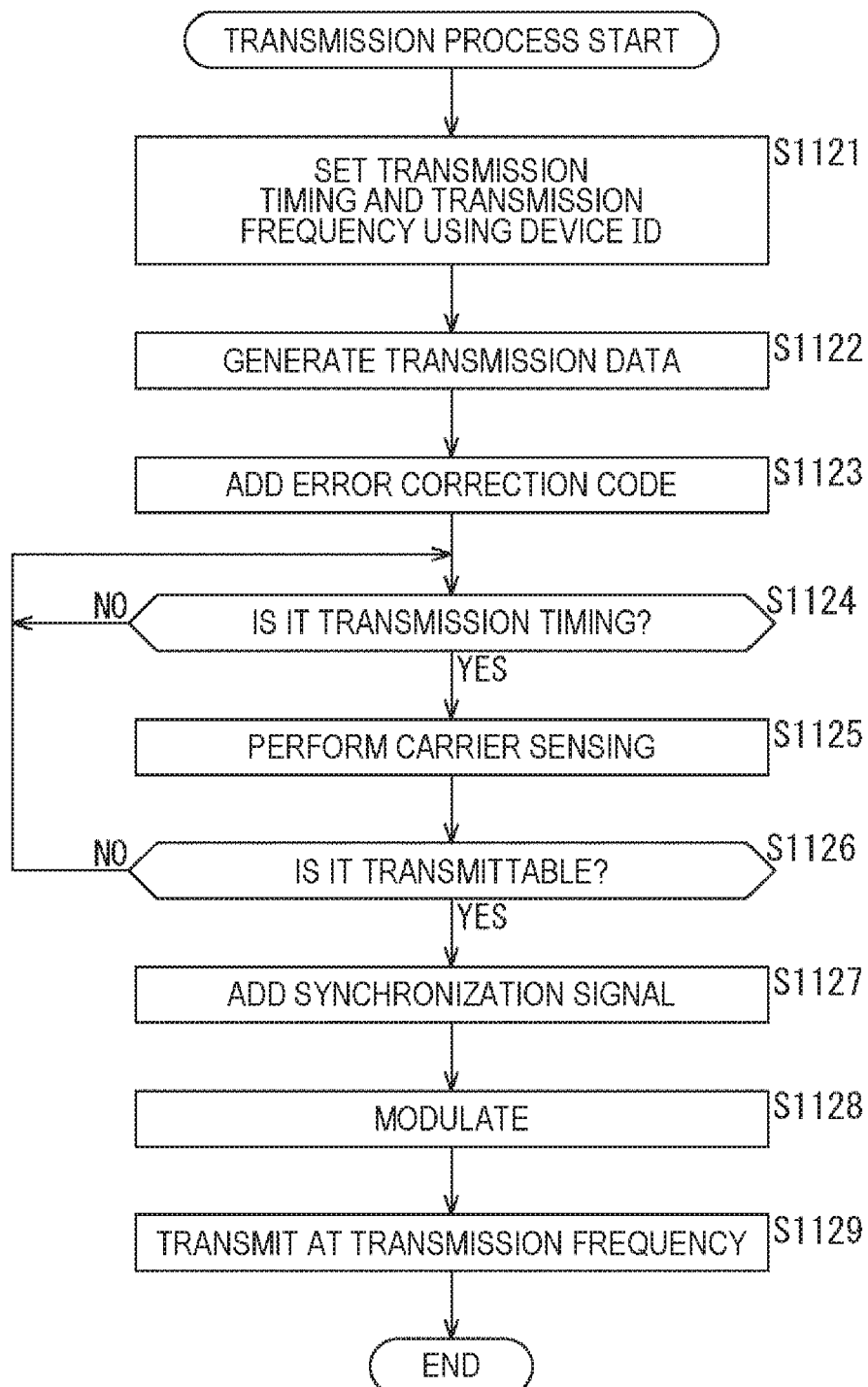
FIG. 32 is a flowchart illustrating an example of a flow of a transmission process.

Next, a process executed by the transmitting device 1101 will be described. An example of the flow of a transmission process executed by the transmitting device 1101 will be described with reference to a flowchart of FIG. 32.

If the transmission process is started, in step S1121, the transmission timing setting unit 1225 sets the packet transmission timing using the identification information (device ID) of the transmitting device 1101. Further, the transmission channel setting unit 1224 sets the packet transmission frequency using the identification information (device ID) of the transmitting device 1101. In other words, the transmission channel setting unit 1224 and the transmission timing setting unit 1225 set the frequency hopping. The transmission channel setting unit 1224 and the transmission timing setting unit 1225 perform the setting on the basis of the Gold code generated using the identification information and the time information of the transmitting device 1101 as the seed information.

In step S1122, the GPS receiving unit 1231 receives the GPS signal, extracts the time information from the GPS signal, and generates the transmission data.

In step S1123, the FEC 1232 adds the forward error correction code to the transmission data generated in step S1122.

In step S1124, the transmitting unit 1202 determines whether or not it is the transmission timing. In a case where it is determined not to be the transmission timing, it is on standby until it is determined to be the transmission timing. Then, in a case where it is determined in step S1124 that it is the transmission timing, the process proceeds to step S1125.

In step S1125, the carrier sensing unit 1244 performs the carrier sensing. In step S1126, the CPU 1243 determines whether or not the transmission is able to be performed on the basis of the carrier sensing result. In a case where the transmission is determined to be unable to be performed, the process returns to step S1124, and the process of step S1124 and subsequent steps is repeated. In a case where it is determined in step S1126 that the transmission is unable to be performed, the process proceeds to step S1127.

In step S1127, the modulation data generating unit 1234 adds the synchronization signal to the transmission data to which the forward error correction code is added in step S1123. Accordingly, since the synchronization signal which is information known to the base station 1102 is added, the base station 1102 is able to more easily detect the transmission data. In other words, the base station 1102 is able to perform the reception with higher sensitivity.

In step S1128, the BPSK modulating unit 1251 performs the BPSK modulation on the transmission data to which the synchronization signal is added in step S1127.

In step S1129, the ADPLL 1252 generates the transmission signal using the BPSK-modulated transmission data. Further, the frequency converting unit 1253 converts the frequency band of the transmission signal into the frequency band of the transmission frequency. The amplifying unit 1254 amplifies the transmission signal of the transmission frequency band and transmits the amplified transmission signal.

If the process of step S1129 ends, the transmission process ends.

Since the transmission timing and the transmission frequency are set on the basis of the identification information of the transmitting device 1101 as described above, the transmitting device 1101 is able to suppress the occurrence of collision with packets transmitted from other transmitting devices 1101 and perform the information transmission more reliably.

<Flow of Reception Process>

Next, a process executed by the base station 1102 will be described. First, an example of the flow of a reception process executed by the base station 1102 will be described with reference to the flowchart of FIG. 33.

If the reception process is started, in step S1141, the priority list processing unit 1331 acquires the priority list from the cloud server 1103 via the communication unit 1311. The priority list transmitted from the cloud server 1103 is received by the communication unit 1311 and acquired by the priority list processing unit 1331.

In step S1142, the GPS processing unit 1332 receives the GPS signal and corrects the time information using the GPS signal.

In step S1143, the reception control unit 1333 determines whether or not the current time is a predetermined time and is on standby until a predetermined time comes. In a case where the current time is determined to be a predetermined time, the process proceeds to step S1144.

In step S1144, the priority list processing unit 1331 sets the frequency hopping of the packet transmitted from the transmitting device 1101 (sets the reception timing and the reception frequency (a reception channel number Ch (ID, n) of all packets transmitted from the transmitting device 1101) on the basis of the identification information and the time information of the transmitting device 1101 for each transmitting device 1101 for which reception is expected on the basis of the priority list.

In step S1145, the reception control unit 1333 selects the unprocessed transmitting device 1101. In step S1146, the reception control unit 1333 receives the radio signal from the transmitting device 1101 of the processing target. At that time, the reception control unit 1333 receives the radio signal (packet) in accordance with the setting of the frequency hopping performed in step S1144. In step S1147, the reception control unit 1333 determines whether or not the reception process has been performed for all the transmitting devices 1101. In a case where it is determined that there is an unprocessed transmitting device 1101, the process proceeds to step S1145. Further, in a case where it is determined in step S1147 that the reception process has been performed for all the transmitting devices 1101, the process proceeds to step S1148.

In step S1148, the reception information supplying unit 1334 supplies the reception information to the cloud server 1103 via the communication unit 1311.

In a case where the process of step S1148 ends, the reception process ends. Further, this process is a process corresponding to one sub frame. In other words, the reception process is repeated for each super frame.

<Flow of Reception Process>

Figure 33:
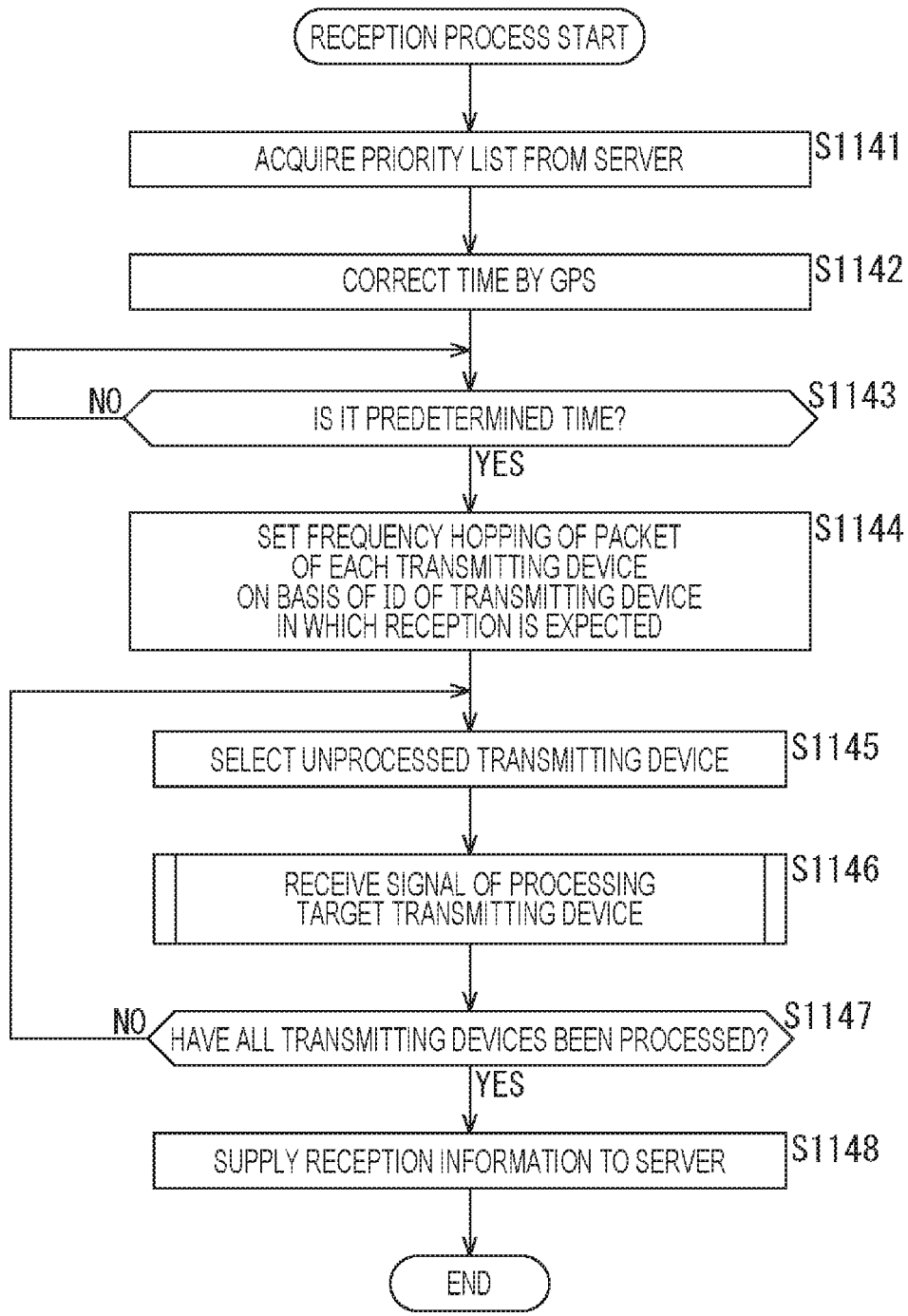
FIG. 33 is a flowchart illustrating an example of a flow of a reception process.
Figure 34:
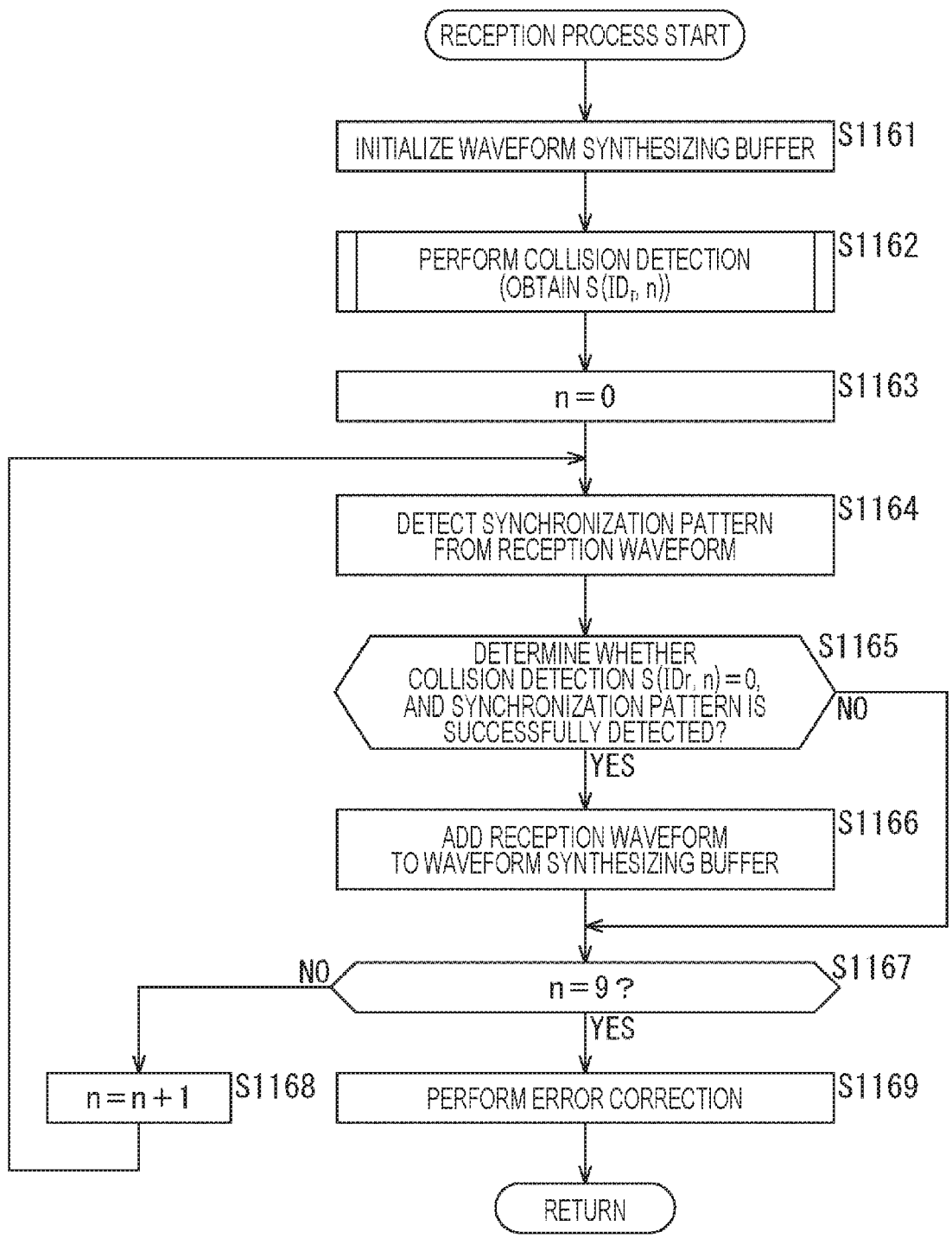
FIG. 34 is a flowchart illustrating an example of a flow of reception process.

Next, an example of the flow of the reception process on the radio signal transmitted from the transmitting device 1101 of the processing target performed in step S1146 of FIG. 33 will be described with reference to the flowchart of FIG. 34.

If the reception process is started, in step S1161, the reception processing unit 1336 initializes a waveform synthesizing buffer. In step S1162, collision detecting unit 1335 performs the collision detection. In step S1163, the reception processing unit 1336 sets (initializes) a value of a variable n indicating a number of a processing target packet to "0" (n=0). In other words, a first packet (n=0) is selected as the processing target. Further, the selection of the packet is equivalent to the selection of the reception timing.

In step S1164, the reception processing unit 1336 detects a known synchronization pattern from the reception waveform for the packet of n=0. In step S1165, the reception processing unit 1336 determines whether or not the collision is not detected for the current packet (S(IDr,n)=0), and the synchronization pattern is successfully detected. In a case where it is determined that the collision is not detected, and the synchronization pattern is successfully detected, the process proceeds to step S1166.

In step S1166, the reception processing unit 1336 adds the reception waveform to the waveform synthesizing buffer. If the process of step S1166 ends, the process proceeds to step S1167. Further, in a case where it is determined in step S1165 that the collision is detected (S(IDr,n)=1) or that the synchronization pattern fails to be detected, the process of step S1166 is skipped, and the process proceeds to step S1167.

In step S1167, the reception processing unit 1336 determines whether or not the value of the variable n is "9" (n=9). In a case where it is determined that the variable n does not reach 9 (there is a packet which has not been processed), the process proceeds to step S1168.

In step S1168, the reception processing unit 1336 increments the value of the variable n by "+1" (n=n+1). In other words, the processing target is updated to a next packet. If the process of step S1168 ends, the process returns to step S1164, and the process of step S1164 and subsequent steps is performed. In other words, the process of step S1164 to step S1168 is performed on each packet. Then, in a case where it is determined in step S1167 that the value of the variable n is "9" (n=9), that is, in a case where it is determined that all the packets have been performed, the process proceeds to step S1169.

In step S1169, the error correcting unit 1337 performs the error correction on the reception waveform (synthesized waveform) synthesized in the waveform synthesizing buffer. If the process of step S1169 ends, the reception process ends, and the process returns to FIG. 33.

<Collision Detection Process>

Figure 35:
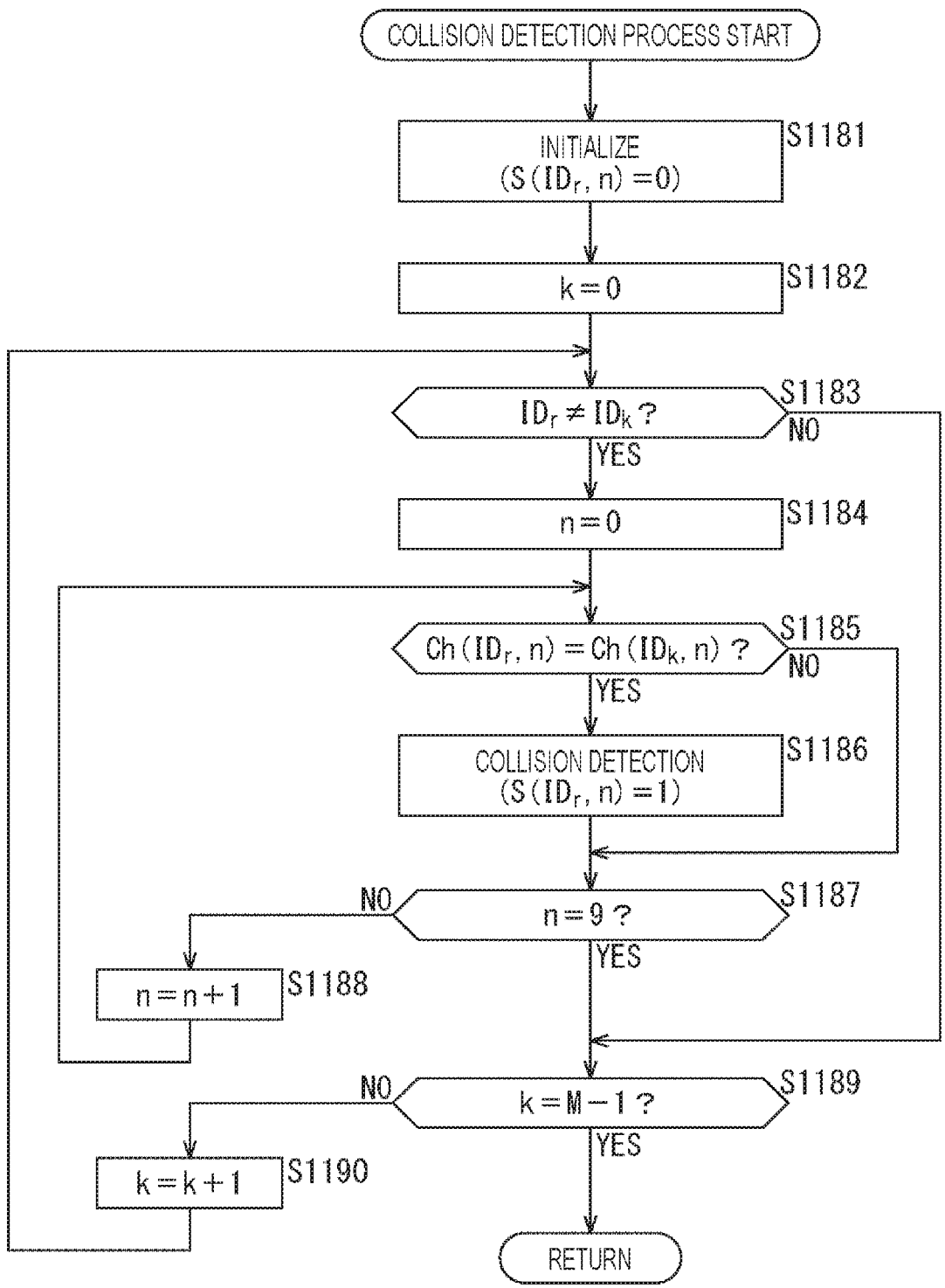
FIG. 35 is a flowchart illustrating an example of a flow of a collision determination process.

Next, an example of the flow of a collision detection process executed in step S1162 of FIG. 34 will be described with reference to a flowchart of FIG. 35.

In step S1181, the collision detecting unit 1335 initializes a variable S (IDr,n) indicating the occurrence of collision (S(IDr,n)=0).

In step S1182, the collision detecting unit 1335 sets a value of a variable k to "0" (k=0). The variable k indicates the transmitting device 1101 serving as the counterpart of the packet collision among the transmitting devices 1101 (0 to M−1) for which reception is expected.

In step S1183, the collision detecting unit 1335 determines whether or not IDr coincides with IDk. IDr indicates the identification information of the transmitting device 1101 of the processing target. In other words, it is determined whether or not the processing target and the collision counterpart are the same transmitting device 1101. If IDr does not coincide with IDk, the process proceeds to step S1184.

In step S1184, the collision detecting unit 1335 sets the value of the variable n indicating the processing target packet to "0" (n=0).

In step S1185, the collision detecting unit 1335 determines whether or not a reception channel (Ch(IDr,n)) of a packet n of the processing target of the transmitting device 1101 (IDr) of the processing target coincides with a reception channel (Ch(IDk,n)) of the packet n of the processing target of the transmitting device 1101 (IDk) of the collision counterpart (Ch(IDr,n)=Ch(IDk, n)?). In a case where they are determined to coincide with each other (Ch (IDr, n)=Ch (IDk, n)), the process proceeds to step S1186.

In step S1186, the collision detecting unit 1335 detects the collision. In other words, the collision detecting unit 1335 sets the variable S (IDr,n) indicating the occurrence of collision to a value indicating the occurrence of collision (S (IDr, n)=1). If the process of step S1186 ends, the process proceeds to step S1187. Further, in a case where it is determined in step S1185 that the reception channel of the packet n of the processing target of the transmitting device 1101 of the processing target does not coincide with the reception channel of the packet n of the processing target of the transmitting device 1101 of the collision counterpart, the process proceeds to step S1187.

In step S1187, the collision detecting unit 1335 determines whether or not the value of the variable n is "9" (n=9). In a case where the value of variable n is determined not to reach "9", that is, in a case where it is determined that there is an unprocessed packet, the process proceeds to step S1188.

In step S1188, the collision detecting unit 1335 increments the value of the variable n by "+1" (n=n+1). In other words, the processing target is updated to a next packet. If the process of step S1188 ends, the process returns to step S1185, and the process of step S1185 and subsequent steps is repeated. In other words, the process of step S1185 to step S1188 is performed for each packet. Further, in a case where it is determined in step S1187 that the value of the variable n is "9", that is, in a case where it is determined that all the packets have been processed, the process proceeds to step S1189. Further, in a case where it is determined in step S1183 that IDr and IDk coincide with each other, the collision detection is unnecessary, and thus the process of step S1184 to step S1188 is skipped, and the process proceeds to step S1189.

In step S1189, the collision detecting unit 1335 determines whether or not the value of the variable k is "M−1" (k=M−1). In a case where the value of the variable k is determined not to reach "M−1", that is, in a case where it is determined that there is a transmitting device 1101 not selected as the collision counterpart, the process proceeds to step S1190.

In step S1190, the collision detecting unit 1335 increments the value of the variable k by "+1" (k=k+1). In other words, a next transmitting device 1101 is selected as the collision counterpart. If the process of step S1190 ends, the process returns to step S1183, and the process of step S1183 and subsequent steps is repeated. In other words, the process of step S1183 to step S1190 is performed on each collision counterpart. Further, in a case where it is determined in step S1189 that the value of the variable k is "M−1" (k=M−1), that is, in a case where it is determined that all the transmitting devices 1101 have been selected as the collision opponent, the collision detection process ends, and the process returns to FIG. 34.

As the processes are performed as described above, it is possible to suppress the increase in the load, perform the reception with higher sensitivity, and implement more reliable information transmission.

The example of the priority list has been described above, but any information may be included in the priority list. For example, information useful for reception of the radio signal may be included in the priority list. For example, information related to a communication format such as the number of repeated transmissions, a radio modulation scheme, error correction, encryption (for example, the presence or absence of encryption, designation of an encryption scheme, an encryption key, or the like), a transmission frequency, or the like may be included. Accordingly, the base station 1102 is able to support a plurality of communication formats in addition to various communication formats. Therefore, for example, the base station 1102 is able to receive the radio signals transmitted from different transmitting devices 1101 in different communication formats.

For example, even in a case where the transmitting device 1101-1 used for position detection of the elderly person sets the number of repeated transmissions to 10, and the transmitting device 1101-2 used for position detection of a cat or a dog reduces the number of repeated transmissions to 4, the base station 1102 is able to appropriately receive the radio signals from the respective transmitting devices 1101 on the basis of the information of the number of repeated transmissions of each transmitting device 1101 included in the priority list. In other words, since the base station 1102 is able to perform signal detection under the assumption that the number of repetitions is 10 for the radio signal transmitted from the transmitting device 1101-1 is 10 and perform signal detection under the assumption that the number of repetitions of the radio signal transmitted from the transmitting device 1101-2 is 4, it is possible to receive any radio signal more efficiently and more accurately.

Further, the information useful for reception of the radio signal (for example, the information related to the communication format) may be managed in association with the identification information of the transmitting device 1101 which transmits the radio signal by the cloud server 1103 or may be managed in another server. Further, the registration of the information may be performed at an arbitrary timing. For example, the registration of the information may be performed when the terminal information, the subscriber information, or the like is registered or at an arbitrary subsequent timing.

First Modified Example

In the communication between the transmitting device 1101 and the base station 1102 of FIG. 25, the chirp modulation described above with reference to FIG. 3 and the like may be used.

In this case, the transmitting device 1101 sets the transmission channel and the transmission timing, for example, on the basis of its own identification information and time. Further, the transmitting device 1101 performs the chirp modulation on the transmission data such as the position information, multiplexes a plurality of obtained transmission signals in the same transmission channel by shifting the transmission timing, and transmits the multiplexed transmission signal. The BPSK modulation and the like are also performed on the transmission data appropriately.

On the other hand, the base station 1102 sets the reception channel and the reception timing on the basis of the identification information and the time of the transmitting device 101 included in the priority list transmitted from the cloud server 1103. The base station 1102 receives the transmission signals multiplexed in a predetermined channel and acquires transmission data by dechirping the transmission signals. The BPSK demodulation and the like are performed on the transmission signals.

As described above, the communication between the transmitting device 1101 and the base station 1102 of FIG. 25 can be performed in accordance with the scheme described as the first embodiment.

In the above example, the transmission of the transmission signal is prohibited in a case where it is detected that another radio communication is being performed in a desired transmission channel by the carrier sensing, but a channel shifted by a predetermined bandwidth may be newly set as the transmission channel, and the transmission of the transmission signal may be performed. In this case, for example, the carrier sensing is also performed in the base station 1102.

For example, in a case where a predetermined channel is set as the transmission channel and the reception channel in the transmitting device 1101 and the base station 1102, and the predetermined channel is used by another radio communication, a channel shifted by a predetermined bandwidth is newly set as the transmission channel and the reception channel in the transmitting device 1101 and the base station 1102. In the transmitting device 1101 and the base station 1102, a timing shifted by a predetermined time may be newly set as the transmission timing and the reception timing, and the communication may be performed.

Second Modified Example

The identification information of the transmitting device 1101 serving as the transmission source of the transmission signal which is likely to be received by the base station 1102 is included in the priority list of each base station, but the identification information of the transmitting device 1101 newly added to the position notification system may be included in all the priority lists, and a notification indicating the identification information may be given to all the base stations 1102.

The process of including the identification information of the newly added transmitting device 1101 in all the priority lists is performed, for example, until a signal transmitted by the communication device 1101 is received by one of the base stations 1102.

Figure 36:
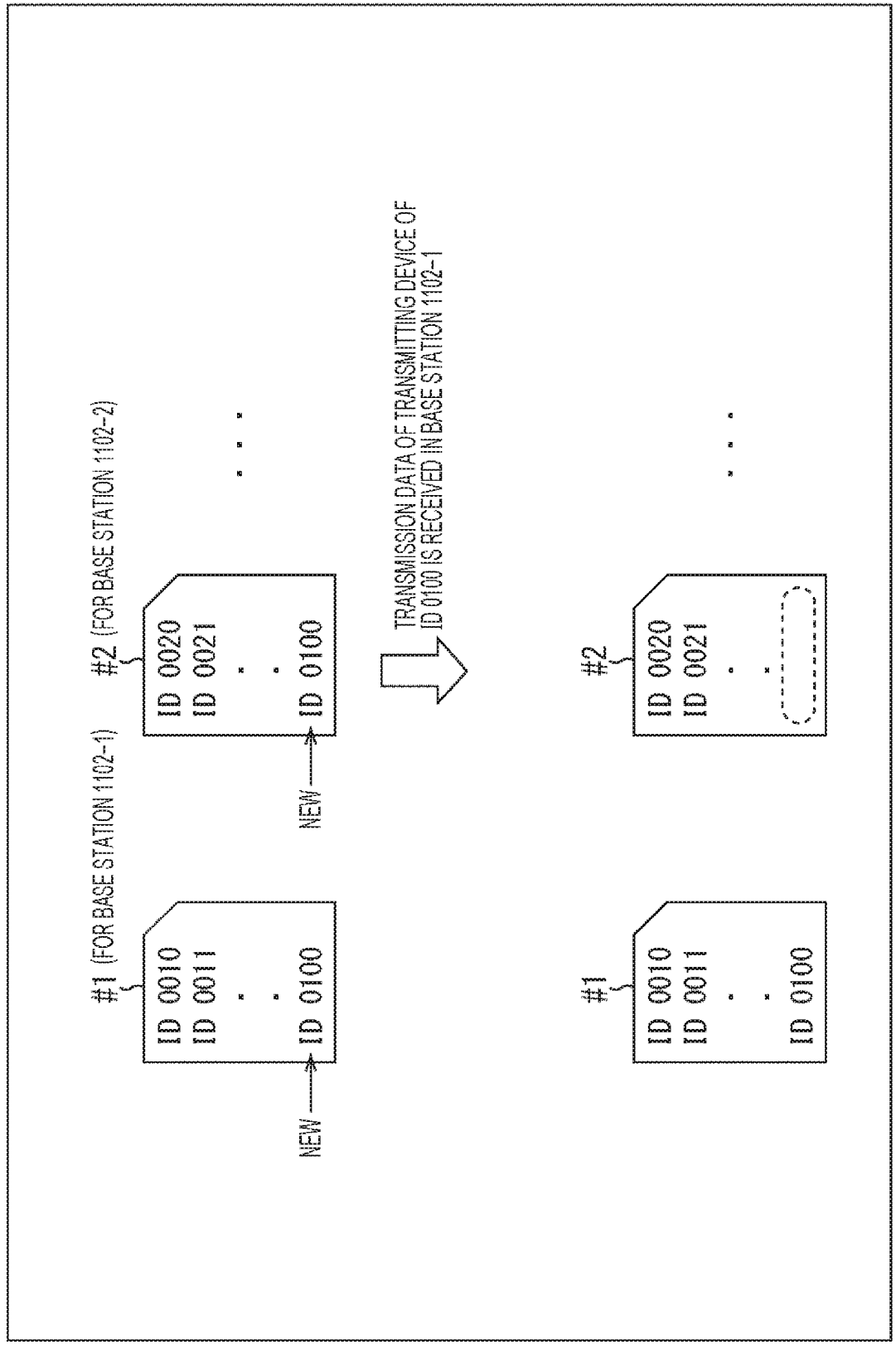
FIG. 36 is a diagram illustrating an update example of a priority list.

FIG. 36 is a diagram illustrating an example of updating the priority list.

In this example, a transmitting device 1101 to which identification information "ID 0100" is allocated is assumed to be newly added. The cloud server 1103 is in a state in which it is difficult to manage the communication coverage of the base station 1102 in which the transmitting device 1101 of "ID 0100" stays.

In this case, as illustrated in the upper part of FIG. 36, the cloud server 1103 includes the identification information of "ID 0100" in all the priority lists and transmits it to each base station.

In the example of FIG. 36, a priority list #1 is a priority list for the base station 1102-1, and includes "ID 0100" which is the identification information of the newly added transmitting device 1101 in addition to "ID 0010," "ID 0011," . . . . Similarly, a priority list #2 is a priority list for the base station 1102-2 and includes "ID 0100" which is the identification information of the newly added transmitting device 1101 in addition to "ID 0020," "ID 0021," . . . .

"ID 0010" and "ID 0011" included in the priority list #1 are the identification information of the transmitting devices 1101 staying in the communication coverage of the base station 1102-1. "ID 0020" and "ID 0021" included in the priority list #2 are the identification information of the transmitting devices 1101 staying in the communication coverage of the base station 1102-2.

In addition to the identification information of the transmitting device 1101 staying in the communication coverage of each base station, the priority list in which "ID 0100" serving as the identification information of the newly added transmitting device 1101 is described is transmitted to the other base stations.

As a result, all the base stations 1102 are able to receive the signal transmitted by the newly added transmitting device 1101 of "ID 0100."

Figure 31:
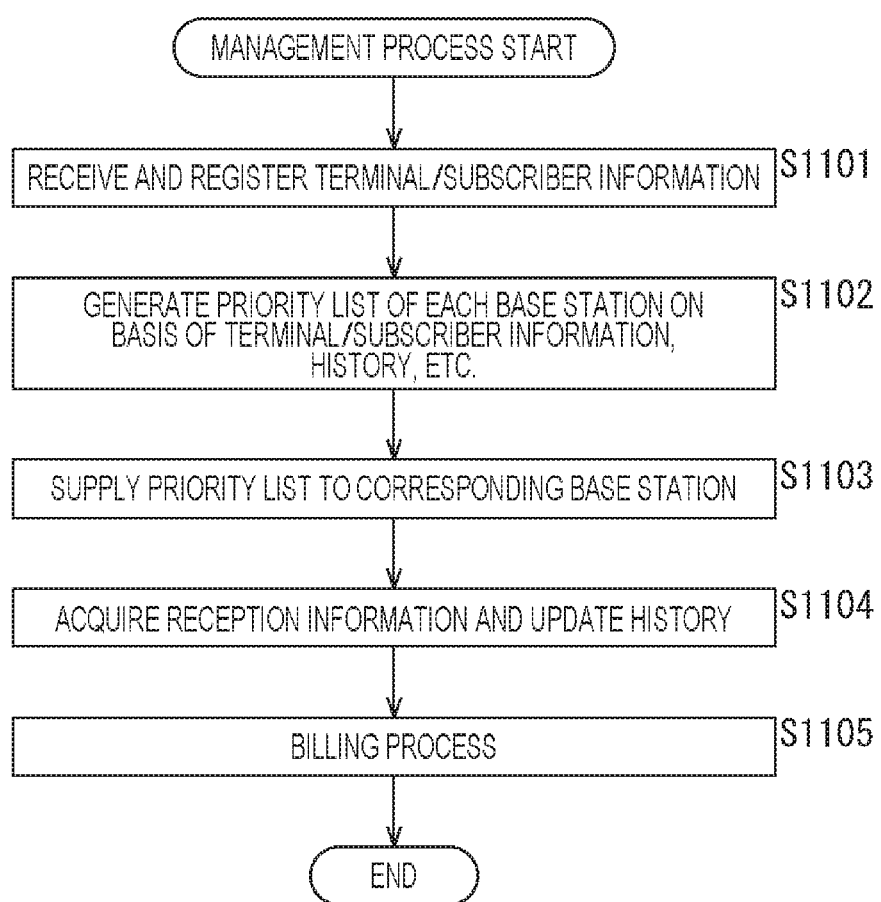
FIG. 31 is a flowchart illustrating an example of a flow of management process.

For example, in a case where the signal transmitted by the transmitting device 1101 of "ID 0100" is received by the base station 1102-1, the received information is transmitted to the cloud server 1103, the communication history of the base station 1102-1 is updated, and the priority list of each base station is updated (FIG. 31). The updated priority list for each base station is transmitted to each base station.

In the updated priority list, "ID 0100" is included only in the priority list for the base station 1102-1 and deleted from the priority lists for the other base stations as illustrated in the lower part of FIG. 36.

Since the management of the priority list is performed as described above, it is possible to add the transmitting device 1101 to the position notification system later.

5. Fifth Embodiment

<Antitheft System>

In the above example, the position notification system 1100 has been described by way of example, but the present technology can be applied to an arbitrary communication system. For example, the transmitting device 1101 may be installed on a moving object or the like in addition to a person.

Figure 37:
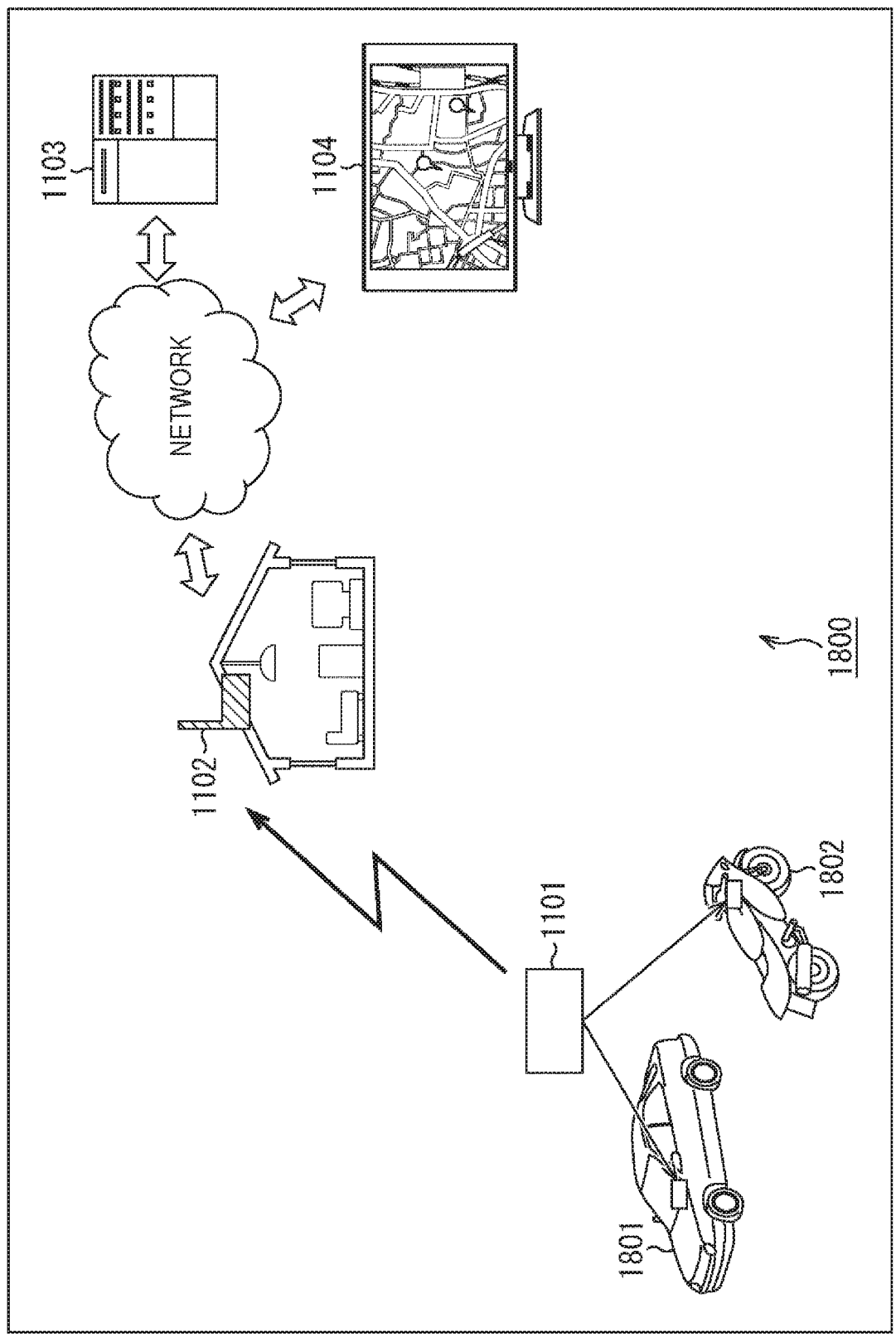
FIG. 37 is a diagram illustrating a main configuration example of an antitheft system.

For example, the present technology can be applied to an antitheft system 1800 for preventing theft of a vehicle, a motorbike, or the like as illustrated in FIG. 37. In the case of the antitheft system 1800, the transmitting device 1101 is installed in an object whose position is monitored, for example, a vehicle 1801 or a motorbike 1802 owned by the user. The transmitting device 1101 informs the base station 1102 of its position information (that is, the position information of the vehicle 1801 or the motorbike 1802) appropriately, similarly to the example of the position notification system 1100. In other words, the user is able to access the server 1103 from the information processing terminal 1104 and know the position of the vehicle 1801 or the motorbike 1802 as in the example of the position notification system 1100. Therefore, since the user is able to know the position of the vehicle 1801 or the motorbike 1802 even in a case where it is stolen, it is possible to easily find the vehicle 1801 or the motorbike 1802.

In the case of the antitheft system 1800, similarly to the example of the position notification system 1100, the present technology can be applied to the transmitting device 1101 and the base station 1102. Further, by applying the present technology, it is possible to the reception rate.

<Other Communication Systems>

Further, the information transmitted and received is arbitrary. For example, the transmitting device 1101 may generate and transmit transmission information including an image, an audio, measurement data, identification information of a device, parameter setting information, control information such as a command, or the like. Further, for example, the transmission information may include two or more kinds of information such as an image, an audio, identification information, setting information, and control information.

Further, for example, the transmitting device 1101 may be able to generate transmission information including information supplied from other devices. For example, the transmitting device 1101 may be configured to generate and transmit transmission information including information (sensor output) output from various kinds of sensors which perform detection, measurement, or the like on an arbitrary variable such as an image, light, brightness, saturation, electricity, a sound, vibration, acceleration, a speed, an angular velocity, force, a temperature (which is not a temperature distribution), humidity, a distance, an area, a volume, a shape, a flow rate, a time, magnetism, a chemical substance, smell, or the like or an amount of change thereof.

In other words, the present technology can be applied to systems used for arbitrary purposes such as 3D shape measurement, space measurement, object observation, movement deformation observation, biometric observation, authentication processing, monitoring, autofocus, imaging control, lighting control, tracking processing, input/output control, electronic device control, actuator control, or the like.

Further, the present technology can be applied to systems in arbitrary fields such as traffic, medical care, crime prevention, agriculture, livestock industry, mining, beauty, factory, household appliance, weather, natural surveillance, and the like. For example, the present technology can also be applied to systems of capturing images provided for viewing using digital cameras, mobile devices with a camera function, and the like. Further, for example, the present technology can also be applied to systems used for traffic such as a vehicle system of photographing the front, the rear, the surroundings, the inside, and the like of a vehicle for safe driving such as automatic stop or driver state recognition, a monitoring camera system of monitoring traveling vehicles or roads, and a ranging system of measuring a distance between vehicles. Further, for example, the present technology can also be applied to systems used for security using a surveillance camera for crime prevention purposes, a camera for person authentication, and the like. Further, for example, the present technology can also be applied to systems used for sports using various kinds of sensors or the like which are able to be used for sports such as wearable cameras. Further, for example, the present technology can also be applied to systems used for agriculture using various kinds of sensors such as cameras for monitoring a state of fields and crops. Further, for example, the present technology can also be applied to systems used for livestock industry using various kinds of sensors for monitoring the state of livestock such as pigs and cattle. Further, the present technology can also be applied to a system of monitoring a state of nature such as volcanoes, forests, and oceans, a weather observation system of observing, for example, weather, temperature, humidity, wind speed, daylight hours, and the like, and a system of observing the ecology of wildlife such as birds, fish, reptiles, amphibians, mammals, insects, and plants.

Further, a specification of the radio signal or information which is transmitted and received is arbitrary. Further, in the above example, the present technology has been described as being applied to the transmitting device 1101, the base station 1102, the cloud server 1103, or the position notification system 1100 having them, but the present technology can be applied to an arbitrary transmitting device, an arbitrary receiving device, an arbitrary transceiving device, an arbitrary communication device, an arbitrary information processing device, and an arbitrary system.

<Computer>

A series of processing described above can be executed by hardware or by software. In a case where a series of processes is executed by software, it is preferable to have a configuration serving as a computer capable of executing the software. Examples of the computer include a computer incorporated in dedicated hardware and a general-purpose computer capable of executing an arbitrary function through various programs installed therein.

Figure 38:
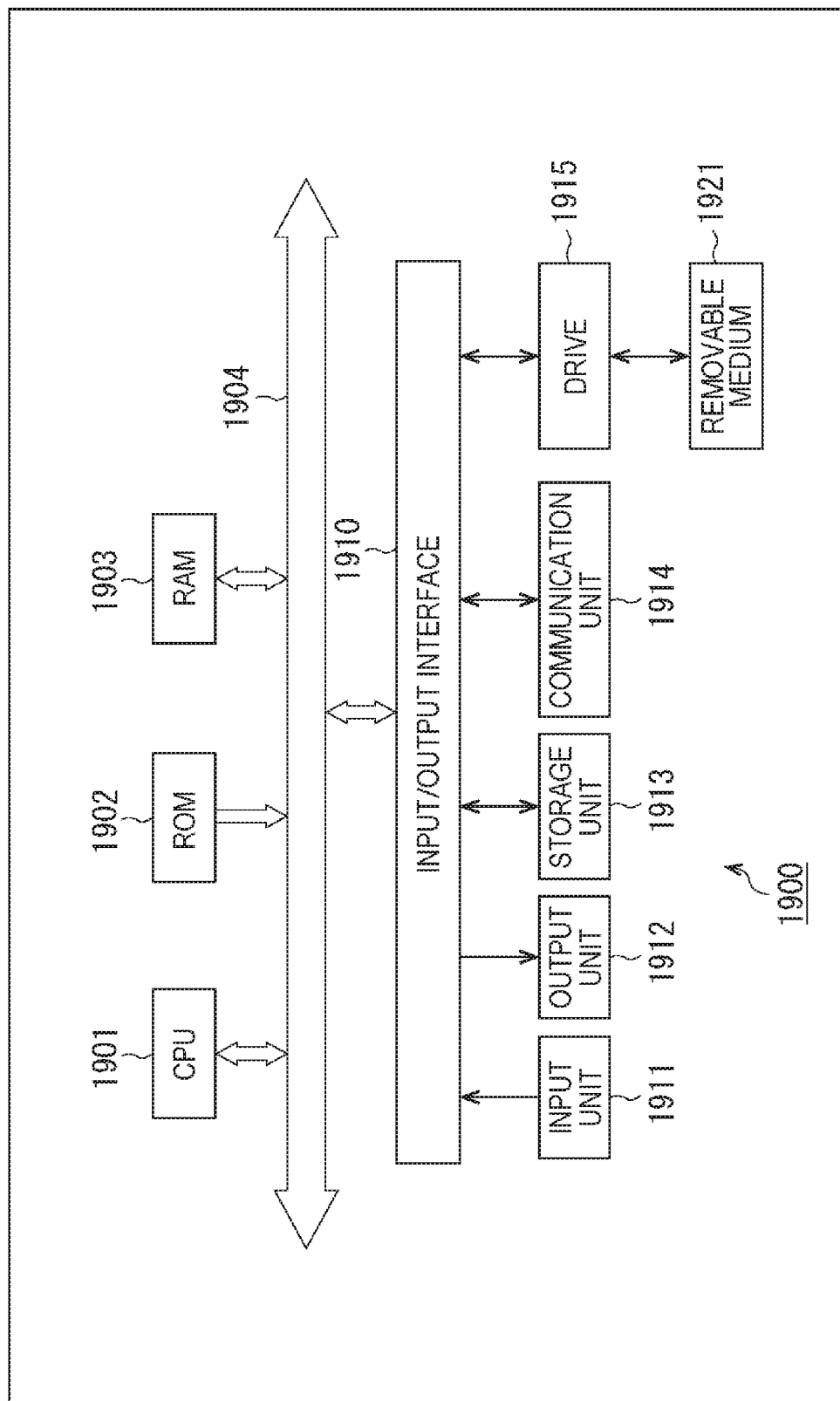
FIG. 38 is a block diagram illustrating a main configuration example of a computer.

FIG. 38 is a block diagram illustrating a main configuration example of a computer. As illustrated in FIG. 38, a computer 1900 has a central processing unit (CPU) 1901, a read only memory (ROM) 1902, and a random access memory (RAM) 1903 which are connected to one another via a bus 1904.

An input/output interface 1910 is also connected to the bus 1904. An input unit 1911, an output unit 1912, a storage unit 1913, a communication unit 1914, and a drive 1915 are connected to the input/output interface 1910.

The input unit 1911 includes an arbitrary input device such as a keyboard, a mouse, a touch panel, an image sensor, a microphone, a switch, an input terminal, or the like. The output unit 1912 includes an arbitrary output device such as a display, a speaker, an output terminal, or the like. The storage unit 1913 includes an arbitrary storage medium such as a non-volatile memory such as a hard disk, a RAM disk, an SSD, a USB memory, and the like. The communication unit 1914 includes a communication interface conforming to either or both of wired and wireless communication standards such as Ethernet (a registered trademark), Bluetooth (a registered trademark), USB, HDMI (a registered trademark), or IrDA. The drive 1915 drives a removable medium 1921 having any storage medium such as a magnetic disk, optical disk, a magneto-optical disk, or a semiconductor memory.

In the computer 1900 having the above configuration, for example, the CPU 1901 is able to implement a function equivalent to a part or all of hardware configuration of each device described above by loading a program stored in the storage unit 1913 onto the RAM 1903 via the input/output interface 1910 and the bus 1904 and executing the program. In other words, at least some of a series of processes described above is performed. The RAM 1903 also appropriately stores data and the like necessary for the CPU 1901 to execute various kinds of processes.

For example, the program executed by the CPU 1901 may be recorded in the removable medium 1921 serving as a package medium and applied. In this case, the removable medium 1921 may be loaded into drive 1915, and the program may be installed in the storage unit 1913 via the input/output interface 1910. Further, the program may be provided via a wired or wireless transmission medium such as a local area network, the Internet, or digital satellite broadcasting. In this case, the program may be received by the communication unit 1914 and installed in the storage unit 1913. Further, the program may be installed in the ROM 1902 or the storage unit 1913 in advance.

Further, a part of the above-described series of processing is able to be executed by hardware, and others is able to be executed by software.

<Others>

The embodiment of the present technology is not limited to the above-described embodiments, and various modifications can be made without departing from the gist of the present technology.

Further, for example, the present technology can be applied to any configuration constituting a device or a system, and for example, the present technology may be implemented as a processor serving as a system large scale integration (LSI) or the like, a module using a plurality of processors or the like, a unit using a plurality of modules or the like, or a set or the like in which other functions are further added to a unit (that is, some components of a device).

Further, in this specification, a "system" means a group of a plurality of constituent elements (devices, modules, or the like), and all constituent elements need not be necessarily in the same housing. Accordingly, a plurality of devices which are accommodated in separate housings and connected to one another via a network or a single device in which a plurality of modules are accommodated in one housing are regarded as a system.

Further, for example, a configuration described as a single device (or a processing unit) may be divided and configured as a plurality of devices (or processing units). On the contrary, configurations described as a plurality of devices (or processing units) in the above example may be configured as a single device (or processing unit). Further, a configuration not described above may be added to a configuration of each device (or each processing unit). Further, as long as a configuration or an operation of the entire system is substantially the same, a part of a configuration of a certain device (or processing unit) may be included in a configuration of another device (or another processing unit).

Further, for example, the present technology may employ a configuration of cloud computing in which one function is shared and processed by a plurality of devices via a network.

Further, for example, the program described above may be executed in an arbitrary device. In this case, it is preferable for the device to have a necessary function (functional block or the like) and be able to obtain necessary information.

Further, for example, steps described in the above-described flowchart may be executed by one device or shared and executed by a plurality of devices. Further, in a case where a plurality of processes are included in one step, a plurality of processes included in the one step may be executed by one device or may be shared and executed by a plurality of devices.

Further, in a program executed by a computer, processes of steps describing the program may be executed chronologically in the order described in this specification or may be executed in parallel or individually at necessary timings such as called timings. In other words, as long as no contradiction arises, processes of steps may be executed in an order different from the above-described order. Further, a process of steps describing the program may be executed in parallel with a process of another program or may be executed in combination with a process of another program.

Further, each of a plurality of present technologies described in the present specification may be implemented as a single technology independently as long as there is no contradiction. It will be appreciated that a plurality of arbitrary present technologies may be implemented in combination with each other. For example, the present technology described in any of the embodiments may be implemented in combination with the present technology described in another embodiment. Further, any of the present technologies described above may be implemented in combination with other technologies not described above.

Further, the present technology may also have the following configurations.

(1)

An information processing device, including:

a supplying unit that supplies a plurality of receiving devices with identification information of a transmitting device, the plurality of receiving devices receiving information transmitted from the transmitting device that multiplexes a plurality of transmission signals generated by performing chirp modulation on transmission data in the same transmission channel by shifting a transmission timing at predetermined time intervals and transmits the multiplexed transmission signals, the identification information of the transmitting device being used for a setting for receiving the transmission signals in each of the receiving devices.

(2)

The information processing device according to (1), in which the supplying unit supplies the identification information of the transmitting device serving as a transmission source of the transmission signals receivable by each of the receiving devices.

(3)

The information processing device according to (2), in which the supplying unit supplies the identification information on the basis of a communication history of each of the receiving devices with the transmitting device.

(4)

The information processing device according to (3), further including, a priority information managing unit that generates priority information including the identification information of the transmitting device as the transmission source of the transmission signals to be preferentially received on the basis of the communication history, in which the supplying unit supplies the priority information to the plurality of receiving devices.

(5)

An information processing method, including:

supplying a plurality of receiving devices with identification information of a transmitting device, the plurality of receiving devices receiving information transmitted from the transmitting device that multiplexes a plurality of transmission signals generated by performing chirp modulation on transmission data in the same transmission channel by shifting a transmission timing at predetermined time intervals and transmits the multiplexed transmission signals, the identification information of the transmitting device being used for a setting for receiving the transmission signals in each of the receiving devices.

(6)

A transmitting device, including:

a chirp modulating unit that performs chirp modulation on transmission data;

a transmitting unit that multiplexes a plurality of transmission signals generated by performing the chirp modulation in the same transmission channel by shifting a transmission timing at predetermined time intervals and transmits the multiplexed transmission signals; and a control unit that sets the transmission timing and the transmission channel on the basis of identification information of the transmitting device.

(7)

The transmitting device according to (6), in which the control unit sets a known timing to a receiving device that receives the transmission signals on the basis of the identification information as the transmission timing and sets a known channel as the transmission channel.

(8)

The transmitting device according to (6) or (7), in which an interval of the transmission timing is at least any one of a fixed interval or an interval smaller than a chirp modulation cycle.

(9)

The transmitting device according to any of (6) to (8), further including, a narrow band modulating unit that performs narrow band modulation on the transmission data, in which the chirp modulating unit performs the chirp modulation on the transmission data which has undergone the narrow band modulation.

(10)

The transmitting device according to any of (6) to (9), further including, a GPS signal receiving unit that receives a GPS signal, in which the control unit sets the transmission timing and the transmission channel on the basis of the identification information and a time included in the GPS signal.

(11)

The transmitting device according to any of (6) to (10), in which the transmitting unit transmits the same packet as the transmission signal twice or more.

(12)

A transmitting method, including steps of:

performing chirp modulation on transmission data;

multiplexing a plurality of transmission signals generated by performing the chirp modulation in the same transmission channel by shifting a transmission timing at predetermined time intervals and transmitting the multiplexed transmission signals; and setting the transmission timing and the transmission channel on the basis of identification information of the transmitting device.

(13)

A receiving device, including:

a receiving unit that receives transmission signals transmitted from a transmitting device that multiplexes a plurality of transmission signals generated by performing the chirp modulation in the same transmission channel by shifting a transmission timing at predetermined time intervals and transmits the multiplexed transmission signals;

a dechirping unit that dechirps the transmission signals;

a control unit that sets a reception channel of the transmission signals on the basis of identification information of the transmitting device and sets a reception timing according to the transmission timing of each of the plurality of transmission signals.

(14)

The receiving device according to (13), further including, an acquiring unit that acquires the identification information transmitted from an information processing device different from the transmitting device.

(15)

The receiving device according to (13) or (14), in which the acquiring unit acquires a plurality of pieces of identification information, and the control unit sets the reception channel and the reception timing for each piece of identification information.

(16)

The receiving device according to any of (13) to (15), in which an interval of the reception timing is at least any one of a fixed interval or an interval smaller than a chirp modulation cycle.

(17)

The receiving device according to any of (13) to (16), further including, a narrow band demodulating unit that performs narrow band demodulation on the dechirped transmission signals.

(18)

The receiving device according to any of (13) to (17), further including, a GPS signal receiving unit that receives a GPS signal, in which the control unit sets the reception timing and the reception channel on the basis of the identification information and a time included in the GPS signal.

(19)

The receiving device according to any of (13) to (18), in which the receiving unit receives the same packet twice or more, synthesizes a plurality of received packets, and extracts the transmission data.

(20)

A receiving method, including:

receiving transmission signals transmitted from a transmitting device that multiplexes a plurality of transmission signals generated by performing the chirp modulation in the same transmission channel by shifting a transmission timing at predetermined time intervals and transmits the multiplexed transmission signals;

dechirping the transmission signals;

setting a reception channel of the transmission signals on the basis of identification information of the transmitting device and sets a reception timing according to the transmission timing of each of the plurality of transmission signals.

REFERENCE SIGNS LIST

100 Position notification system
101 Transmitting device
102 High sensitivity receiving device 103 Network
104 Server
111 Elderly person
131 Central processing unit (CPU)
132 Binary phase shift keying (BPSK) modulating unit
133 Chirp generating unit
134 Chirp modulating unit
135 Reference clock generating unit
136 Phase locked loop (PLL)
137 High-efficiency amplifying unit
140 Global positioning system (GPS) receiving unit
141 Timing controller
208 Synchronization signal generating unit
209 Matched filter
212 Reference clock generating unit
213 GPS receiving unit
214 CPU
215 Timing controller
216 AND gate
221 Dechirping unit
223 BPSK demodulating unit
301 Reference clock generating unit
302 Correcting unit
800 Antitheft system
1100 Position notification system
1101 Transmitting device
1102 Base station
1103 Cloud server
1104 Information processing terminal
1151 CPU
1181 Terminal/subscriber information managing unit
1182 Priority list managing unit
1183 Reception information managing unit
1184 History managing unit
1185 Billing processing unit
1201 Signal processing unit
1202 Transmitting unit
1221 Identification information storage unit
1222 Time information generating unit
1223 Gold code generating unit
1224 Transmission channel setting unit
1225 Transmission timing setting unit
1301 Antenna
1302 Low noise amplifying unit
1303 Band pass filter (BPF)
1304 Carrier oscillating unit
1305 Multiplying unit
1306 90 degree shifter
1307 Multiplying unit
1308 Analog/digital (A/D) converting unit
1309 Memory
1310 CPU
1321 Antenna
1322 GPS receiving unit
1331 Priority list processing unit
1332 GPS processing unit
1333 Reception control unit
1334 Reception information supplying unit
1335 Collision detecting unit
1336 Reception processing unit
1337 Error correcting unit
1800 Antitheft system

The invention claimed is:
1. A transmitting device, comprising:
a chirp modulating unit that performs chirp modulation on transmission data;
a transmitting unit that multiplexes a plurality of transmission signals generated by performing the chirp modulation in the same transmission channel by shifting a transmission timing at predetermined time intervals and transmits the multiplexed transmission signals; and
a control unit that sets the transmission timing and the transmission channel on the basis of identification information of the transmitting device.

2. The transmitting device according to claim 1,
wherein the control unit sets a known timing to a receiving device that receives the transmission signals on the basis of the identification information as the transmission timing and sets a known channel as the transmission channel.

3. The transmitting device according to claim 1,
wherein an interval of the transmission timing is at least any one of a fixed interval or an interval smaller than a chirp modulation cycle.

4. The transmitting device according to claim 1, further comprising,
a narrow band modulating unit that performs narrow band modulation on the transmission data,
wherein the chirp modulating unit performs the chirp modulation on the transmission data which has undergone the narrow band modulation.

5. The transmitting device according to claim 1, further comprising,
a GPS signal receiving unit that receives a GPS signal,
wherein the control unit sets the transmission timing and the transmission channel on the basis of the identification information and a time included in the GPS signal.

6. The transmitting device according to claim 1,
wherein the transmitting unit transmits the same packet as the transmission signal twice or more.

7. The transmitting device according to claim 1, wherein the identification information of the transmitting device includes a unique device identifier (ID) of the transmitting device.

8. A transmitting method, comprising steps of:
performing chirp modulation on transmission data;
multiplexing a plurality of transmission signals generated by performing the chirp modulation in the same transmission channel by shifting a transmission timing at predetermined time intervals and transmitting the multiplexed transmission signals; and
setting the transmission timing and the transmission channel on the basis of identification information of the transmitting device.

9. The transmitting method, according to claim 8, wherein the identification information of the transmitting device includes a unique device identifier (ID) of the transmitting device.

10. A receiving device, comprising:
a receiving unit that receives transmission signals transmitted from a transmitting device that multiplexes a plurality of transmission signals generated by performing the chirp modulation in the same transmission channel by shifting a transmission timing at predetermined time intervals and transmits the multiplexed transmission signals;
a dechirping unit that dechirps the transmission signals;
a control unit that sets a reception channel of the transmission signals on the basis of identification information of the transmitting device and sets a reception timing according to the transmission timing of each of the plurality of transmission signals.

11. The receiving device according to claim 10, further comprising,
an acquiring unit that acquires a second identification information transmitted from an information processing device different from the transmitting device.

12. The receiving device according to claim 10,
wherein the acquiring unit acquires a plurality of pieces of identification information, and
the control unit sets the reception channel and the reception timing for each piece of identification information.

13. The receiving device according to claim 10,
wherein an interval of the reception timing is at least any one of a fixed interval or an interval smaller than a chirp modulation cycle.

14. The receiving device according to claim 10, further comprising,
a narrow band demodulating unit that performs narrow band demodulation on the dechirped transmission signals.

15. The receiving device according to claim 10, further comprising,
a GPS signal receiving unit that receives a GPS signal,
wherein the control unit sets the reception timing and the reception channel on the basis of the identification information and a time included in the GPS signal.

16. The receiving device according to claim 10,
wherein the receiving unit receives the same packet twice or more, synthesizes a plurality of received packets, and extracts the transmission data.

17. The receiving device according to claim 11, wherein the identification information of the transmitting device includes a unique device identifier (ID) of the transmitting device, and wherein the second identification information of the information processing device includes a unique device identifier (ID) of the information processing device.

18. A receiving method, comprising:
receiving transmission signals transmitted from a transmitting device that multiplexes a plurality of transmission signals generated by performing the chirp modulation in the same transmission channel by shifting a transmission timing at predetermined time intervals and transmits the multiplexed transmission signals;
dechirping the transmission signals;
setting a reception channel of the transmission signals on the basis of identification information of the transmitting device and sets a reception timing according to the transmission timing of each of the plurality of transmission signals.

19. The receiving method according to claim 18, wherein the identification information of the transmitting device includes a unique device identifier (ID) of the transmitting device.

* * * * *